(12) United States Patent
Oami

(10) Patent No.: US 6,415,060 B1
(45) Date of Patent: Jul. 2, 2002

(54) LOSSLESS TRANSFORM CODING SYSTEM HAVING COMPATIBILITY WITH LOSSY CODING

(75) Inventor: Ryoma Oami, Tokyo (JP)

(73) Assignee: Nec Corporation, Tokyo (JP)

(*) Notice: Subject to any disclaimer, the term of this patent is extended or adjusted under 35 U.S.C. 154(b) by 0 days.

(21) Appl. No.: 09/692,475

(22) Filed: Oct. 20, 2000

Related U.S. Application Data

(62) Division of application No. 08/917,085, filed on Aug. 25, 1997, now Pat. No. 6,167,161.

(30) Foreign Application Priority Data

Aug. 23, 1996 (JP) ............................................. 8-222188
Sep. 27, 1996 (JP) ............................................. 8-277312

(51) Int. Cl.[7] .............................................. G06K 9/36
(52) U.S. Cl. ...................................................... 382/250
(58) Field of Search ........................... 341/50; 358/432, 358/433; 375/240.18, 240.2, 240.24; 382/232, 235, 248, 250, 251; 708/400, 402

(56) References Cited

U.S. PATENT DOCUMENTS

| | | | |
|---|---|---|---|
| H1684 H | * 10/1997 | de Queiroz et al. | ........ 382/232 |
| 5,703,799 A | 12/1997 | Ohta | .......................... 708/402 |
| 5,764,553 A | * 6/1998 | Hong | .......................... 382/250 |
| 6,154,153 A | * 11/2000 | Kubota | ........................ 341/50 |

OTHER PUBLICATIONS

ISO/IEC 10918–1, Information Technology—Digital Compression And Coding Of Continuous–Tone Still Images Requirements And Guidelines, 1994, p. 143.
Chang et al., "Transform Coding Of Arbitrarily–Shaped Image Segments", Aug. 1993, pp. 83–90.
Journal Of The Television Society, vol. 50, No. 8, Published Aug. 20, 1996, pp. 1162–1171.
1996 Conference Proceedings Of The Institute Of Electronics, Information And Communication Engineers, "Information Systems 2", Mar. 11, 1996, D–235, P. 23.
Chang et al., Transform Coding of Arbitrarily–Shaped Image Segments, Aug. 1993, pp. 83–90.*

* cited by examiner

*Primary Examiner*—Timothy M. Johnson
(74) *Attorney, Agent, or Firm*—Foley & Lardner

(57) ABSTRACT

A reversible eight-element DCT providing values near to transform values of the original DCT. In a 4×4 matrix, coefficients (X1, X7, X3, X5) are separated into (X1, X7) and (X3, X5). If (X1, X7) are determined, then (X3, X5) values are limited. (X1, X7) are linearly quantized with steps k1, k7 to obtain quantization values (Xq1, Xq7). (X3, X5) are divided into global and local signals. The global signals are linearly quantized with steps L3, L5, and local signals are determined using a table. The quantization values of (X3, X5) are added to obtain quantization values (Xq3, Xq5). The reversible 4×4 matrix and conventional 2×2 matrices are combined to construct a reversible eight-element DCT.

4 Claims, 56 Drawing Sheets

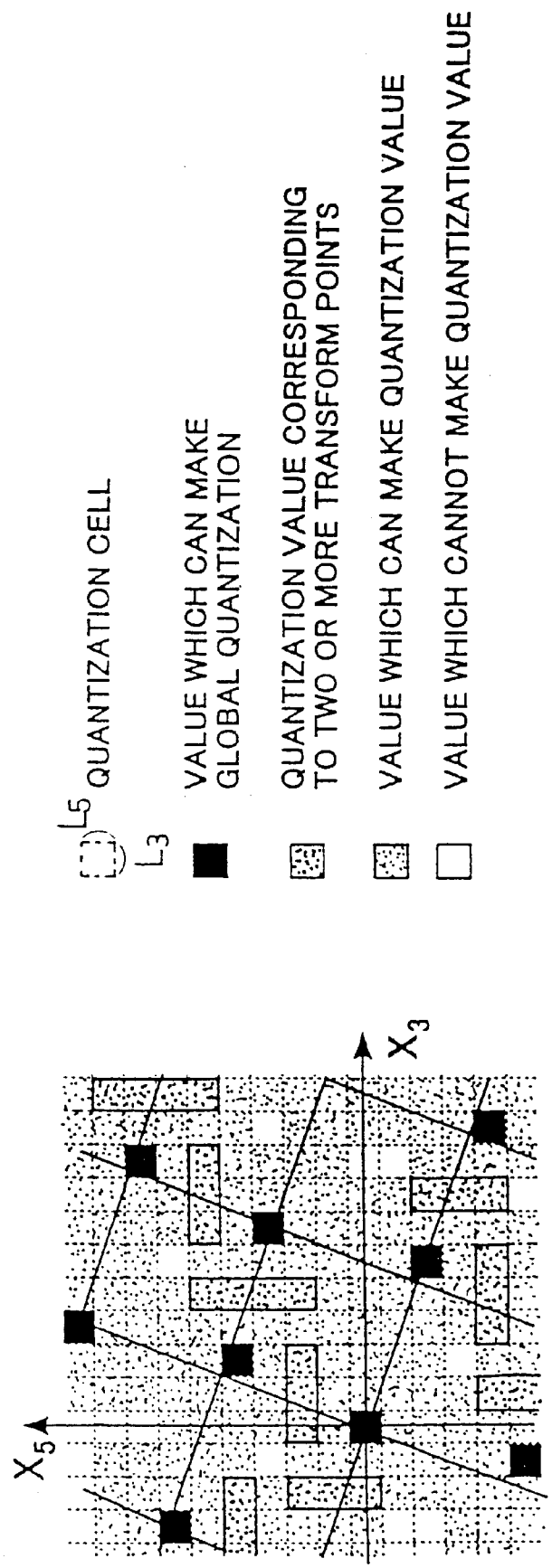

○    GLOBAL SIGNAL CANDIDATE POINT

┆×┆    QUANTIZATION CELL

×    QUANTIZATION POINT

←    CANDIDATE VECTOR FOR LOCAL QUANTIZATION VALUE $p^{(i)} = (p_3^{(i)}, p_5^{(i)})$ ($i = 0, 1, 2, 3$)

$p_q^{(i)} = (p_{q3}^{(i)}, p_{q5}^{(i)})$ $s_q^{(i)} = (s_{q3}^{(i)}, s_{q5}^{(i)})$

FIG. 8(a)
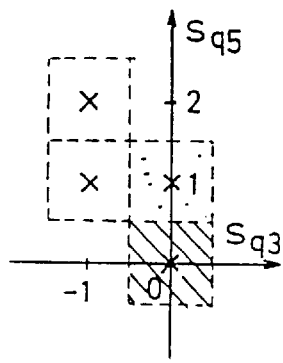
FIG. 8(b)
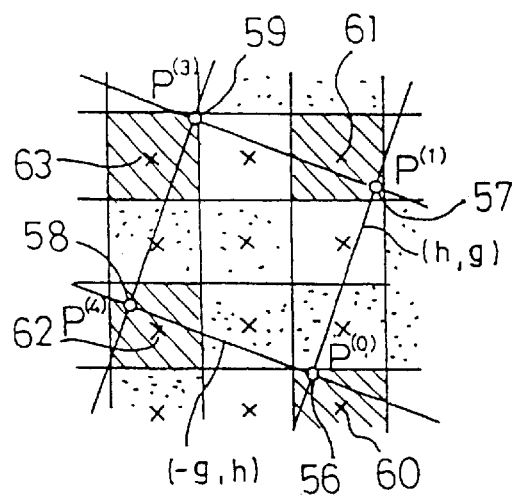
 QUANTIZATION POINT
QUANTIZATION CELL
GLOBAL SIGNAL CANDIDATE POINT
 VALUE WHICH CAN MAKE GLOBAL QUANTIZATION VALUE
 VALUE WHICH CAN MAKE QUANTIZATION VALUE

FIG. 8(c)

| $S_{q3}^{(0)}$ $S_{q5}^{(0)}$ | | $S_{q3}$ | $S_{q5}$ | $\Delta p_3$ | $\Delta p_5$ |
|---|---|---|---|---|---|
| 0 | 0 | 0 | 0 | 0 | 0 |
| 0 | 1 | 0 | 1 | 0 | 0 |
| -1 | 1 | -1 | 1 | 0 | 0 |
| -2 | 1 | 0 | 0 | -g | h |
| 0 | 2 | — | | — | |
| -1 | 2 | -1 | 2 | 0 | 0 |
| -2 | 2 | 0 | 1 | -g | h |
| 0 | 3 | 0 | 0 | h | g |
| -1 | 3 | — | | — | |
| -2 | 3 | 0 | 0 | h-g | g+h |

FIG. 11
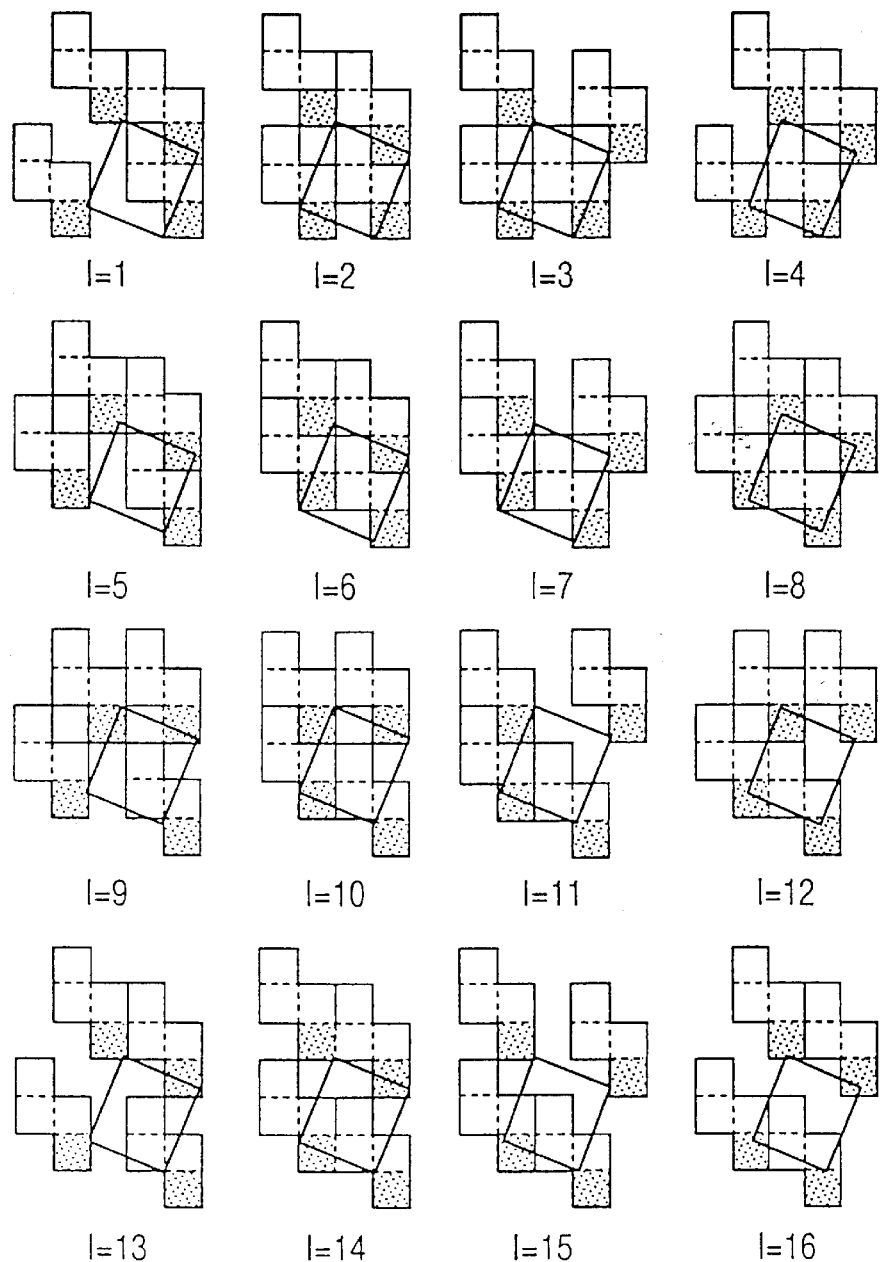
 QUANTIZATION CELL OF VALUE WHICH CAN MAKE GLOBAL QUANTIZATION VALUE
 QUANTIZATION CELL OF VALUE OBTAINED BY ADDING LOCAL QUANTIZATION VALUE TO EACH GLOBAL QUANTIZATION VALUE

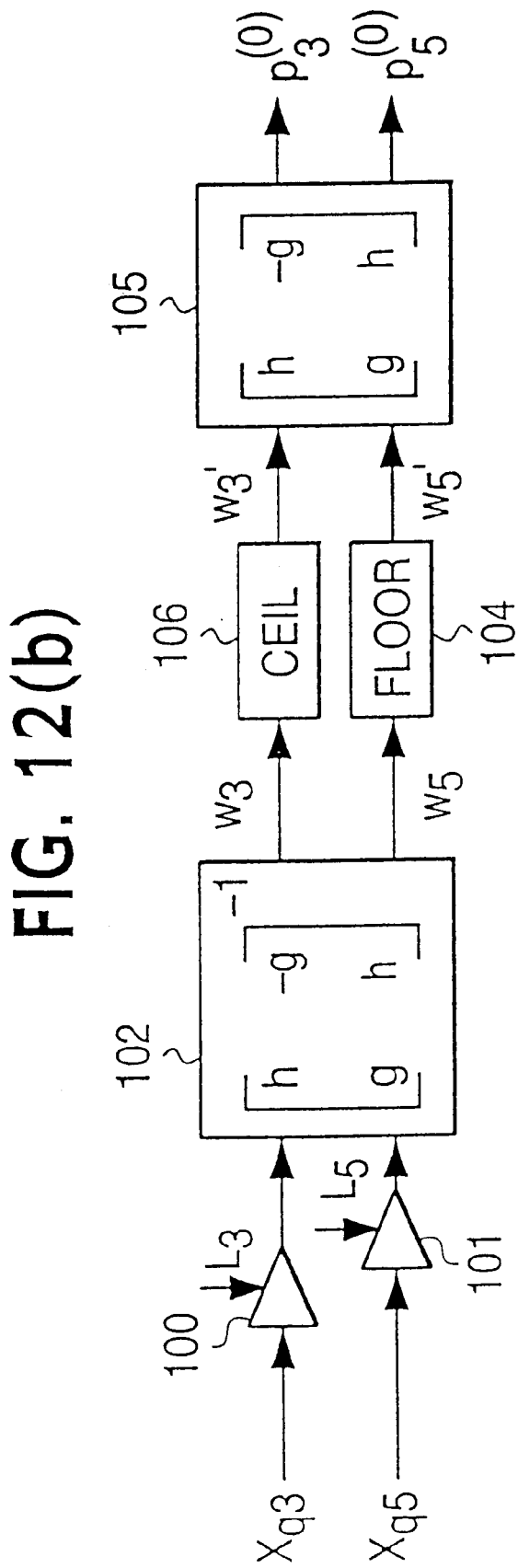

QUANTIZATION POINT

QUANTIZATION POINT

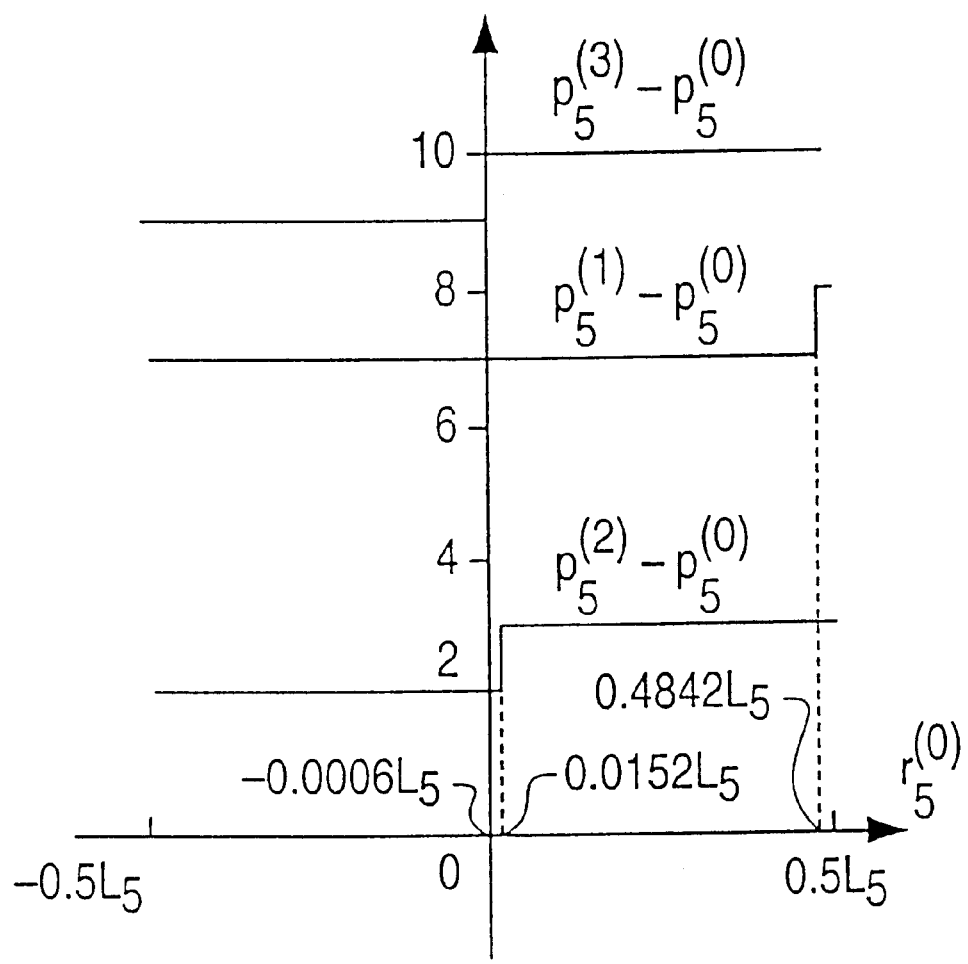

■ QUANTIZATION CELL OF VALUE WHICH CAN MAKE GLOBAL QUANTIZATION VALUE

☐ QUANTIZATION CELL OF VALUE OBTAINED BY ADDING LOCAL QUANTIZATION VALUE TO EACH GLOBAL QUANTIZATION VALUE

LOSSLESS TRANSFORM CODING SYSTEM HAVING COMPATIBILITY WITH LOSSY CODING

This application is a divisional of application Ser. No. 08/917,085, filed Aug. 25, 1997, now U.S. Pat No. 6,167, 161.

BACKGROUND OF THE INVENTION

1. Field of the Invention

This invention relates to transform coding for digital signals, and more particularly to coding of picture signals.

2. Description of the Related Art

Conventionally, a linear transform coding system is known as a coding system for an audio or video signal. In the linear transform coding system, a plurality of discrete signals are linearly transformed collectively and resulting transform coefficients are coded, and compression coding can be achieved by selecting the base of the transform taking statistical characters of the signal into consideration. It is known that a coding system which employs discrete cosine transform for the linear transform can realize high compression coding for a signal which behaves in accordance with a Markovian model, and is utilized widely for international standardized systems.

While the discrete cosine transform is useful for realization of high compression coding, since the base of the transform is a real number, it is disadvantageous in that, in order to realize reversible coding, the quantization step size must be small, which results in deterioration of the coding efficiency.

A system which realizes reversible coding of discrete cosine transform without deterioration of the coding efficiency has been proposed by the inventor of the invention of the present application. The system modifies the discrete cosine transform so as to allow reversible transform. The system has two characteristics: one is to approximate the discrete cosine transform with linear transform with an integer matrix, and the other is to remove redundancies included between transform coefficients by reversible quantization.

In the following, a principle of eight-element reversible cosine transform according to the system described above is described. The original eight-element discrete cosine transform according to the international standards transforms an original signal vector (x0, x1, . . . , x7) into transform coefficients (X0, X1, . . . , X7) in accordance with the following expression (1):

$$\begin{bmatrix} X_0 \\ X_1 \\ X_2 \\ X_3 \\ X_4 \\ X_5 \\ X_6 \\ X_7 \end{bmatrix} = \begin{bmatrix} c_4 & c_4 & c_4 & c_4 & c_4 & c_4 & c_4 & c_4 \\ c_1 & c_3 & c_5 & c_7 & -c_7 & -c_5 & -c_3 & -c_1 \\ c_2 & c_6 & -c_6 & -c_2 & -c_2 & -c_6 & c_6 & c_2 \\ c_3 & -c_7 & -c_1 & -c_5 & c_5 & c_1 & c_7 & -c_3 \\ c_4 & -c_4 & -c_4 & c_4 & c_4 & -c_4 & -c_4 & c_4 \\ c_5 & -c_1 & c_7 & c_3 & -c_3 & -c_7 & c_1 & -c_5 \\ c_6 & -c_2 & c_2 & -c_6 & -c_6 & c_2 & -c_2 & c_6 \\ c_7 & -c_5 & c_3 & -c_1 & c_1 & -c_3 & c_5 & -c_7 \end{bmatrix} \begin{bmatrix} x_0 \\ x_1 \\ x_2 \\ x_3 \\ x_4 \\ x_5 \\ x_6 \\ x_7 \end{bmatrix} \quad (1)$$

where c1, . . . , c7 are represented by the following expression (2)

$$c_k = \cos\left(\frac{k\pi}{16}\right) \quad (2)$$

In this eight-element reversible discrete cosine transform, the eight-element discrete cosine transform represented by the expression (1) is approximated with a transform of the following expression (3):

$$\begin{bmatrix} X_0 \\ X_1 \\ X_2 \\ X_3 \\ X_4 \\ X_5 \\ X_6 \\ X_7 \end{bmatrix} = \begin{bmatrix} a_4 & a_4 & a_4 & a_4 & a_4 & a_4 & a_4 & a_4 \\ a_1 & a_3 & a_5 & a_7 & -a_7 & -a_5 & -a_3 & -a_1 \\ a_2 & a_6 & -a_6 & -a_2 & -a_2 & -a_6 & a_6 & a_2 \\ a_3 & -a_7 & -a_1 & -a_5 & a_5 & a_1 & a_7 & -a_3 \\ a_4 & -a_4 & -a_4 & a_4 & a_4 & -a_4 & -a_4 & a_4 \\ a_5 & -a_1 & a_7 & a_3 & -a_3 & -a_7 & a_1 & -a_5 \\ a_6 & -a_2 & a_2 & -a_6 & -a_6 & a_2 & -a_2 & a_6 \\ a_7 & -a_5 & a_3 & -a_1 & a_1 & -a_3 & a_5 & -a_7 \end{bmatrix} \begin{bmatrix} x_0 \\ x_1 \\ x_2 \\ x_3 \\ x_4 \\ x_5 \\ x_6 \\ x_7 \end{bmatrix} \quad (3)$$

where a1, . . . , a7 are natural numbers. The values a1, . . . a7 are obtained by multiplying each row vector of the discrete cosine transform by a certain number and rounding the products into integers. (X0, . . . , X7) obtained based on the expression (3) have values near to the original discrete cosine transform coefficients except that they are multiplied by the certain number.

However, the transform coefficients X0, . . . , X7 obtained based on the expression (3) are not independent of each other, but have redundancies. Where the absolute value of the determinant of a transform matrix is represented by D, the density of points which may be taken in the transform domain is 1/D. In other words, the ratio of the points which may be taken in the transform region from among all integer lattice points is 1/D, and the remaining points of the ratio 1−1/D are wasteful points which cannot be taken actually. To use those wasteful points also as an object for coding makes a cause of decreasing the efficiency of compression coding.

Thus, in order to remove the redundancies, reversible coding is performed. However, since it is difficult to define a reversible transform directly in an eight-element space, the expression (3) is decomposed in accordance with a fast calculation scheme and reversible quantization is performed for results of the individual partial transforms.

The transform of the expression (3) can be decomposed into the following expressions (4) to (10):

$$\begin{bmatrix} x_0 + x_7 \\ x_0 - x_7 \end{bmatrix} = \begin{bmatrix} 1 & 1 \\ 1 & -1 \end{bmatrix} \begin{bmatrix} x_0 \\ x_7 \end{bmatrix} \quad (4)$$

$$\begin{bmatrix} x_1 + x_6 \\ x_1 - x_6 \end{bmatrix} = \begin{bmatrix} 1 & 1 \\ 1 & -1 \end{bmatrix} \begin{bmatrix} x_1 \\ x_6 \end{bmatrix} \quad (5)$$

$$\begin{bmatrix} x_2 + x_5 \\ x_2 - x_5 \end{bmatrix} = \begin{bmatrix} 1 & 1 \\ 1 & -1 \end{bmatrix} \begin{bmatrix} x_2 \\ x_5 \end{bmatrix} \quad (6)$$

$$\begin{bmatrix} x_3 + x_4 \\ x_3 - x_4 \end{bmatrix} = \begin{bmatrix} 1 & 1 \\ 1 & -1 \end{bmatrix} \begin{bmatrix} x_3 \\ x_4 \end{bmatrix} \quad (7)$$

$$\begin{bmatrix} x_0 + x_7 + x_3 + x_4 \\ x_0 + x_7 - x_3 - x_4 \end{bmatrix} = \begin{bmatrix} 1 & 1 \\ 1 & -1 \end{bmatrix} \begin{bmatrix} x_0 + x_7 \\ x_4 + x_3 \end{bmatrix} \quad (8)$$

$$\begin{bmatrix} x_1 + x_6 + x_2 + x_5 \\ x_1 + x_6 - x_2 - x_5 \end{bmatrix} = \begin{bmatrix} 1 & 1 \\ 1 & -1 \end{bmatrix} \begin{bmatrix} x_1 + x_6 \\ x_2 + x_5 \end{bmatrix} \quad (9)$$

$$\begin{bmatrix} X_0 \\ X_4 \end{bmatrix} = \begin{bmatrix} 1 & 1 \\ 1 & -1 \end{bmatrix} \begin{bmatrix} x_0 + x_7 + x_3 + x_4 \\ x_1 + x_6 + x_2 + x_5 \end{bmatrix} \quad (10)$$

-continued $$\begin{bmatrix} X_2 \\ X_6 \end{bmatrix} = \begin{bmatrix} a_2 & a_6 \\ a_6 & -a_2 \end{bmatrix} \begin{bmatrix} x_0 + x_7 - x_3 - x_4 \\ x_1 + x_6 - x_2 - x_5 \end{bmatrix} \quad (11)$$

$$\begin{bmatrix} X_1 \\ X_7 \\ X_3 \\ X_5 \end{bmatrix} = \begin{bmatrix} a_1 & a_7 & a_3 & a_5 \\ a_7 & -a_1 & -a_5 & a_3 \\ a_3 & -a_5 & -a_7 & -a_1 \\ a_5 & a_3 & -a_1 & a_7 \end{bmatrix} \begin{bmatrix} x_0 - x_7 \\ x_3 - x_4 \\ x_1 - x_6 \\ x_2 - x_5 \end{bmatrix} \quad (12)$$

It is to be noted that, in the expression (10), a4=1. This is because the matrix of the expression (10) only includes a4 and there is no problem if it is assumed that a4=1. In this manner, the expression (3) can be decomposed into eight 2×2 matrix transforms and one 4×4 matrix transform. Redundancies are produced in the individual transforms. For example, in the transform of the expression (4), since the absolute value of the determinant of the transform matrix is 2, integer vector values which may possibly be taken as a transform results are ½ the entire integer vector values. The redundancies produced in the individual transforms in this manner are removed for the individual transforms. To this end, for each transform, a result of the transform is reversibly transformed as seen in FIG. 22. Referring to FIG. 22, reference numerals 160 to 167 denote each a transformer for a 2×2 matrix, and 168 denotes a transformer for a 4×4 matrix.

Here, comparison between an eight-element reversible discrete cosine transform and the original discrete cosine transform is described. Similarly as in FIG. 22, also the original eight-element discrete cosine transform can be decomposed as seen in FIG. 24. In FIG. 24, transform matrices of individual 2×2 and 4×4 transforms are normalized so that they may correspond to those in FIG. 22. From comparison between FIGS. 22 and 24, it can be seen that the transformer 160 and a transformer 180, the transformer 161 and a transformer 181, the transformer 162 and a transformer 182, the transformer 163 and a transformer 183, the transformer 164 and a transformer 184, the transformer 165 and a transformer 185, the transformer 166 and a transformer 186, the transformer 167 and a transformer 187, and the transformer 168 and a transformer 188 correspond to each other. If results obtained by the corresponding transforms are equal, then also transform coefficients obtained finally have substantially equal values. As hereinafter described, this is important when the compatibility between an eight-element reversible discrete cosine transform and the original eight-element discrete cosine transform is considered. It is to be noted that, as can be seen from the comparison between the transforms, the portion of the discrete cosine transform which corresponds to normalization of the base is replaced by reversible quantization in the reversible discrete cosine transform. Consequently, it is important how to make a result of reversible quantization approach a result of normalization in order to achieve the compatibility. Subsequently, the reversible quantization is described in regard to a case of transform by a 2×2 matrix and another case of transform by a 4×4 matrix.

In a transform by a 2×2 matrix, transform points obtained by transforming integer lattice points are reversibly quantized making use of the periodicity of the structure of them. Where the absolute value of the determinant of a transform matrix is represented by D and the coordinates of a transform point obtained by transforming an integer vector are represented by (Y1, Y2), it can be proved that the structure of all of such transform points (Y1, Y2) has the period D in the direction of each axis. Therefore, a region represented by the following expression (13)

$$\{(Y_1, Y_2) | 0 \leq Y_1 \leq N_1-1, 0 \leq Y_2 \leq N_2-1\} \quad (13)$$

(where N1 and N2 are multiples of D, and they are each hereinafter referred to as quantization period) is determined as a basic region, and quantization values of transform points included in the basic region are artificially defined in advance. Then, the correspondence between the transform points and the quantization values is described in the form of and held as a table (this table is hereinafter referred to as quantization correspondence table), and quantization is performed using this table as described below.

An actual procedure of quantization is such as follows. First, quotients b1, b2 and remainders r1, r2 when the coordinates Y1, Y2 of the transform points are divided by the quantization periods N1, N2, respectively. Thus, the remainders (r1, r2) are included in the basic region provided by the expression (13). Then, using the quantization correspondence table defined as above, quantization values (q1, q2) (hereinafter referred to as local quantization) of (r1, r2) are calculated. Then, quantization values (Yq1, Yq2) of (Y1, Y2) are calculated from the quotients b1, b2 and the local quantization values q1, q2 in accordance with the following expressions (14):

$$\begin{cases} Y_{q1} = b_1 M_1 + q_1 \\ Y_{q2} = b_2 M_2 + q_2 \end{cases} \quad (14)$$

where M1, M2 are natural numbers and represent dynamic ranges of q1, q2, respectively. The values M1 and M2 represent the magnitudes of the basic region when measured with a scale of the quantization values.

The dynamic ranges M1, M2 represent the periods of dequantization described below (therefore, M1, M2 are hereinafter referred to as dequantization periods) Now, dequantization of a 2×2 matrix transform is described. Also dequantization can be performed in a procedure similar to that for quantization. First, quantization values Yq1, Yq2 are divided by the dequantization periods M1, M2 described above to obtain quotients b1', b2' and remainders q1' and q2', respectively. Then, a table (hereinafter referred to as dequantization correspondence table) which describes a correspondence relationship reverse to that of the quantization correspondence table is referred to obtain (r1', r2') corresponding to (q1', q2'). Then, dequantization values (Y1, Y2) are calculated in accordance with the following expression (15):

$$\begin{cases} Y_1 = b'_1 N_1 + r'_1 \\ Y_2 = b'_2 N_2 + r'_2 \end{cases} \quad (15)$$

Quantization and dequantization of a 2×2 matrix transform are such as described above.

(X1, X7, X3, X5) obtained by transform of a 4×4 matrix given by the following expression (16) are divided into (X1, X7) and (X3, X5), for which quantization is performed separately.

$$\begin{bmatrix} X_1 \\ X_7 \\ X_3 \\ X_5 \end{bmatrix} = \begin{bmatrix} a_1 & a_7 & a_3 & a_5 \\ a_7 & -a_1 & -a_5 & a_3 \\ a_3 & -a_5 & -a_7 & -a_1 \\ a_5 & a_3 & -a_1 & a_7 \end{bmatrix} \begin{bmatrix} u_4 \\ u_5 \\ u_6 \\ u_7 \end{bmatrix} \quad (16)$$

where (u4, u5, u6, u7) are an integer vector. A construction of the conventional 4×4 reversible transformer which realizes a transform of the expression (16) and such 4×4 reversible dequantization is shown in FIG. 26.

The transform coefficients (X1, X7) are linearly quantized with the step sizes k1, k7 (k1 and k7 are natural numbers) by linear quantizers 4, 5, respectively. The values of the quantization step sizes k1, k7 are set so that the dynamic ranges of quantization values (Xq1, Xq7) of (X1, X7) and quantization values (Xq3, Xq5) of (X3, X5) may be nearly equal to each other.

On the other hand, for quantization of the transform coefficients (X3, X5), the relationship described below is utilized. In particular, the relationship that, once (X1, X7) are determined, a certain integer vector (s3, s5) is determined and the values which may possibly be taken by (X3, X5) are limited to the following expression (17) is utilized:

$$\begin{bmatrix} X_3 \\ X_5 \end{bmatrix} = \begin{bmatrix} h & -g \\ g & h \end{bmatrix} \begin{bmatrix} n_1 \\ n_2 \end{bmatrix} + \begin{bmatrix} s_3 \\ s_5 \end{bmatrix} \quad (17)$$

where g, h are integers represented, from a1, a3, a5 and a7 of the expression (16), as $$\begin{cases} g = a_1^2 - a_7^2 + 2a_3a_5 \\ h = a_3^2 - a_5^2 + 2a_1a_7 \end{cases} \quad (18)$$

Points which may possibly be taken by transform coefficients (X3, X5) represented by the expression (17) are shown in FIG. 28. In this manner, the structure of all of the values which may possibly be taken by the transform coefficients (X3, X5) when certain (X1, X7) are determined is equivalent to a lattice structure defined by vectors (h, g), (−g, h) which is displaced by the integer vector (s3, s5) (hereinafter referred to as representative elements).

Further, when the transform coefficients X1, X7 are linearly quantized with the step sizes k1, k7 as described above, respectively, the structure of values which may be taken by (X3, X5) is a structure wherein k1k7 such lattices as shown in FIG. 28 overlap with each other. This is because the number of transform coefficients (X1, X7) which may be rounded to one quantization values (Xq1, Xq7) is k1k7, and representative elements (s3, s5) correspond to each of the k1k7 transform coefficients. Since only the portion of the representative elements (s3, s5) in the expression (17) varies depending upon the values of (X1, X7), the set of all of points which may be taken by the transform coefficients (X3, X5) when X1, X7 are linearly quantized with the step sizes k1, k7, respectively, is equivalent to the lattice structure of the expression (17) which overlaps at the k1k7 transform coefficients but is different only in a manner of displacement. For example, when k1=k7=2, points which may be taken by the transform coefficients (X3, X5) are such as illustrated in FIG. 29. As can be seen from FIG. 29, the structure of points which may possibly be taken by the transform coefficients (X3, X5) exhibits a repetition of the same pattern for each period defined by the vectors (h, g), (−g, h). Therefore, the points are divided into groups each of which includes points whose global signal values (p3, p5) are equal to each other, and quantization is performed for each of the groups. Then, in each group, the global signal (p3, p5) which has an equal value in the group and representative elements (s3, s5) which are different for individual points in the group are quantized separately, and then resulting quantized values are added to calculate a quantized value. Subsequently, description is given of the quantization.

First, a procedure of calculating quantization values (pq3, pq5) of global signals (p3, p5) is described. The structure of all of points which may possibly be taken by the global signals (p3, p5) includes transform points obtained by transforming, from the expression (17), integer lattice points with the matrix $$\begin{bmatrix} h & -g \\ g & h \end{bmatrix} \quad (19)$$

Therefore, for the global signals (p3, p5), reversible quantization performed in the 2×2 matrix transform described above is performed. First, in order to obtain the global signals (p3, p5), representative elements (s3, s5) are determined from values of transform coefficients X1, X7 based on a first numeric table 201. Details are hereinafter described. Next, s3, s5 are subtracted from X3, X5 to obtain global signals p3, p5 by adders 14, 15, respectively. Then, the aforementioned 2×2 reversible quantization based on the matrix of the expression (19) is performed by a transformer 202. Results of the 2×2 revisable quantization are multiplied by m3, m5 by multipliers 204 and 205 to calculate global quantization values (pq3, pq5). Here, m3, m5 represent dynamic ranges of the local quantization values sq3, sq5, respectively.

Subsequently, a procedure of calculating the quantization values (sq3, sq5) of the representative elements (s3, s5) is described. This does not directly calculate the quantization values from values of the representative elements (s3, s5), but determines the quantization values using a second numeric table 203 from quantization residuals (r1, r7) of the transform coefficients (X1, X7) represented by the following expression (20):

$$\begin{cases} r_1 = X_1 - k_1 X_{q1} \\ r_7 = X_7 - k_7 X_{q7} \end{cases} \quad (20)$$

Then, adders 16 and 17 add the local quantization values sq3, sq5 to the global quantization values pq3, pq5 to obtain quantization values (Xq3, Xq5), respectively. By the processing described above, all quantization values (Xq1, Xq7, Xq3, Xq5) are obtained.

Subsequently, a procedure of calculating the representative elements (s3, s5) from the values of the transform coefficients (X1, X7) based on the first numeric table 201 of FIG. 26 is described. The values of the representative elements (s3, s5) vary depending upon the values of the transform coefficients (X1, X7). However, where the values of g, h are given by the expression (18), if the remainders when components of the vector (gX1+hX7, gX7−hX1) are divided by the determinant of the matrix of the expression (19)

$$D4 = g^2 + h^2 \quad (21)$$

are equal to each other, then also the representative elements (s3, s5) are equal. In other words, where the remainder when x is divided by y is represented by mod(x, y), the representative elements (s3, s5) vary depending upon the value of the vector $$Z(X_1, X_7)=(\text{mod}(gX_1+hX_7, D_4), \text{mod}(gX_7-hX_1, D_4)) \quad (22)$$

Thus, in the first numeric table, the correspondence relationship between the vector z(X1, X7) and the representative elements (s3, s5) is described. Then, the value of the vector z(X1, X7) of the expression (22) is calculated first, and then referring to the first numeric table 201 of FIG. 26, the representative elements (s3, s5) are determined from the value of the vector z(X1, X7). Particularly if g and h are prime relative to each other, then if one of two components $$\begin{cases} z_1(X_1, X_7) = \mathrm{mod}(gX_1 + hX_7, D_4) \\ z_2(X_1, X_7) = \mathrm{mod}(gX_7 - hX_1, D_4) \end{cases} \tag{23}$$

of the vector z(X1, X7) is determined, then the representative elements (s3, s5) can be determined without determining the other components. Accordingly, in this instance, (s3, s5) can be determined by describing the corresponding relationship between one of two components of each of z1(X1, X7), z1(X1, X7) of the expression (23) and the representative elements (s3, s5) in the first numeric table.

Subsequently, a procedure of calculating the local quantization values (sq3, sq5) from the quantization residuals (r1, r7) based on the second numeric table 203 is described. First, local quantization of the transform coefficients (X3, X5) is described, and then a procedure of calculating (s3, s5) using the quantization residuals (r1, r7) is described.

As described above, when the transform coefficients X1, X7 are linearly quantized with the step sizes k1, k7, a resulting structure includes such k1k7 overlapping lattice point structures as represented by the expression (17) as seen in FIG. 29. Local quantization of the transform coefficients (X3, X5) groups k1k7 points whose global signals (p3, p5) are same into a group and allocates different quantization values (sq3, sq5) to representative elements of the k1k7 points. Quantization from the representative elements (s3, s5) into the local quantization values (sq3, sq5) can be realized by referring to a table prepared so as to describe the correspondence between them. However, since the set of values which may possibly be taken by the representative elements (s3, s5) depends upon the values of (Xq1, Xq7), a plurality of tables each describing such a correspondence are required. However, if the values of the representative elements (s3, s5) for the quantization representative values (X1, X7)=(k1Xq1, k7Xq7) are equal, then also the values of the representative elements (s3, s5) for the other (k1k7−1) different (X1, X7) in the same group coincide with them. Consequently, in this instance, a same correspondence table can be used. Accordingly, the number of those correspondence tables which must be prepared is a number equal to the number of values which may possibly be taken by (s3, s5). This value is equal to or smaller than D4. Then, a table is selected based on the representative elements (s3, s5) for the quantization representative values (k1Xq1, k7Xq7) and used for quantization.

Here, for such selection of a table, in place of the values of the representative elements (s3, s5) for the quantization representative values (k1Xq1, k7Xq7), the values of the expression (22) for the quantization representative values, that is, the values of the vector z(k1X1, k7X7) may be used. In other words, a table can be selected using the values of the vector z(k1X1, k7X7) as an index. By this, a table can be selected directly without calculating the values of the representative values for the quantization representative values using the first numeric table. It is to be noted that, if g and h are prime relative to each other, then only one of components z1(k1X1, k7X7) and z2(k1X1, k7X7) of the vector z(k1X1, k7X7) may be used as an index.

Further, in order to calculate the local quantization values (sq3, sq5), the quantization residuals (r1, r7) represented by the expression (20) may be used in place of the quantization representative values (s3, s5). This is because, if (Xq1, Xq7) is determined, then also the correspondence between (X1, X7) and (r1, r7) is determined. Since the set of values which may possibly be taken by the representative values (s3, s5) is different depending upon the quantization values (Xq1, Xq7), where the local quantization values (sq3, sq5) are determined directly from the representative elements (s3, s5), also the values of the representative values (s3, s5) must necessarily be written in the table. In contrast, since the set of values which may possibly be taken by the quantization residuals (r1, r7) does not depend upon the quantization values (Xq1, Xq7), this information need not be held. Therefore, the table may have a reduced size.

Subsequently, dequantization of a 4×4 matrix transform is described. First, a construction of a 4×4 inverse transformer of the system proposed by the inventor of the inventor of the present application is shown in FIG. 27. Referring to FIG. 27, in the 4×4 inverse transformer, quantization values (Xq1, Xq7, Xq3, Xq5) are dequantized to obtain (X1, X7, X3, X5), and then the dequantization values (X1, X7, X3, X5) are inverse transformed as given by the following expression (24) inverse to the expression (16) to obtain an integer vector (u4, u5, u6, u7).

$$\begin{bmatrix} u_4 \\ u_5 \\ u_6 \\ u_7 \end{bmatrix} = \begin{bmatrix} a_1 & a_7 & a_3 & a_5 \\ a_7 & -a_1 & -a_5 & a_3 \\ a_3 & -a_5 & -a_7 & -a_1 \\ a_5 & a_3 & -a_1 & a_7 \end{bmatrix}^{-1} \begin{bmatrix} X_1 \\ X_7 \\ X_3 \\ X_5 \end{bmatrix} \tag{24}$$

Subsequently, the dequantization from the quantization values (Xq1, Xq7, Xq3, Xq5) to the transform coefficients (X1, X7, X3, X5) is described. Also this is performed separately for (Xq1, Xq7) and (Xq3, Xq5).

The quantization values (Xq1, Xq7) are first multiplied by k1, k7 by multipliers 34, 35 to obtain quantization representative values (k1Xq1, k7Xq7), respectively. Then, quantization residuals (r1, r7) are added to the quantization representative values (k1Xq1, k7Xq7) by adders 36, 37 to calculate (X1, X7), respectively. The quantization residuals (r1, r7) are calculated from local quantization values (sq3, sq5) calculated by a procedure which will be hereinafter described using a third numeric table 211. The third numeric table 211 is a table which describes correspondences reverse to those of the second numeric table of FIG. 26. Then, similarly as in the reversible transformer of FIG. 26, when the third numeric table 211 is to be referred to, the values of the vector z(X1, X7) of the expression (22) for the quantization representative values (k1Xq1, k7Xq7), that is, the values of the vector z(k1Xq1, k7Xq7), are used as an index. It is to be noted that, also in this instance, if g and h are prime relative to each other, then only one of two components z1(k1Xq1, k7Xq7) and z2(k1Xq1, k7Xq7) of the vector z(k1Xq1, k7Xq7) may be used as an index.

Meanwhile, the quantization values Xq3, Xq5 are first divided by m3, m5 by integer dividers 212, 213 to obtain quotients pq3, pq5 and remainders sq3, sq5, respectively once the local quantization values (sq3, sq5) are calculated, transform coefficients (X1, X7) can be calculated as described above. Then, a dequantizer 210 dequantizes the quotients (pq3, pq5) based on the matrix of the expression (19) to obtain global signals (p3, p5). Then, from the transform coefficients (X1, X7) calculated already, representative elements (s3, s5) are determined using a fourth numeric table 214 equivalent to the first numeric table 201 of FIG. 26. Adders 38, 39 add the global signals (p3, p5) to the representative elements (s3, s5) to obtain transform coefficients (X3, X5), respectively. By the procedure described above, dequantization is completed and the transform coefficients (X1, X7, X3, X5) are obtained. Quantization and dequantization of a 4×4 matrix transform are such as described above.

By performing reversible quantization of a 2×2 or 4×4 matrix transform described above after each transform of the expressions (4) to (12) as seen in FIG. 22, redundancies included in results of transform can be removed. As a result, reversible coding can be realized without deteriorating the coding efficiency. Further, by suitably adjusting the quantization period N1 and the dequantization period M1, transform coefficients of eight-element reversible discrete cosine transform obtained finally can be made to approach those of the original discrete cosine transform.

One of problems of the conventional eight-element reversible discrete cosine transform described above resides in that it is not sufficiently compatible with the original eight-element discrete cosine transform. In particular, the quality of a reproduction signal obtained when a signal coded using eight-element reversible discrete cosine transform is decoded using the original eight-element inverse discrete cosine transform or when reverse decoding is performed is not sufficiently high.

The reason is that the differences (hereinafter referred to as errors) between transform coefficients of the conventional eight-element reversible discrete cosine transform and transform coefficients of the original eight-element discrete cosine transform are not small. This arises from the fact that the differences between Xq1, Xq7, Xq3, Xq5 obtained by 4×4 reversible quantization by the transformer 168 of FIG. 22 and X1, X7, X3, X5 obtained by transform by the transformer 188 shown in FIG. 24 are not small. While the errors of the transform coefficients may be caused by three different factors including errors originating from a difference in dynamic range, errors originating from quantization which uses a table and approximate errors caused by integer transform, in the conventional reversible quantization based on a 4×4 matrix transform described above, global quantization of (X3, X5) is performed using a table as described above, and then resulting values are multiplied by m3, m5 as seen from FIG. 26. As a result, quantization errors arising from use of the table are amplified to m3, m5 times, thereby increasing the errors.

SUMMARY OF THE INVENTION

It is an object of the present invention to provide a transform coding system wherein transform coefficients of reversible discrete cosine transform are made to approach original discrete cosine transform coefficients to improve the compatibility of the reversible discrete cosine transform with the original discrete cosine transform.

More particularly, the object of the present invention resides in provision of a transform coding system which improves the quality of a reproduction signal obtained when a signal coded using reversible discrete cosine transform is decoded using the original discrete cosine transform.

In order to attain the objects described above, according to a first aspect of the present invention, there is provided a reversible transform coding system which quantizes an original signal using a reversible transformer which effects reversible discrete cosine transform and wherein the reversible transformer reversibly transforms an integer four-element vector (u4, u5, us, u7) of the original signal into quantization values (Xq1, Xq7, Xq3, Xq5), the reversible transformer including means for linearly transforming the integer four-element vector (u4, u5, u6, u7) with the 4×4 integer matrix of the expression (16) to obtain transform coefficients (X1, X7, X3, X5), means for linearly quantizing the transform coefficients X1, X7 with step sizes of natural numbers k1, k7 to obtain quantization values Xq1, Xq7 and quantization residuals r1, r7, respectively, means for determining representative elements (s3, s5) from a first numeric table using the transform coefficients (X1, X7) or the transform coefficients (X3, X5), means for subtracting the representative elements (s3, s5) from the transform coefficients (X3, X5) to calculate global signals (p3, p5), means for linearly quantizing components p3, p5 of the global signals (p3, p5) with step sizes of real numbers L3, L5 to obtain global quantization values pq3, pq5, respectively, means for determining local quantization values (sq3, sq5) from the quantization residuals (r1, r7) based on a second numeric table, and means for adding the local quantization values (sq3, sq5) to the global quantization values (pq3, pq5) to obtain quantization values (Xq3, Xq5) and supplying the quantization values (Xq3, Xq5) as quantization values for the transform coefficients (X3, X5).

In the conventional reversible transform system described hereinabove with reference to FIG. 26, quantization defined by a table is performed by the transformer 202, and quantization errors produced in the quantization are amplified to m3, m5 times by the multipliers 204, 205, respectively. Therefore, there is a tendency that the differences between the values of the transform coefficients Xq3, Xq5 obtained thereby and transform coefficients X3, X5 obtained by the transformer 188 of the original discrete cosine transform shown in FIG. 24 become large. However, with the reversible transform coding system, since global quantization values of transform coefficients X3, X5 are calculated by linear quantization, the values of Xq3, Xq5 obtained are near to the transform coefficients X3, X5 obtained by the transformer 188.

According to a second aspect of the present invention, there is provided a reversible transform coding system which includes a reversible transformer which inversely transforms quantization values (Xq1, Xq7, Xq3, Xq5) into an integer four-element vector (u4, u5, u8, u7), the reversible transformer including means for calculating global signals (p3, p5) and local quantization values (sq3, sq5) from the quantization values (Xq3, Xq5), means for determining quantization residuals (r1, r7) from the local quantization values (sq3, sq5) based on a third numeric table, means for multiplying the quantization values (Xq1, Xq7) by natural numbers k1, k7 and adding the quantization residuals (r1, r7) to the products to obtain transform coefficients (X1, X7), respectively, means for determining representative elements (s3, s5) from the transform coefficients X1, X7 based on a fourth numeric table, means for adding the representative elements (s3, s5) to the global signals (p3, p5) to obtain transform coefficients (X3, X5), and means for linearly transforming the transform coefficients (X1, X7, X3, X5) with an inverse matrix to the 4×4 matrix of the expression (16) to obtain the integer four-element vector (u4, u5, u6, u7). The reversible transform coding system provides inverse transform to the transform of the reversible transform coding system of the first aspect of the present invention. Reversible transform can be achieved by utilizing both of the reversible transform coding systems.

The means for calculating global signals (p3, p5) and local quantization values (sq3, sq5) from the quantization values (Xq3, Xq5) may include means for calculating global signal candidates (p3$^{(\emptyset)}$, p5$^{(\emptyset)}$) from the quantization values (Xq3, Xq5) based on two dimensional division with the matrix of the expression (19) where g, h are integers which are given, from integers a1, a3, a5, a7, by g=a1$^2$−a7$^2$+2a3a5, h=a3$^2$−a5$^2$+2a1a7, respectively, means for adding global signal differences ($\Delta$p3$^{(1)}$, $\Delta$p5$^{(1)}$, $\Delta$p3$^{(2)}$, $\Delta$p5$^{(2)}$), ($\Delta$p3$^{(3)}$, $\Delta$p5$^{(3)}$) given in advance to the global signal candidates (p3$^{(\emptyset)}$, p5$^{(\emptyset)}$) to calculate global signal candidates (p3$^{(1)}$, p5$^{(1)}$), (p3$^{(2)}$, p5$^{(2)}$), (p3$^{(3)}$, p5$^{(3)}$), respectively, means for linearly quantizing the global signal candidates p3$^{(\emptyset)}$, p5$^{(\emptyset)}$ with step sizes of real numbers L3, L5 to obtain global quantization value candidates pq3$^{(\emptyset)}$, pq5$^{(\emptyset)}$ and subtracting the global quantization value candidates pq3$^{(\emptyset)}$, pq5$^{(\emptyset)}$ from the quantization values (Xq3, Xq5) to obtain local quantization value candidates sq3$^{(\emptyset)}$, sq5$^{(\emptyset)}$, means for linearly quantizing the global signal candidates p3$^{(1)}$, p5$^{(1)}$ with the step sizes of the real numbers L3, L5 to obtain global quantization value candidates pq3$^{(1)}$, pq5$^{(1)}$ and subtracting the global quantization value candidates pq3$^{(1)}$, pq5$^{(1)}$ from the quantization values (Xq3, Xq5) to obtain local quantization value candidates sq3$^{(1)}$, sq5$^{(1)}$, means for linearly quantizing the global signal candidates p3$^{(2)}$, p5$^{(2)}$ with the step sizes of the real numbers L3, L5 to obtain global quantization value candidates pq3$^{(2)}$, pq5$^{(2)}$ and subtracting the global quantization value candidates pq3$^{(2)}$, pq5$^{(2)}$ from the quantization values (Xq3, Xq5) to obtain local quantization value candidates sq3$^{(2)}$, sq5$^{(2)}$, means for linearly quantizing the global signal candidates p3$^{(3)}$, p5$^{(3)}$ with the step sizes of the real numbers L3, L5 to obtain global quantization value candidates pq3$^{(3)}$, pq5$^{(3)}$ and subtracting the global quantization value candidates pq3$^{(3)}$, pq5$^{(3)}$ from the quantization values (Xq3, Xq5) to obtain local quantization value candidates sq3$^{(3)}$, sq5$^{(3)}$, and means for selecting values which may possibly be local quantization values from among the local quantization value candidates (sq3$^{(\emptyset)}$, sq5$^{(\emptyset)}$), (sq3$^{(1)}$, sq5$^{(1)}$, (sq3$^{(2)}$, sq5$^{(2)}$, (sq3$^{(3)}$, sq5$^{(3)}$, setting the selected values to the local quantization values (sq3, sq5) and setting the global signal candidates corresponding to the local quantization values (sq3, sq5) to the global signals (p3, p5).

Alternatively, the means for calculating global signals (p3, p5) and local quantization values (sq3, sq5) from the quantization values (Xq3, Xq5) may include means for calculating global signal candidates (p3$^{(\emptyset)}$, p5$^{(\emptyset)}$ from the quantization values (Xq3, Xq5) based on two dimensional division with the matrix of the expression (19) where g, h are integers which are given, from integers a1, a3, a5, a7, by g=a$^2$−a7$^2$+2a3a5, h=a3$^2$−a5$^2$+2a1a7, respectively, means for linearly quantizing the global signal candidates (p3$^{(\emptyset)}$, p5$^{(\emptyset)}$) with step sizes of real numbers L3, L5 to obtain global quantization value candidates (pq3$^{(\emptyset)}$, pq5$^{(\emptyset)}$ and quantization residuals (r3$^{(\emptyset)}$, r5$^{(\emptyset)}$), means for subtracting the global quantization value candidates (pq3$^{(\emptyset)}$, pq5$^{(\emptyset)}$) from the quantization values (Xq3, Xq5) to obtain local quantization value candidates (sq3$^{(\emptyset)}$, sq5$^{(\emptyset)}$), means for determining an index I from the quantization residuals (r3$^{(\emptyset)}$, r5$^{(\emptyset)}$, means for determining local quantization values (sq3, sq5) and global difference signals (Δp3, Δp5) from the local quantization value candidates (sq3$^{(\emptyset)}$, sq5$^{(\emptyset)}$) based on a fifth numeric table selected using the index I, and means for adding the global difference signals (Δp3, Δp5) to the global signal candidates (p3$^{(\emptyset)}$, p5$^{(\emptyset)}$) to calculate the global signals (p3, p5). This provides simpler means for calculating the global signals (p3, p5) and the local quantization values (sq3, sq5) from the quantization values (Xq3, Xq5).

The means for calculating global signal candidates (p3$^{(\emptyset)}$, p5$^{(\emptyset)}$) from the quantization values (Xq3, Xq5) may include means for multiplying the quantization values Xq3, Xq5 by the real numbers L3, L5 to obtain quantization representative values (Xq3L3, Xq5L5), respectively, means for transforming the quantization representative values (Xq3L3, Xq5L5) with an inverse matrix to the matrix of the expression (19) represented using g, h which are given, from integers a1, a3, a5, a7, by g=a1$^2$−a7$^2$+2a3a5, h=a3$^2$−a5$^2$+2a1a7, respectively, to obtain inverse transform points (w3, w5), means for raising fractions of the inverse transform points w3, w5 to unit or discarding fractions of the inverse transform points w3, w5 to convert the inverse transform points w3, w5 into integers w3', w5', and means for transforming a vector (w3', w5') composed of the integers w3', w5' with the matrix of the expression (19) to obtain the global signal candidates (p3$^{(\emptyset)}$, p5$^{(\emptyset)}$.

According to a third aspect of the present invention, there is provided a reversible transform coding system which quantizes an original signal using a reversible transformer which effects reversible discrete cosine transform and wherein the reversible transformer produces eight transform coefficients of quantization values Xq0, Xq1, Xq2, Xq3, Xq4, Xq5, Xq6, Xq7 from eight signals of x0, x1, x2, x3, x4, x5, x6, x7, the reversible transformer including means for performing transform with a matrix $$\begin{bmatrix} 1 & 1 \\ 1 & -1 \end{bmatrix} \quad (25)$$

for the signals (x0, x7), (x1, x6), (x3, x4), (x2, x5) and reversible quantization for the results to obtain quantization values (u0, u4), (u2, u6), (u1, u5), (u3, u7), means for performing transform with the matrix of the expression (25) for the quantization values (u0, u1), (u2, u3) and reversible quantization for the results to obtain quantization values (v0, v1), (v2, v3), means for performing transform with the matrix of the expression (25) for the quantization values (v0, v2) and reversible quantization for the results to obtain quantization values and setting the quantization values as the quantization values (Xq0, Xq4), means for performing transform with an integer matrix given by $$\begin{bmatrix} a_2 & a_6 \\ a_6 & -a_2 \end{bmatrix} \quad (26)$$

where a2 and a6 are integers for the quantization values (v1, v3) and reversible quantization for the results to obtain quantization values and setting the quantization values as the quantization values (Xq2, Xq6), and means for performing reversible transform performed in the reversible transform coding system of the first aspect of the present invention for the quantization values (u4, u5, u6, u7) to obtain the quantization values (Xq1, Xq7, Xq3, Xq5).

In the reversible transform coding system, transform with a 4×4 matrix of the conventional eight-element reversible discrete cosine transform is replaced with the transform by the reversible transform coding system according to the first aspect of the present invention described above. Consequently, eight-element reversible discrete cosine transform by which values nearer to transform coefficients of the original eight-element discrete cosine transform than those of the conventional system can be achieved. When a signal coded using this eight-element reversible discrete cosine transform is to be decoded, if inverse transform to this transform is used, then the original signal can naturally be reconstructed completely. However, even where the signal is decoded using the conventional eight-element discrete cosine inverse transform, a signal near to the original signal can be obtained. In other words, the compatibility with the conventional discrete cosine transform is improved.

According to a fourth aspect of the present invention, there is provided a reversible transform coding system which includes a reversible transformer which produces eight signals of x0, x1, x2, x3, x4, x5, x6, x7 from eight transform coefficients of quantization values Xq0, Xq1, Xq2, Xq3, Xq4, Xq5, Xq6, Xq7, the reversible transformer including means for performing inverse transform as recited in claim 2 for the quantization values Xq1, Xq7, Xq3, Xq5 to obtain a vector of quantization values (u4, u5, u6, u7), means for performing dequantization based on the matrix of the expression (26) where a2 and a6 are integers for the quantization values (Xq2, Xq6) and transform for the dequantized values with an inverse matrix to the matrix to obtain a vector of quantization values (v1, v3), means for performing dequantization based on the matrix of the expression (25) for the quantization values (Xq0, Xq4) and transform for the dequantized values with an inverse matrix to the matrix to obtain a vector of quantization values (v0, v2), means for performing dequantization based on the matrix of the expression (25) for the quantization values (v0, v1), (v2, v3) and transform for the dequantized values with an inverse matrix to the matrix to obtain vectors of quantization values (u0, u1), (u2, u3), respectively, and means for performing dequantization based on the matrix of the expression (25) for the quantization values (u0, u4), (u2, u6), (u1, u5), (u3, u7) and transform for the dequantized values with an inverse matrix to the matrix to obtain the signals (x0, x7 ), (x1, x6), (x3, x4), (x2, x5), respectively. This provides inverse transform to that of the reversible transform coding system according to the third aspect of the present invention described above. If both of the reversible transform coding systems are employed, an eight-element reversible discrete cosine transform system by which values nearer to transform coefficients of the original eight-element discrete cosine transform than those of the conventional system can be obtained can be constructed.

Preferably, the reversible transform coding system according to the third aspect of the present invention is constructed such that the integers a1, a3, a5, a7 are 5, 4, 3, 1, respectively, and the integers a2, a6 are 12, 5, respectively. Where the specific values are used, values particularly near to transform coefficients of the original eight-element discrete cosine transform can be obtained.

Preferably, the reversible transform coding system according to the fourth aspect of the present invention is constructed such that the integers a1, a3, a5, a7 are 5, 4, 3, 1, respectively, and the integers a2, a6 are 12, 5, respectively. This provides inverse transform to that of the preceding reversible transform coding system.

Preferably, the reversible transform coding system according to the third aspect of the present invention is constructed such that the matrix of the expression (26) is set such that the inters a2, as are 12, 5, respectively, and the reversible quantization is linear quantization with a step size of 13. This eliminates use of a quantization correspondence table in quantization of the means for performing transform.

Preferably, the reversible transform coding system according to the fourth aspect of the present invention is constructed such that the reversible transformer includes, in place of the means for performing dequantization for the quantization values (Xq2, Xq6) based on the matrix of the expression (26) where a2 and a6 are integers and inverse transform with the matrix for the dequantized values to obtain a vector of quantization values (v1, v3), means for multiplying the quantization values (Xq2, Xq6) by 13 to obtain a vector, linearly transforming the vector with an inverse matrix to the matrix given above obtained where the integers a2, a6 are 12, 5, respectively, and rounding results of the linear transform to obtain the quantization values (v1, v3). This provides inverse transform to that of the preceding reversible transform coding system. In this dequantization, no correspondence table is required.

In the reversible transform coding systems described above, transform coefficients to be obtained are allowed to approach transform coefficients of the original discrete cosine transform by suitably adjusting such parameters as a quantization period and a dequantization period. However, there is a limitation to such approaching, and the dynamic ranges of transform coefficients obtained are different a little from the dynamic ranges of transform coefficients of the original discrete cosine transform by all means. Therefore, reversible transform coding systems of the present invention described below are constructed so that the quality of a reconstructed signal obtained when decoding is performed using the original discrete cosine transform is improved.

It is to be noted that the reversible discrete cosine transform employed in the reversible transform coding systems described above can be applied also to reversible discrete cosine transform employed the following reversible transform coding systems, and this application achieves further improvement of the quality of a reconstructed signal.

According to a fifth aspect of the present invention, there is provided a reversible transform coding system for quantizing a picture signal using a reversible transformer which effects reversible discrete cosine transform, comprising means for calculating a difference between a dynamic range of a transform coefficient obtained by the reversible transformer and a dynamic range of a transform coefficient of discrete cosine transform according to the JPEG and storing a JPEG compatibility quantization table with which the difference is small, and means for variable length coding for transform coefficients obtained by the reversible transformer and the values of the JPEG compatibility quantization table into a coded signal and outputting the coded signal.

While a conventional picture coding system which employs reversible discrete cosine transform does not use a quantization table, the reversible transform coding system according to the fifth aspect of the present invention employs a quantization table for compensation for a difference in dynamic range. Consequently, the reversible transform coding system can improve the compatibility with the JPEG (Joint Photographic Coding Experts Group) which is international standards for picture coding based on discrete cosine transform. Further, the reversible transform coding system can be realized simply only by preparing a storage apparatus for storing the fixed quantization table.

According to a sixth aspect of the present invention, there is provided a reversible transform coding system for coding a moving picture signal using a reversible transformer which effects reversible discrete cosine transform, comprising means for performing motion estimation between an already coded picture and a coding object picture to obtain a motion vector, means for performing motion compensation using the motion vector to produce a predicted picture from the already coded picture, means for subtracting the predictive picture from the coding object picture to produce a predictive error picture, means for performing reversible discrete cosine transform for the predictive error picture to calculate transform coefficients, means for calculating a difference between a dynamic range of a transform coefficient obtained by the reversible transformer and a dynamic range of a transform coefficient of discrete cosine transform according to the MPEG and storing an MPEG compatibility quantization matrix with which the difference is small, and means for variable length coding for the transform coefficients, the MPEG compatibility quantization matrix and the motion vector into a coded signal and outputting the coded signal.

Similarly to the reversible transform coding system according to the fifth aspect of the present invention, the reversible transform coding system according to the sixth aspect employs a quantization matrix for compensation for a difference in dynamic range, and consequently, it can improve the compatibility with the MPEG which is international standards for picture coding based on discrete cosine transform. Further, the reversible transform coding system can be realized simply only by preparing a storage apparatus for storing the fixed quantization matrix values.

According to a seventh aspect of the present invention, there is provided a reversible transform coding system for quantizing a picture signal using a reversible transformer which effects reversible discrete cosine transform, comprising means for performing discrete cosine transform for the picture signal to obtain discrete cosine transform coefficients, JPEG compatibility quantization table production means for calculating elements of the table with which differences between of transform coefficients obtained by the reversible transformer and the discrete cosine transform coefficients are small to produce a JPEG compatibility quantization table, and means for variable length coding for transform coefficients calculated by the reversible transformer and the values of the JPEG compatibility quantization table into a coded signal and outputting the coded signal.

With the reversible transform coding system, since values of the quantization table for compensation for a difference between the transform coefficients of reversible transformer and the discrete cosine transform coefficient are sequentially calculated, the compatibility with the JPEG can be improved adaptively compared with an alternative system which employs a fixed quantization table.

According to an eighth aspect of the present invention, there is provided a reversible transform coding system for coding a moving picture signal, comprising means for performing motion estimation between an already coded picture and a coding object picture to obtain a motion vector, means for performing motion compensation using the motion vector to produce a first predictive picture from the already coded picture, means for subtracting the first predictive picture from the coded object picture to produce a first predictive error picture, means for performing reversible discrete cosine transform for the first predictive error picture to calculate reversible discrete cosine transform coefficients, means for subtracting a second predictive picture from the coding object picture to produce a second predictive error picture, means for performing discrete cosine transform for the second predictive error signal to calculate discrete cosine transform coefficients, MPEG compatibility quantization matrix production means for calculating elements of the matrix with which differences between the reversible discrete cosine transform coefficients and the discrete cosine transform coefficients are small to produce an MPEG compatibility quantization matrix and outputting a dequantized reversible discrete cosine transform coefficient when the MPEG compatibility quantization matrix is used, means for performing inverse discrete cosine transform for the dequantization values to calculate a predictive error reproduction picture, means for adding the second predictive picture to the predictive error reproduction picture to produce a reproduction picture, and means for performing motion compensation using the motion vector to produce the second predictive picture from the reproduction picture.

Also with the present reversible transform coding system, the compatibility with the MPEG can be improved adaptively compared with an alternative system which employs a fixed quantization matrix.

Preferably, the reversible transform coding system according to the seventh or eight aspect of the present invention is constructed such that, in order to decrease the amount of calculation processing in quantization and dequantization of transform coefficients, the JPEG compatibility quantization table production means or the MPEG compatibility quantization matrix production means includes means for calculating, from transform coefficients $Xq(i, j)$ of the reversible discrete cosine transform, values $X'(i, j)$ corresponding to results when values of the transform coefficients $Xq(i, j)$ prior to conversion into integers in dequantization are divided by the values of the quantization table or matrix, means for adding or subtracting a very small value to or from transform coefficients $XT(i, j)$ of the discrete cosine transform in accordance with values of the conversion coefficients $Xq(i, J)$ of the reversible discrete cosine transform to obtain values $X'T(i, j)$, means for producing a quantization table or matrix by calculation based on secondary moments regarding the values $X'(i, j)$ and the values $X'T(i, j)$, and means for dequantizing the transform coefficients of the reversible discrete cosine transform using the quantization table or matrix and outputting resulting dequantization values.

Preferably, the reversible transform coding system according to the ninth aspect of the present invention is constructed such that, in order to further improve the quality of a decoded picture, it further comprises, in addition to the JPEG compatibility quantization table production means or the MPEG compatibility quantization matrix production means, means for dequantizing the transform coefficients of the reversible discrete cosine transform with the values of the JPEG compatibility quantization table or the MPEG compatibility quantization matrix to obtain dequantization values, means for calculating, for each of the transform coefficients of the discrete cosine transform, a square mean of differences between the transform coefficient and the dequantization values, and means for correcting the values of the JPEG compatibility quantization table or the MPEG compatibility quantization matrix based on the square means and outputting the corrected JPEG compatibility quantization table or the MPEG compatibility quantization matrix.

Preferably, the reversible transform coding system according to the tenth aspect of the present invention is constructed such that means for performing reversible discrete cosine transform to calculate reversible discrete cosine transform coefficients performs eight-element reversible discrete cosine transform in a vertical direction and a horizontal direction for two-dimensional signals of an 8×8 block, and uses different quantization correspondence tables between any three stages and the remaining three stages out of six stages of reversible quantization based on a 2×2 matrix represented using 1, −1 which is performed when a DC component is to be calculated, to cancel the difference between in dynamic ranges DC component of the reversible discrete cosine transform and that of original discrete cosine transform.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 3(a), 3(b) and 3(c) are diagrammatic views illustrating determination of the values of quantization step sizes for global quantization to be used by a linear quantizer used in the reversible transformers of FIGS. 1(a) an 1(b) and 2;

FIG. 8(a) is a diagrammatic view illustrating an example of values which can be taken by a local quantization value, FIG. 8(b) is a diagrammatic view illustrating a relationship between a global signal and local quantization values when the value which can be taken by the local quantization value is such as illustrated in FIG. 8(a), and FIG. 8(c) is a diagrammatic view showing a fifth numeric table for the relationship illustrated in FIG. 8(b);

FIG. 11 is a diagrammatic view illustrating relationships between a global quantization value and a value obtained by adding a local quantization value to the global quantization value for different indices illustrated in FIG. 10;

FIGS. 12(a) to 12(d) are block diagrams showing different forms of a global signal candidate calculation circuit;

FIGS. 19(a) and 19(b) are graphs illustrating different relationships among global candidate points;

DESCRIPTION OF THE PREFERRED EMBODIMENTS

Figure 1A:
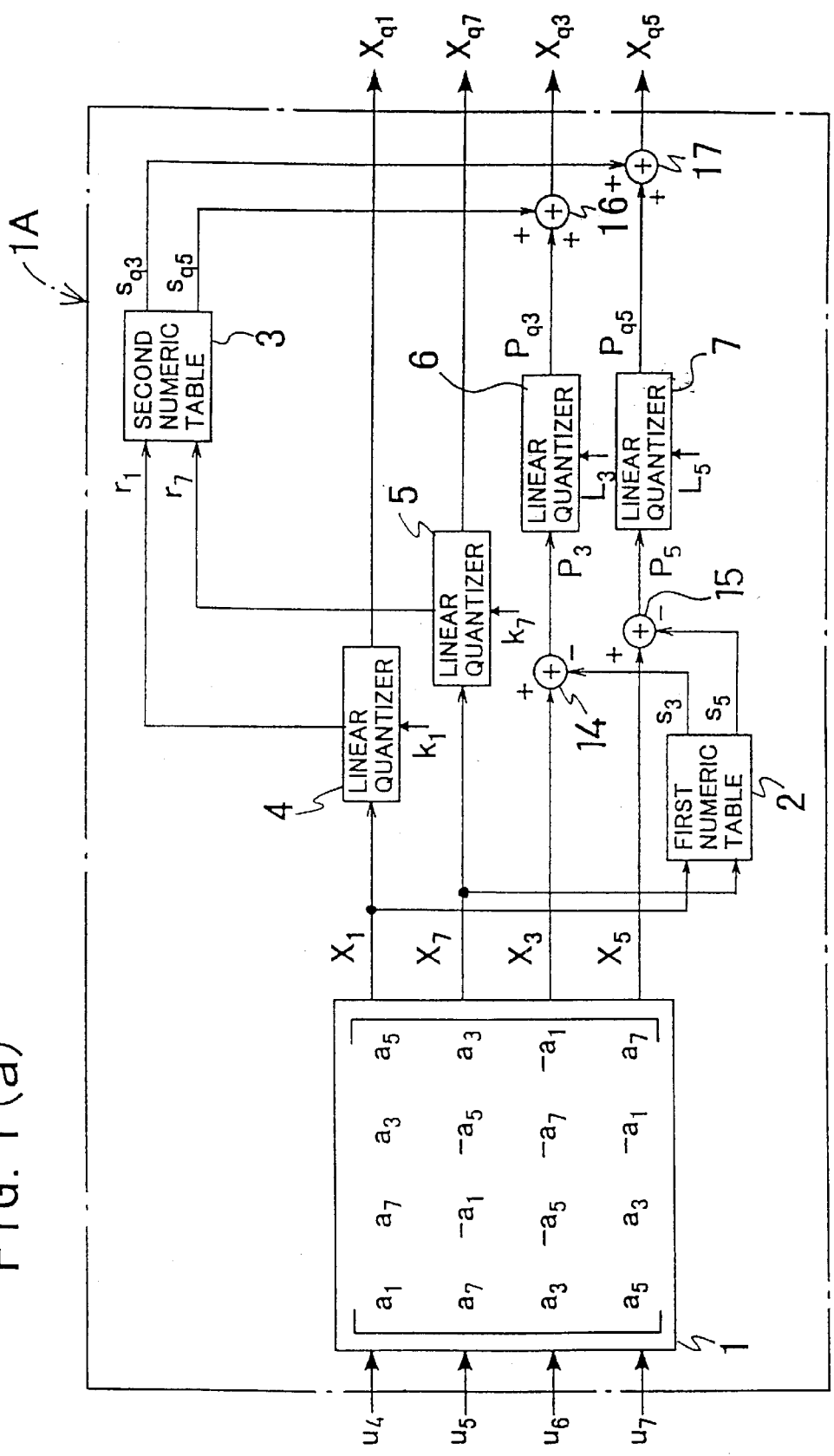
FIG. 1(*a*) is a block diagram of a reversible transformer to which the present invention is applied, and FIG. 1(*b*) is a diagrammatic view of linear quantizers used in the reversible transformer of FIG. 1(*a*)

Referring first to FIG. 1(a), there is shown a reversible transformer to which the present invention is applied. The reversible transformer is generally denoted at reversible transformer 1A and includes a transformer 1, linear quantizers 4, 5, 6 and 7, a first numeric table 2, a second numeric table 3, and adders 14, 15, 16 and 17 and performs transform and reversible quantization of an eight-element reversible discrete cosine transform with 4×4 matrices. More particularly, the reversible transformer 1A linearly transforms an integer vector (u4, u5, u6, u7) in accordance with the expression (16) and reversibly quantizes resulting transform coefficients (X1, X3, X5, X7).

The procedure of the transform and quantization is basically same as that of the 4×4 reversible transformer of the conventional example described hereinabove. In particular, the transform coefficients (X1, X3, X5, X7) obtained from the expression (16) are separated into (X1, X7) and (X3, X5), for which quantization is performed separately. In this instance, (X1, X7) are linearly quantized, and (X3, X5) are quantized making use of the fact that the relationship given by the expression (17) stands. In the quantization of (X3, X5), (X3, X5) are first divided into representative elements (s3, s5) and global signals (p3, p5)=(X3−s3, X5−s5), which are subsequently quantized individually, and then, the quantized values are finally added to calculate a quantization value.

Figure 1B:
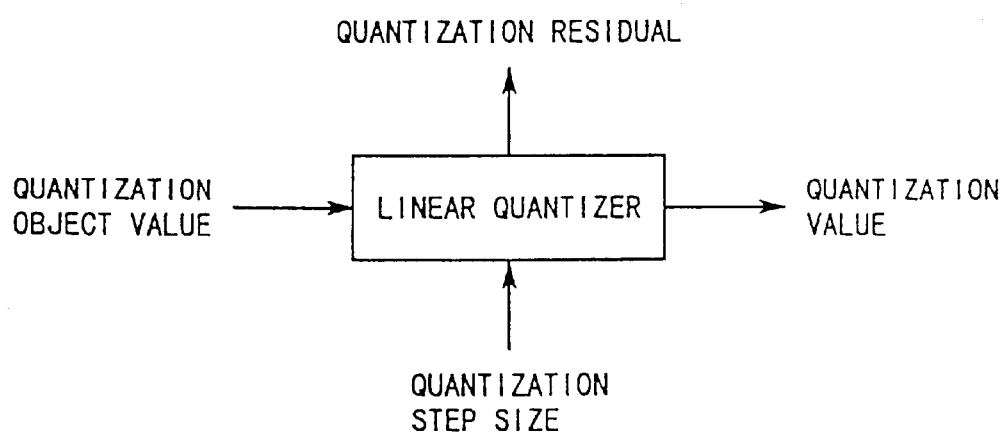

The reversible transformer 1A is described in more detail with reference to FIGS. 1(a) and 1(b). Input signals (u4, u5, u6, u7) are transformed into transform coefficients (X1, X7, X3, X5) in accordance with the expression (16). Then, the four transform coefficients are separated into (X1, X7) and (X3, X5), for which quantization is performed separately.

The transform coefficients X1, X7 are linearly quantized as described hereinabove. In particular, the transform coefficients X1, X7 are linearly quantized with step sizes k1, k7 by the linear quantizers 4, 5 to obtain quantization values Xq1, Xq7, respectively. Here, k1, k7 are natural numbers. Simultaneously, quantization residuals (r1, r7) given by the expression (20) are calculated. The values are used to calculate local quantization values of (X3, X5) as hereinafter described.

The transform coefficients X3, X5 are divided into representative elements (s3, s5) and global signals (p3, p5)= (X3−s3, X5−s5) of the expression (17), and the representative elements (s3, s5) and the global signals (p3, p5) are quantized individually. First, the representative elements (s3, s5) are calculated from the transform coefficients X1, X7 by the same procedure as that of the conventional example described hereinabove using the first numeric table 2. In particular, values of the vector z(X1, X7) given by the expression (22) are calculated, and from the values, representative elements (s3, s5) are calculated using the first numeric table 2. In the first numeric table 2, a correspondence between the vector z(X1, X7) and the representative elements is described. It is to be noted that, similarly as in the conventional example described above, where g and h are prime relative to each other, only one of the components z1(X1, X7) and z2(X1, X7) given by the expression (23) may be calculated. For example, in the first numeric table 2, a relationship between the component z1(X1, X7) and representative elements (s3, s5) is described. Then, the values of the component z1(X1, X7) are calculated and the first numeric table 2 is referred to determine the values of the representative elements (s3, s5). The representative elements (s3, s5) can be determined from the first numeric table 2 in this manner. Then, the representative elements s3, s5 are subtracted from the transform coefficients X3, X5 to calculate global signals p3, p5 by the adders 14, 15, respectively. Then, the thus calculated global signals p3, p5 are linearly quantized with step sizes L3, L5 by the linear quantizers 6 and 7 to calculate global quantization values pq3, pq5, respectively. Here, the step sizes L3, L5 are real numbers, and determination of the values of them is hereinafter described. The global quantization procedure is much different from the procedure of the conventional example described hereinabove. Meanwhile, local quantization values (sq3, sq5) are determined using the second numeric table 3 from the quantization residuals (r1, r7) similarly as in the procedure of the conventional example described hereinabove. The reason why the local quantization values (sq3, sq5) are determined from the quantization residuals (r1, r7) is such as described in the description of the conventional procedure. Finally, the local quantization values sq3, sq5 are added to the global quantization values pq3, pq5 to obtain quantization values (Xq3, Xq5) by the adders 16, 17, respectively. By this procedure, all of the quantization values (Xq1, Xq7, Xq3, Xq5) are obtained.

It is to be noted that, while, in the conventional example described hereinabove, a table is selected using the vector z(k1Xq1, k7Xq7) as an index, more generally a vector z(k1Xq1+r01, k7Xq7+r07) can be used as an index using (r01, r07) as a certain determined Integer vector. For example, the values of a vector z(k1Xq1+1, k7Xq7+1) or another vector z(k1Xq1+3, k7Xq7−2) can be used as an index. Further, if g and h are prime relative to each other, then only one of z1(k1Xq1+r01, k7Xq7+r07) and z2(k1Xq1+r01, k7Xq7+r07) which are components of the vector z(k1Xq1+r01, k7Xq7+r07) may be used as an index.

Figure 3A:
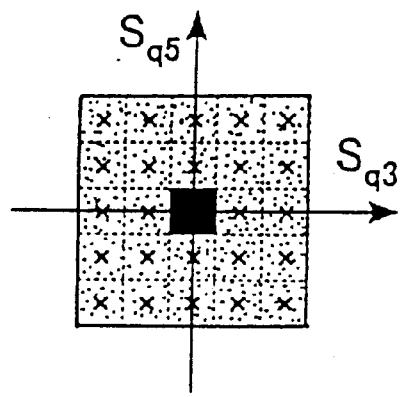
Figure 3B:
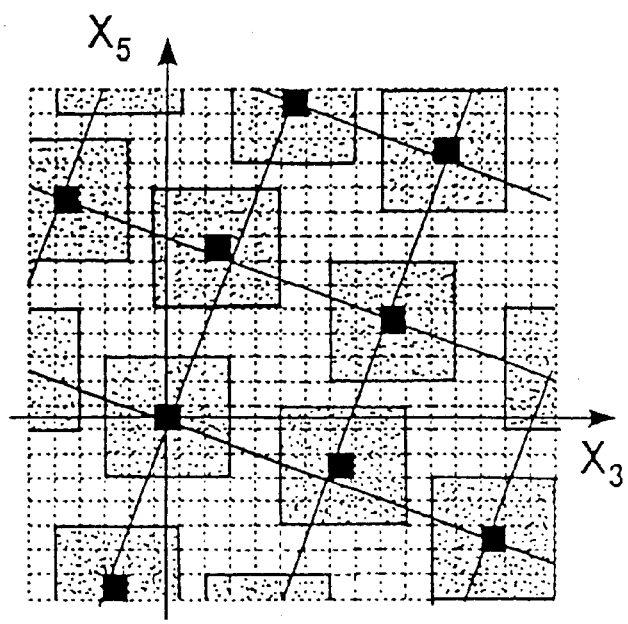

Subsequently, determination of the values of the quantization step sizes L3, L5 upon quantization from the global signals (p3, p5) to the global quantization values (pq3, pq5) is described. If the values of the step sizes L3, L5 are excessively high, then this disables definition of reversible quantization, but if they are excessively low, then this results in drop of the coding efficiency. This is described with reference to FIGS. 3(a) to 3(c). FIGS. 3(b) and 3(c) illustrate different manners of allocation of quantization values for different values of the step sizes L3, L5 where the range in which the local quantization values (sq3, sq5) are present is the range of ±2 as seen from FIG. 3(a). In FIGS. 3(a) to 3(c), each region surrounded by broken lines indicates a quantization cell. Each dark gray cell represents values which may make the global quantization values (pq3, pq5) while each light gray cell represents values which are obtained by adding local quantization values to the (global quantization values pq3, pq5), that is, values which may make the quantization values (Xq3, Xq5). Meanwhile, each white cell represents values which cannot make quantization values. In FIG. 3(b), since different quantization values from each other can be allocated to all of the values which can be taken by the transform coefficients (X3, X5), reversible quantization can be defined. However, since the values of the step sizes L3, L5 are excessively low, a large number of useless quantization points to which no transform point corresponds are produced, and a considerable amount of redundancies remains even after the quantization. This is not preferable from the point of view of the coding efficiency. On the other hand, in FIG. 3(c), since the values of the step sizes L3, L5 are excessively high, some of quantization values exhibit an overlap, and consequently, reversible transform cannot be defined. Therefore, for the case illustrated in FIGS. 3(a) to 3(c), the values of the step sizes L3, L5 must be set higher than those of FIG. 3(b) but lower than those of FIG. 3(c). Taking the coding efficiency into consideration, the values of the step sizes L3, L5 should be set to maximum values within a range in which no overlap appears in the correspondence of quantization values. However, where the quantization periods of the transform coefficients X3, X5 are represented by N3, N5, respectively, in order for the same quantization to be repeated in the quantization periods (N3, N5), the values of the step sizes L3, L5 must satisfy the following expression (27):

$$\begin{cases} L_3 = \dfrac{N_3}{M_3} \\ L_5 = \dfrac{N_5}{M_5} \end{cases} \quad (27)$$

where M3, M5 are natural numbers. Consequently, the values of the natural numbers M3, M5 with which no overlap occurs in a basic region of the size of N3×N5 should be calculated, and then the step sizes L3, L5 should be calculated in accordance with the expression (27).

Figure 26:
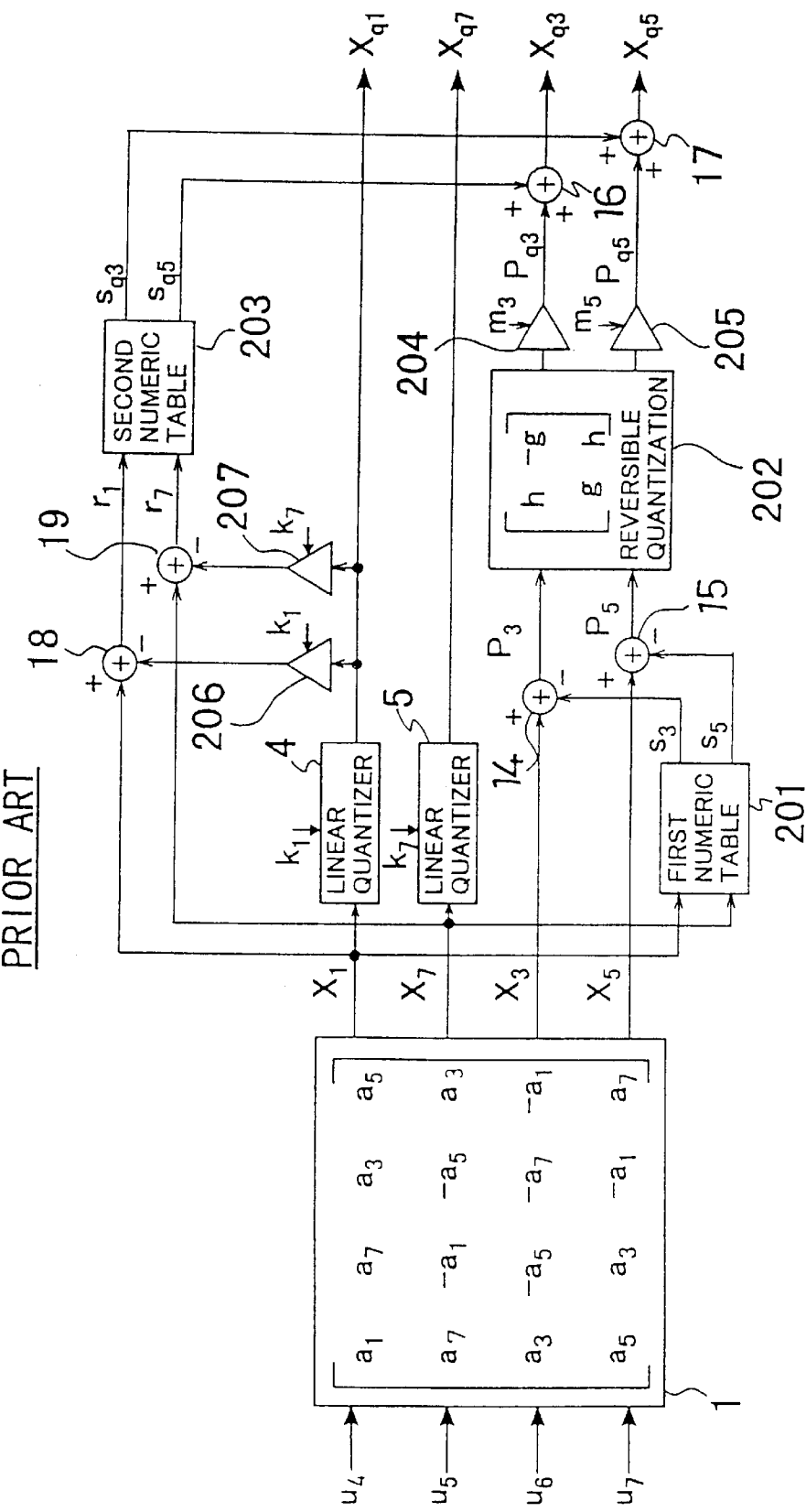
FIG. 26 is a block diagram of a 4×4 reversible transformer employed in the transform system of FIG. 22.
Figure 27:
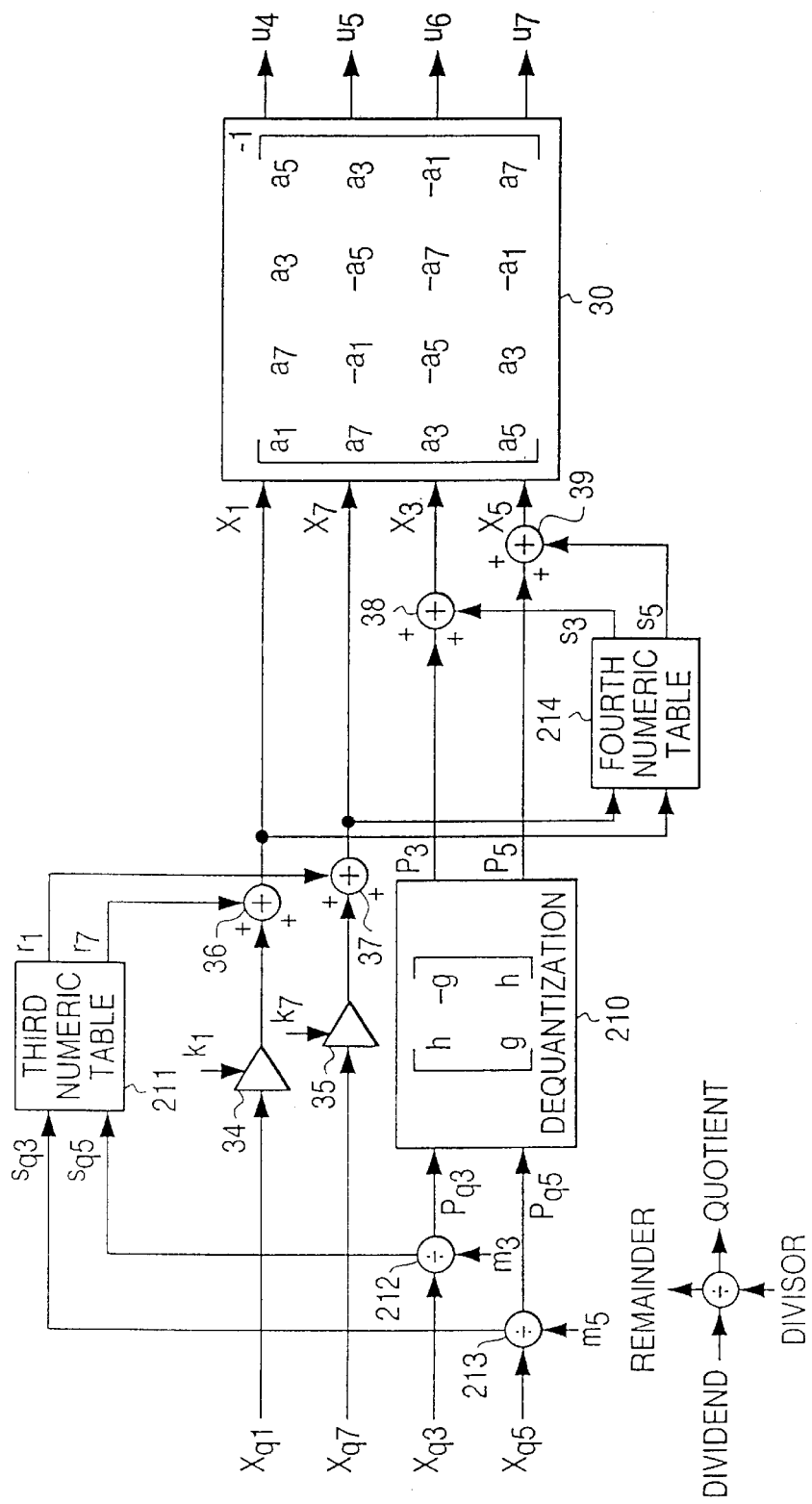
FIG. 27 is a block diagram of a 4×4 inverse transformer employed in the transform system of FIG. 23.
Figure 28:
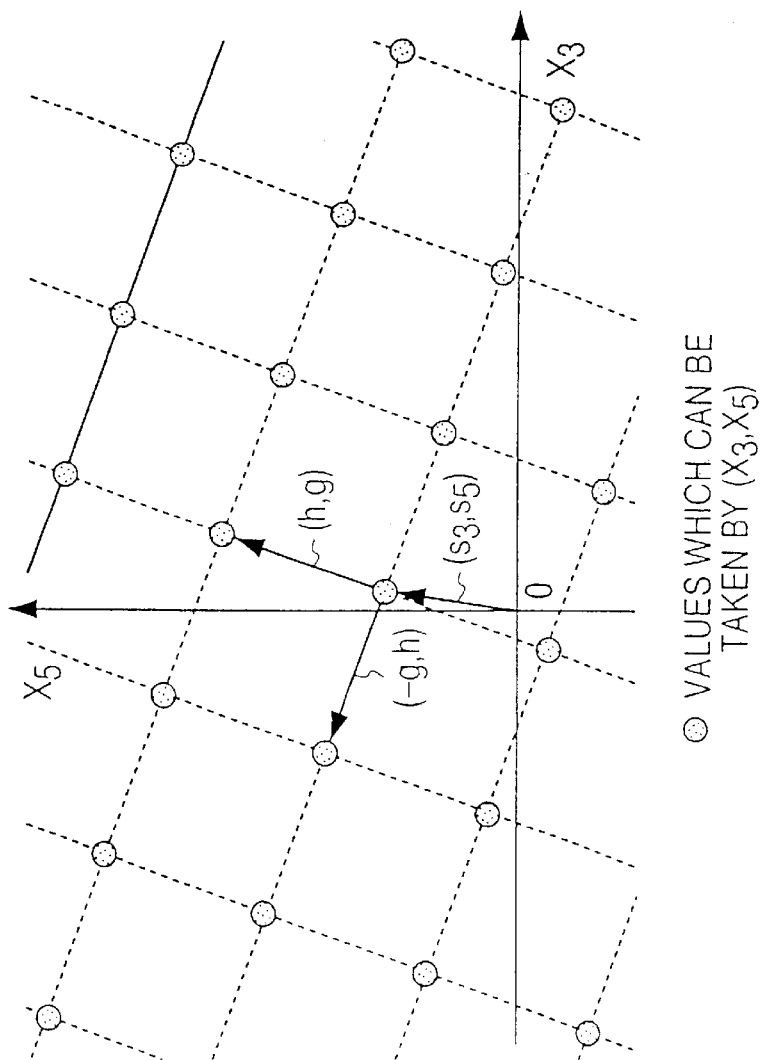
FIG. 28 is a diagrammatic view illustrating a structure of all values which can be taken by transform coefficients (X3, X5) when transform coefficients (X1, X7) are determined.
Figure 29:
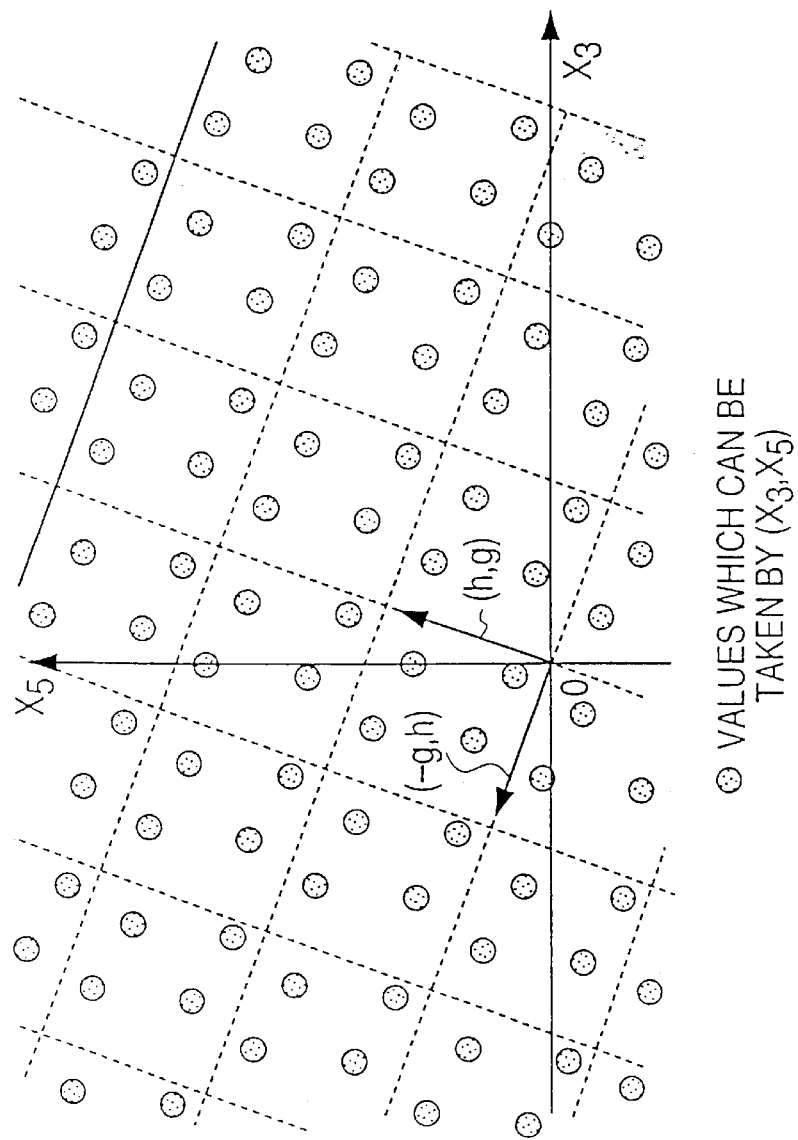
FIG. 29 is a diagrammatic view illustrating a structure of all values which can be taken by the transform coefficients (X3, X5) when quantization values Xq1, Xq7) are determined where both of quantization step sizes for transform coefficients X1, X7 are set to 2.
Figure 30:
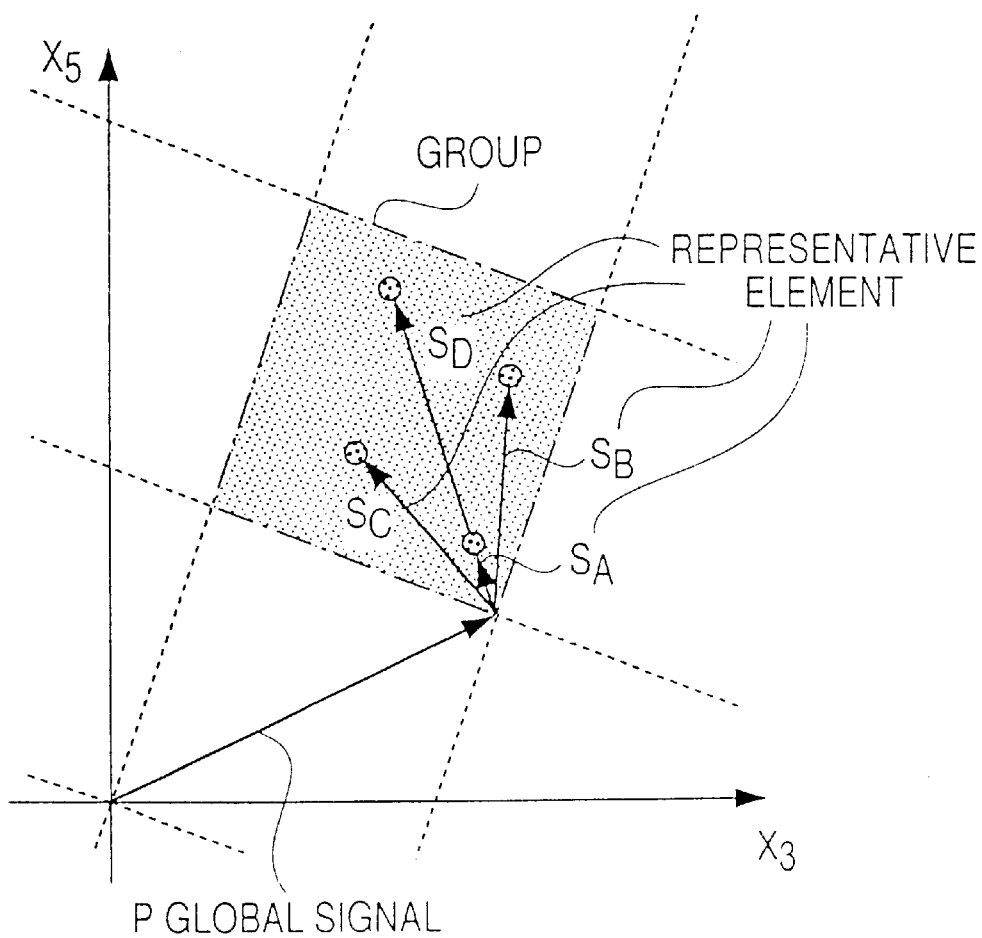
FIG. 30 is a diagrammatic view illustrating global quantization and local quantization of the transform coefficients (X3, X5)

The procedure of the present invention is more advantageous than the 4×4 reversible transform procedure of the conventional example resides in that, for global quantization of the transform coefficients (X3, X5), linear quantization is performed without using a table in which quantization is defined. In the system of the conventional example described above, since quantization errors arising from quantization defined in a table are amplified to m3 and m5 times as seen from FIG. 26, the quantization errors may possibly become so large that they exceed the range of quantization cells. In contrast, with the system of the present invention, quantization errors have values remaining within a range of quantization cells. Consequently, quantization errors which may be produced by global quantization can be reduced significantly, and transform coefficients obtained have values near to original discrete cosine transform coefficients.

Figure 2:
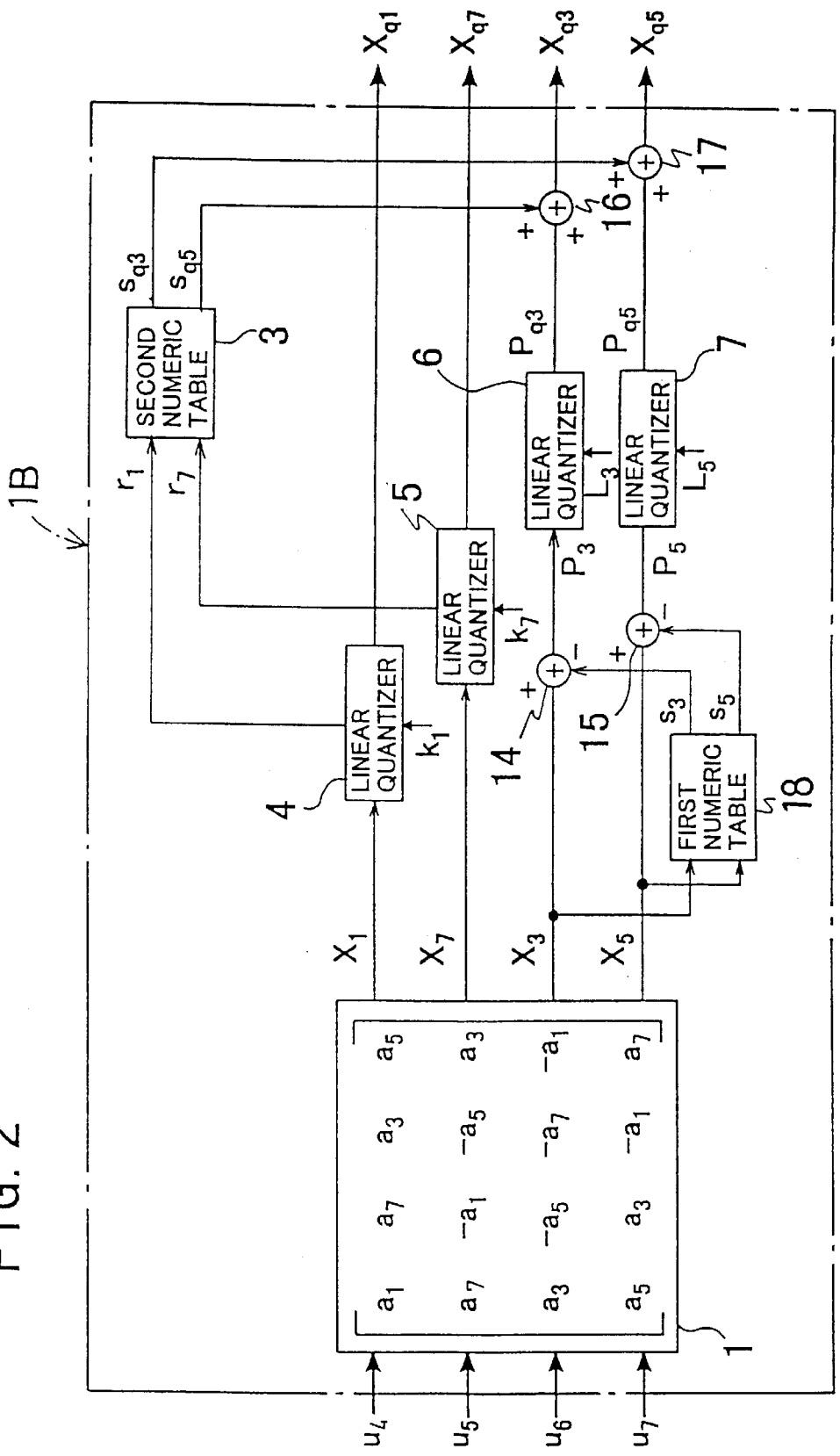
FIG. 2 is a block diagram of another reversible transformer to which the present invention is applied.

FIG. 2 shows a modified form of the reversible transformer. Referring to FIG. 2, the modified reversible transformer is generally denoted at 1B and is different from the reversible transformer 1A of FIG. 1 in that, in a first numeric table 18, representative elements (s3, s5) are calculated not from values of transform coefficients (X1, X7) but from values of transform coefficients (X3, X5). In this instance, a correspondence between values of a vector given by $$z'(X_3, X_5) \ (\mathrm{mod}(hX_3+gX_3, D_4), \mathrm{mod}(hX_5-gX_3, D_4)) \quad (28)$$

and values of the representative elements (s3, s5) is described in the first numeric table 18. The values of the representative elements (s3, s5) are determined by calculating a vector z'(X3, X5) and referring to a table using a value of the vector z'(X3, X5). It is to be noted that, where g and h are prime relative to each other, only one of components of the vector z'(X3, X5) may be calculated in order to calculate the representative elements (s3, s5). In this instance, a correspondence between the component and the representative elements (s3, s5) should be described in the first numeric table 18.

Figure 4:
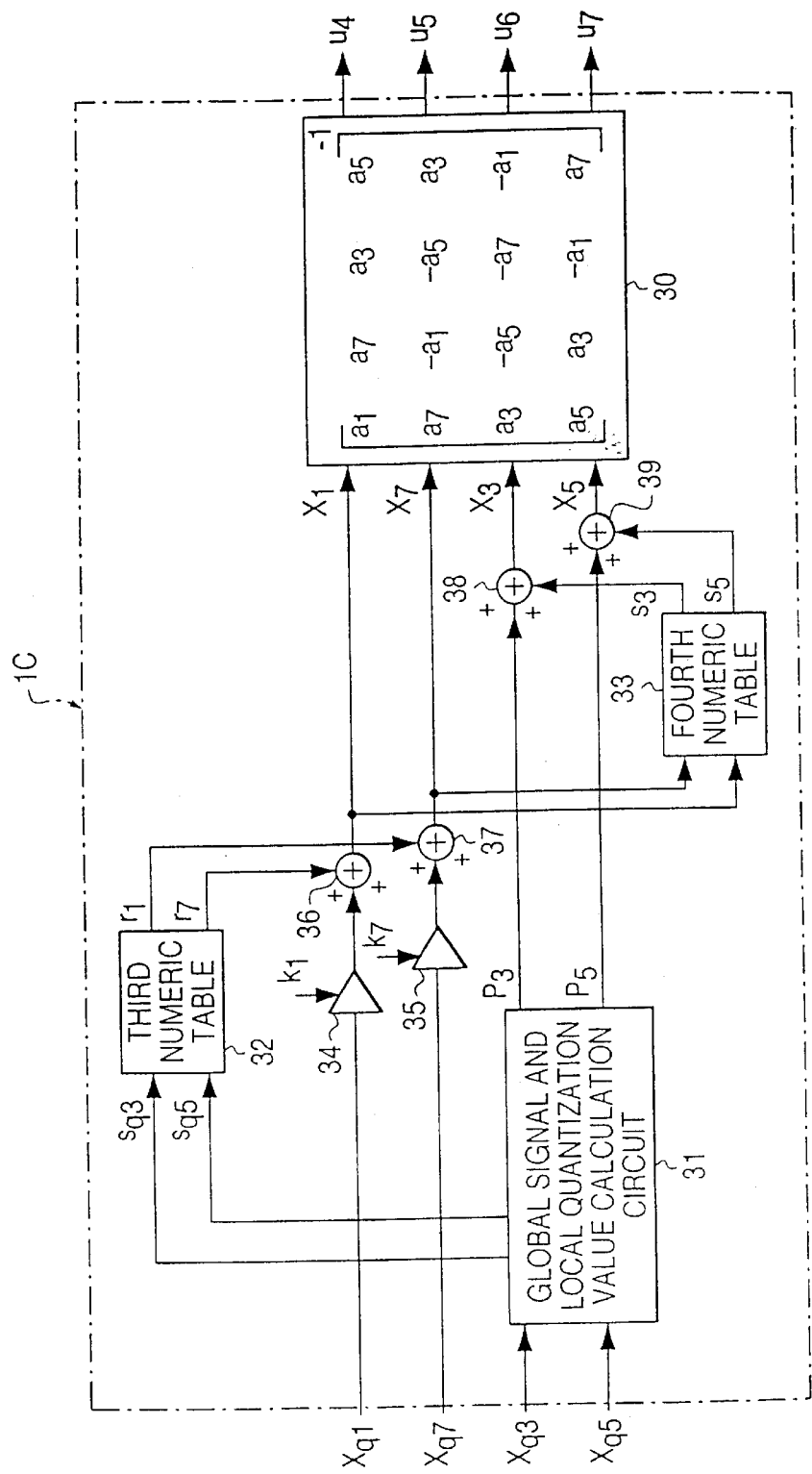
FIG. 4 is a block diagram of an inverse transformer to which the present invention is applied.
Figure 41:
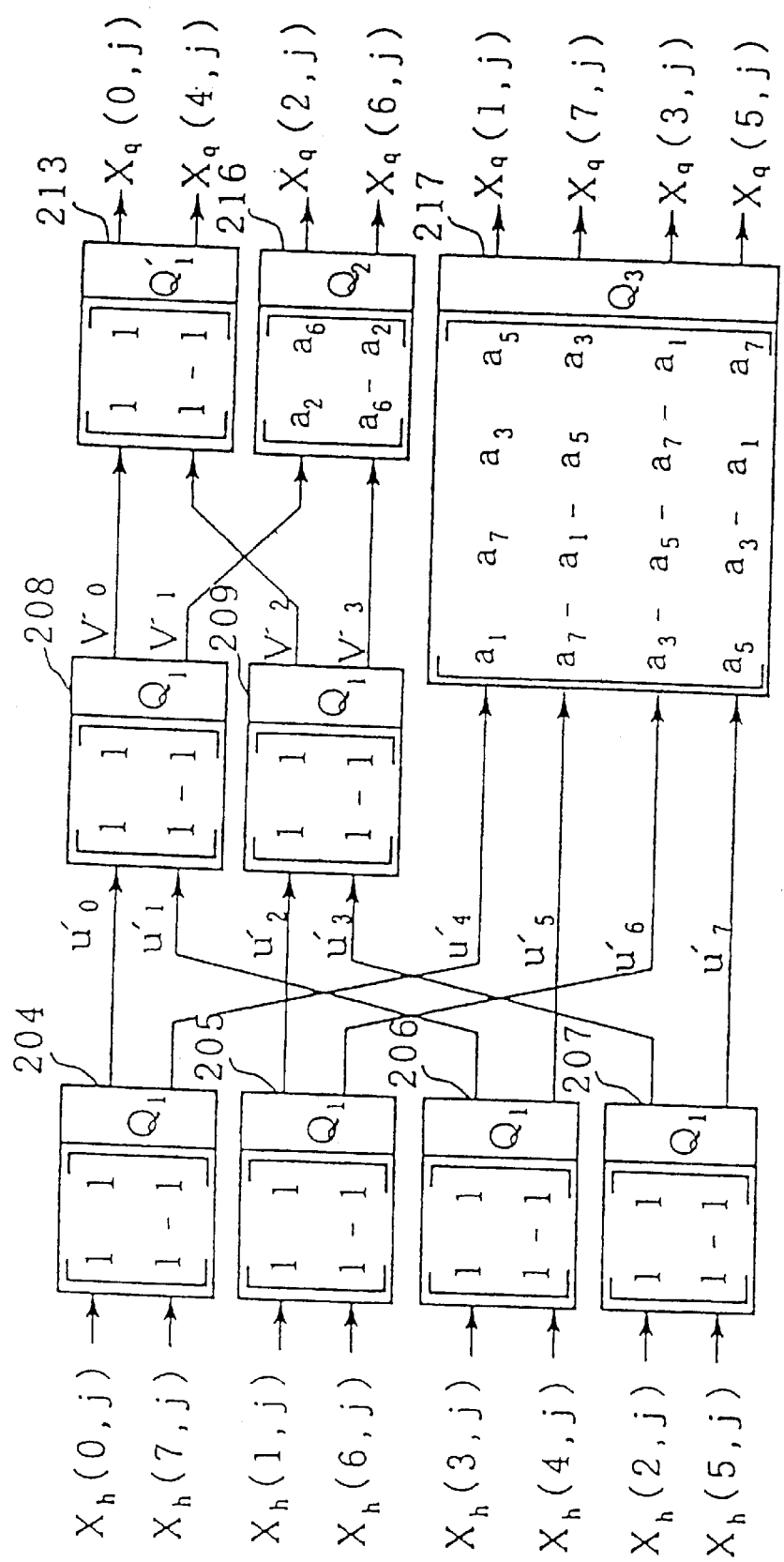
FIG. 41 is a block diagram showing a circuit construction of a circuit portion of an 8×8 reversible discrete cosine transformer which performs vertical eight-element discrete cosine transform.

FIG. 4 shows a circuit of a reversible transformer which effects inverse transform to that of the reversible transformer 1A of FIG. 1. Referring to FIG. 41 the reversible transformer shown is generally denoted at 1C and includes a transformer 30, a global signal and local quantization value calculation circuit 31, a third numeric table 32, a fourth numeric table 33, multipliers 34 and 35, and adders 36, 37, 38 and 39. In the reversible transformer 1C, quantization values (Xq1, Xq7, Xq3, Xq5) are dequantized to obtain transform coefficients (X1, X7, X3, X5), and inverse transform of the expression (16) is performed for the transform coefficients (X1, X7, X3, X5) as given by the expression (24) to obtain an integer vector (u4, u5, u6, u7). In the dequantization from the quantization values (Xq1, Xq7, Xq3, Xq5) to the transform coefficients (X1, X7, X3, X5), the quantization values (Xq1, Xq7) and the quantization values (Xq3, Xq5) are dequantized separately. For the quantization values (Xq1, Xq7), linear dequantization is performed for them, and quantization residuals are added to results of the linear dequantization to obtain the transform coefficients (X1, X7). On the other hand, for the dequantization of the quantization values (Xq3, Xq5), they are separated into global quantization portions and local quantization portions, and the global quantization portions and the local quantization portions are dequantized individually. Finally, resulting values of the dequantization are added to obtain the transform coefficients (X3, X5). This is described in more detail with reference to FIG. 4.

For the quantization values Xq1, Xq7, they are first multiplied by k1, k7 to obtain quantization representative values (k1Xq1, k7Xq7) by the multipliers 34, 35, respectively. Then, the quantization residuals (r1, r7) are added to the quantization representative values (k1Xq1, k7Xq7) to calculate the transform coefficients (X1, X7) by the adders 36, 37, respectively. The quantization residuals (r1, r7) are determined using the third numeric table 32 from the local quantization values (sq3, sq5) similarly as in the procedure of the conventional example described hereinabove. The third numeric table 32 is a table in which correspondences reverse to those of the second numeric table 3 of FIG. 2 are described. It is to be noted that the local quantization values (sq3, sq5) are calculated using a procedure hereinafter described by the global signal and local quantization value calculation circuit 31.

On the other hand, for the quantization values Xq3, Xq5, global signals (p3, p5) and local quantization values (sq3, sq5) are calculated from the quantization values (Xq3, Xq5) by the global signal and local quantization value calculation circuit 31. Once the local quantization values (sq3, sq5) are determined, the transform coefficients (X1, X7) can be calculated as described hereinabove. Then, from the thus calculated transform coefficients (X1, X7), representative elements (s3, s5) are determined using the fourth numeric table 33 equivalent to the first numeric table 2 of FIG. 1 in a similar procedure to that of the conventional example described hereinabove. Then, the representative elements (s3, s5) are added to the global signals (p3, p5) to obtain the transform coefficients (X3, X5) by the adders 38, 39, respectively.

By the procedure described above, all of the transform coefficients (X1, X7, X3, X5) are determined. Further, the transform coefficients (X1, X7, X3, X5) are linearly transformed in accordance with the expression (24) by the transformer 30 to obtain an integer vector (u4, u5, u6, u7). By the processing, inverse transform to that of the reversible transformer of FIG. 1 is realized.

Figure 5A:
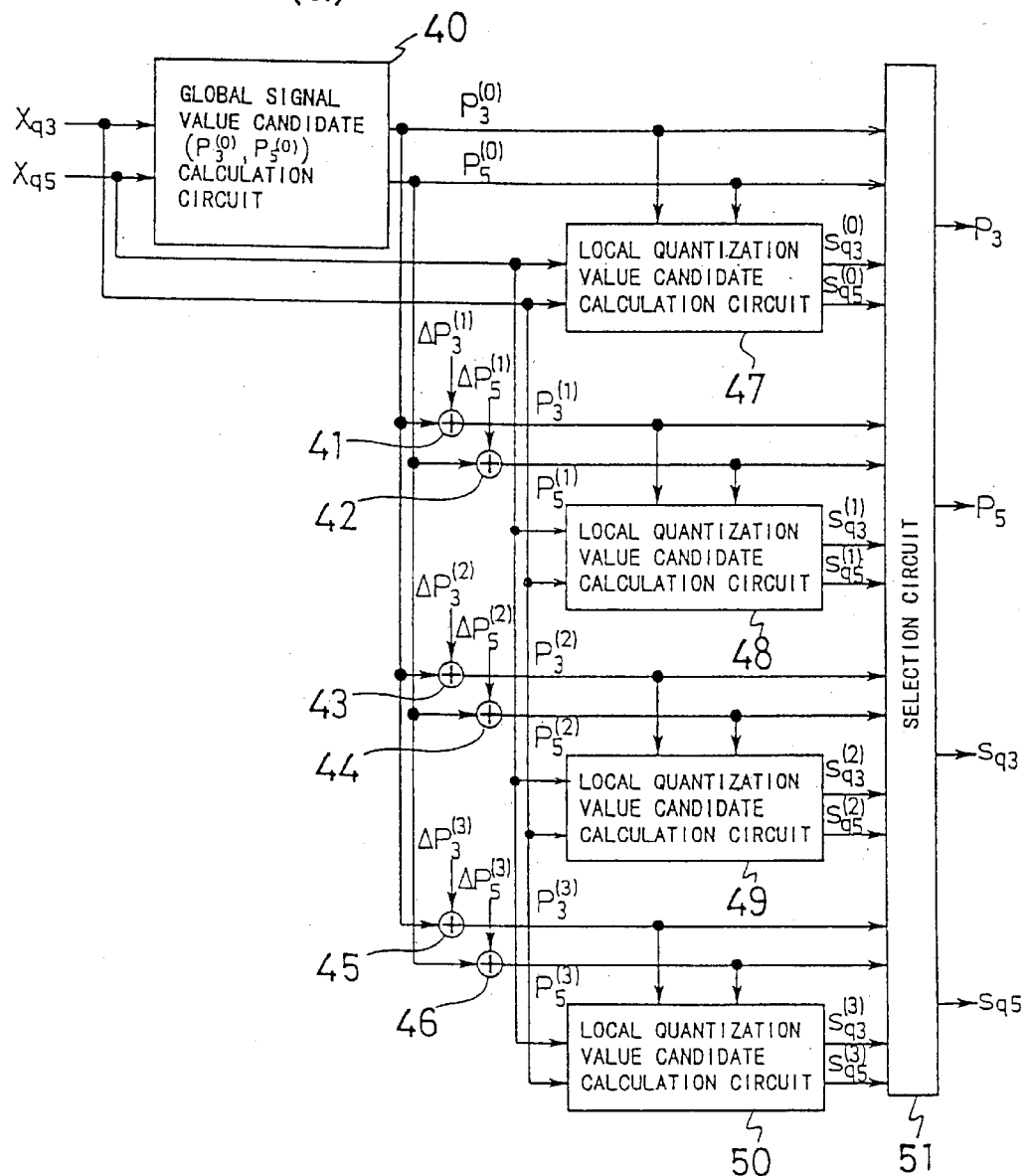
FIG. 5(a) is a block diagram of a global signal and local quantization value calculation circuit shown in FIG. 4.

FIG. 5(a) is a circuit diagram showing means for calculating the global signals (p3, p5) and the local quantization values (sq3, sq5), that is, a construction of the global signal and local quantization value calculation circuit 31 of FIG. 4. Referring to FIG. 5(a), the circuit calculates the local quantization values (sq3, sq5) and the global signals (p3, p5) from the quantization values (Xq3, Xq5). First, an outline of the circuit is described with reference to FIG. 6.

Figure 6:
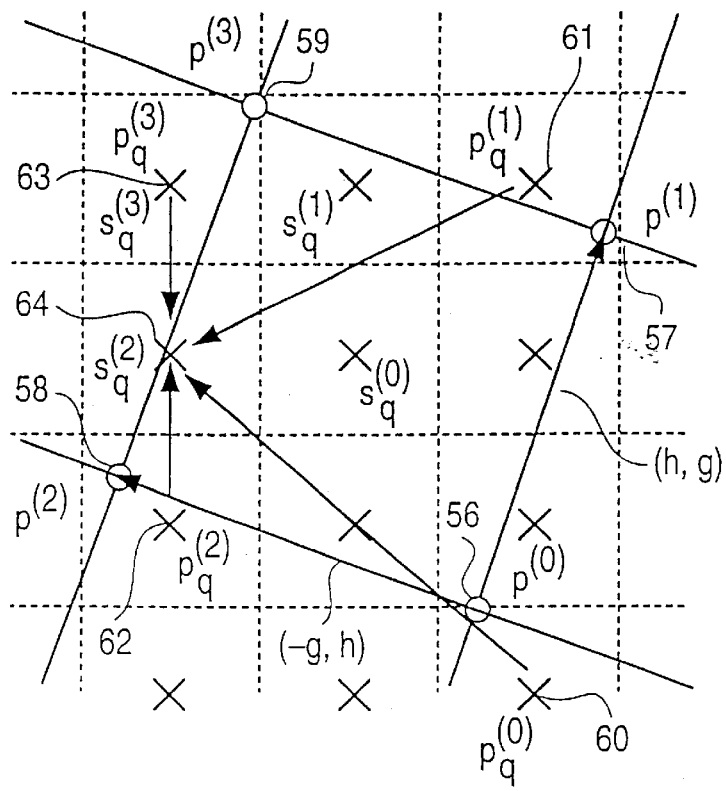
FIG. 6 is a diagrammatic view illustrating an example of a relationship among quantization values, global signal candidate points and local signal quantization value candidates.

FIG. 6 illustrates determination of the global signals (p3, p5) and the local quantization values (sq3, sq5) when the quantization values (Xq3, Xq5) represent a quantization point 64. In this instance, as candidates for the global signals (p3, p5), four points of global signal candidate points 56, 57, 58 and 59 are possible. However, which one of the four points is a true global signal depends upon the shape of a range in which the representative elements (s3, s5) are present, and it is difficult to determine the global signals (p3, p5) and the local quantization values (sq3, sq5) directly from the quantization point 64. Therefore, coordinates ($p3^{(\emptyset)}$, $p5^{(\emptyset)}$, ($p3^{(1)}$, $p5^{(1)}$, $(p3)^{(2)}$, $p5^{(2)}$, $(p3)^{(3)}$, $p5^{(3)}$) of the global signal candidate points 56, 57, 58 and 59 are calculated. Then, values ($pq3^{(\emptyset)}$, $pq5^{(\emptyset)}$, $(pq3^{(1)}, pq5)^{(1)}$, $(pq3^{(2)}, pq5^{(2)})$, $(pq3)^{(3)}$, $pq5^{(3)}$) of quantization points 60, 61, 62, 63 which provide quantization values of them are calculated. Then, candidates ($sq3^{(\emptyset)}$, $sq5^{(\emptyset)}$, ($sq3^{(1)}$, $sq5^{(1)}$, ($sq3^{(2)}$, $sq5^{(2)}$, ($sq3^{(3)}$, $sq5^{(3)}$) for the local quantization values are calculated for each of them. From the candidates for the local quantization values, those values which are actually present as local quantization values are selected, and the selected values are set to the local quantization values (sq3, sq5) while global value candidates corresponding to them are set to the global signals (p3, p5). Subsequently, details are described with reference to FIG. 5(a).

First, coordinates of one of the four global signal candidate points 56, 57, 58 and 59 are calculated by a global signal value candidate ($p3^{(\emptyset)}$, $p5^{(\emptyset)}$, calculation circuit 40. The coordinates are represented by ($p3^{(\emptyset)}$, $p5^{(\emptyset)}$ and hereinafter referred to as global signal value candidate. A circuit hereinafter described with reference to FIG. 12 can be used for the global signal value candidate ($p3^{(\emptyset)}$, $p5^{(\emptyset)}$ calculation circuit 40. In FIG. 6, coordinates of the global signal candidate point 56 are represented by ($p3^{(\emptyset)}$, $p5^{(\emptyset)}$).

It is to be noted that coordinates of any of the global signal candidate point 57, 58 and 59 may otherwise be calculated as ($p3^{(\emptyset)}$, $p5^{(\emptyset)}$).

Thereafter, coordinates ($p3^{(1)}$, $p5^{(1)}$, ($p3^{(2)}$, $p5^{(2)}$), ($p3^{(3)}$, $p5^{(3)}$) of the other three global signal candidate points are calculated. In FIG. 6, the coordinates of the global signal candidate point 57, 58 and 59 are represented by ($p3^{(1)}$, $p5^{(1)}$), ($p3^{(2)}$, $p5^{(2)}$), ($p3^{(3)}$, $p5^{(3)}$), respectively. The global signal candidate ($p3^{(1)}$, $p5^{(1)}$) can be obtained by adding global signal differences ($\Delta p3^{(\emptyset)}$, $\Delta p5^{(1)}$) to the values of the coordinates ($p3^{(\emptyset)}$, $p5^{(\emptyset)}$) by adders 41 and 42, respectively.

Similarly, the global signal candidate ($p3^{(2)}$, $p5^{(2)}$) can be obtained by adding global signal differences ($\Delta p3^{(2)}$, $\Delta p5^{(2)}$) to the coordinates ($p3^{(\emptyset)}$, $p5^{(\emptyset)}$, by adders 43 and 44, respectively, and the global signal candidate ($p3^{(3)}$, $p5^{(3)}$) can be obtained by adding global signal differences ($\Delta p3^{(3)}$, $\Delta p5^{(3)}$) by adders 45 and 46, respectively. Here, the global signal differences ($\Delta p3^{(i)}$, $\Delta p5^{(i)}$ (i=1, 2, 3) represent relative values of the coordinates ($p3^{(i)}$, $p5^{(i)}$, relative to the coordinates ($p3^{(\emptyset)}$, $p5^{(\emptyset)}$) and are known values. In the example of FIG. 6, ($\Delta p3^{(1)}$, $\Delta p5^{(1)}$)=(h, g), ($\Delta p3^{(2)}$, $\Delta p5^{(2)}$)=(−g, h), and ($\Delta p3^{(3)}$, $\Delta p5^{(3)}$)=(h−g, g+h). It is to be noted that also the values of the coordinates ($p3^{(i)}$, $p5^{(i)}$) (i=1, 2, 3) can be calculated using a circuit similar to the global signal value candidate ($p3^{(\emptyset)}$, $p5^{(\emptyset)}$) calculation circuit 40. However, the circuit scale can be reduced by employing the construction described above.

Subsequently, local quantization value candidates ($sq3^{(i)}$, $sq5^{(i)}$) (i=0, 1, 2, 3) are calculated from the values of the coordinates ($p3^{(i)}$, $p5^{(i)}$) (i=1, 2, 3) and the quantization values (Xq3, Xq5) obtained as described above by local quantization amount candidate calculation circuits 47, 48, 49 and 50. Here, each of the local quantization amount candidate calculation circuits 47, 48, 59 and 50 is a circuit for calculating the local quantization value candidates ($sq3^{(i)}$, $sq5^{(i)}$) from the values of the coordinates ($p3^{(i)}$, $p5^{(i)}$) (i=0, 1, 2, 3) and the quantization values (Xq3, Xq5). In particular, components of the coordinates ($p3^{(i)}$, $p5^{(i)}$) (i=0, 1, 2, 3) are linearly quantized with the step sizes L3, L5 to calculate the global quantization values ($pq3^{(i)}$, $pq5^{(i)}$) by adders 52, 53, and the global quantization values ($pq3^{(i)}$, $pq5^{(i)}$) are subtracted from the quantization values (Xq3, Xq5) to calculate the local quantization values ($sq3^{(i)}$, $sq5^{(i)}$) for the individual global signal candidate points by adders 54, 55.

Then, values which can possibly be present actually as local quantization values are searched for from among the local quantization value candidates ($sq3^{(\emptyset)}$, $sq5^{(\emptyset)}$), ($sq3^{(1)}$, $sq5^{(1)}$), ($sq3^{(2)}$, $sq5^{(2)}$, ($sq3^{(3)}$, $sq5^{(3)}$) by a selection circuit 51 and selected as local quantization values (X3, X5). In this instance, those values which can be taken as local quantization values are stored in advance, and the local quantization value candidates ($sq3(\emptyset)$, $sq5^{(\emptyset),\ (sq3(1)}$, $sq5^{(1)}$, ($sq3^{(2)}$, $sq5_{(2)}$), ($sq3^{(3)}$, $sq5^{(3)}$ are successively compared with the stored values to search for local quantization values of the transform coefficients (X3, X5). Then, a global signal candidate corresponding to the selected quantization values is determined as global signals (p3, p5) of the transform coefficients (X3, X5). By the processing described above, the global signals (p3, p5) and the local quantization values (sq3, sq5) are determined.

Figure 7:
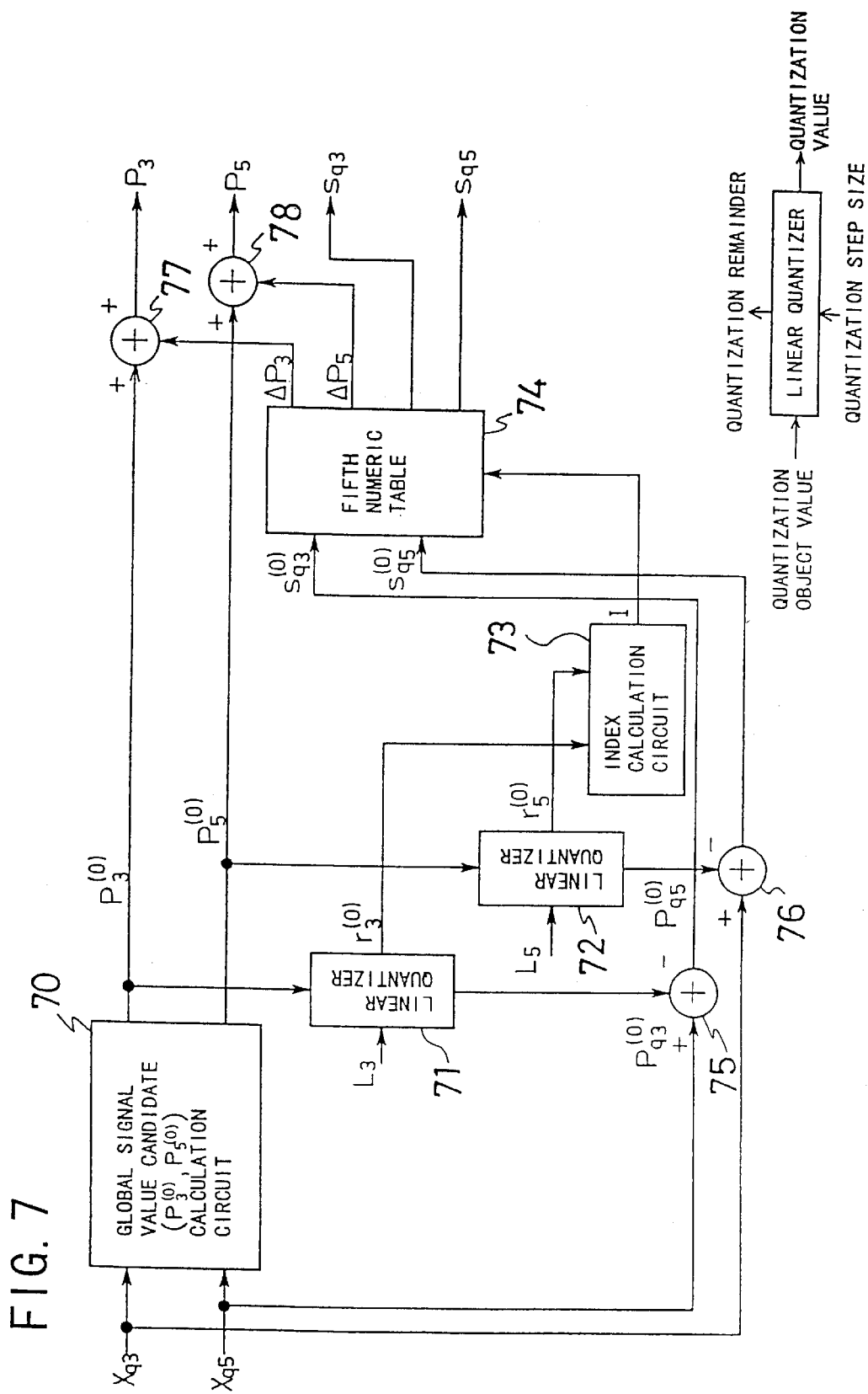
FIG. 7 is a block diagram of another global signal and local quantization value calculation circuit shown in FIG. 4.

FIG. 7 is a circuit diagram showing a construction of another form of the means for calculating the global signals (p3, p5) and the local quantization values (sq3, sq5), that is, the global signal and local quantization value calculation circuit 31 of FIG. 4. Referring to FIG. 7, the global signal and local quantization value calculation circuit shown calculates, for only one of the four global signal candidate points 56, 57, 58 and 59 shown in FIG. 3, coordinates ($p3_{(\emptyset)}$, $p5^{(\emptyset)}$) of the point and a corresponding local quantization value candidate ($sq3^{(\emptyset)}$, $sq5^{(\emptyset)}$. Then, from the thus calculated coordinates ($p^{(\emptyset)}$, $p5^{(\emptyset)}$) and local quantization value candidate ($sq3^{(\emptyset)}$, $sq^{(\emptyset)}$, the global signals (p3, p5) and the local quantization values (sq3, sq5) of the transform coefficients (X3, X5) to be calculated are calculated. This is described in more detail with reference to FIG. 7.

First, coordinates of one of the global signal candidate points 56, 57, 58 and 59 of FIG. 6 are calculated from the quantization values (Xq3, Xq5) by a global signal value candidate (p3$^{(\emptyset)}$, p5$^{(\emptyset)}$) calculation circuit 70. The coordinates are represented by (p3$^{(\emptyset)}$, p5$^{(\emptyset)}$) and hereinafter referred to as global signal value candidate. For the global signal value candidate (p3$^{(\emptyset)}$, p5$^{(\emptyset)}$) calculation circuit 70, a circuit hereinafter described with reference to FIG. 12 may be used. Thereafter, the values of the coordinates p3$^{(\emptyset)}$ and p5$^{(\emptyset)}$ are linearly quantized with the step sizes L3, L5 to obtain the global quantization value candidates pq$^{(\emptyset)}$, pq5$^{(\emptyset)}$ by linear quantizers 71, 72, respectively. In this instance, also the quantization residuals (r3$^{(\emptyset)}$, r$^{(\emptyset)}$,) represented by the following expression (29) are calculated simultaneously.

$$\begin{cases} r_3^{(0)} = p_3^{(0)} - L_3 p_{q3}^{(0)} \\ r_5^{(0)} = p_5^{(0)} - L_5 p_{q5}^{(0)} \end{cases} \quad (29)$$

Then, the global quantization value candidates (pq3$^{(\emptyset)}$, pq5$^{(\emptyset)}$) are subtracted from the quantization values (Xq3, Xq5) to calculate a local quantization value candidate (sq3$^{(\emptyset)}$, sq5$^{(\emptyset)}$by adders 75, 76, respectively. Then, from the local quantization value candidate (sq3$^{(\emptyset)}$, sq5$^{(\emptyset)}$) the local quantization values (sq3, sq5) and the global signal differences (Δp3, Δp5) are determined using a fifth numeric table 74. Here, the global signal differences (Δp3, Δp5) represent relative values of the global signals (p3, p5) relative to the global signal candidates (p3$^{(\emptyset)}$, p5$^{(\emptyset)}$). Details of the fifth numeric table 74 will be hereinafter described. Then, the values of the global signal differences (Δp3, Δp5) are added to the global signal candidate (p3$^{(\emptyset)}$, p5$^{(\emptyset)}$) to obtain global signals (p3, p5) by adders 77 and 78, respectively.

Now, the fifth numeric table 74 is described. The fifth numeric table 74 is used to determine the local quantization values (sq3, sq5) and the global signal differences (Δp3, Δp5) from a local quantization value candidate (sq3$^{(\emptyset)}$, sq5$^{(\emptyset)}$. For example, in the case of FIG. 6, where the range in which the local quantization values (sq3, sq5) are present is such as illustrated in FIG. 8(*a*), the global quantization values and values obtained by adding the local quantization values to them are such as illustrated in FIG. 8(*b*). Accordingly, in this instance, the fifth numeric table 74 is such as illustrated in FIG. 8(*c*). Using this table, the local quantization values (sq3, sq5) and the global signal differences (Δp3, Δp5) are determined from the local quantization value candidate (sq3$^{(\emptyset)}$, sq5$^{(\emptyset)}$).

However, the correspondence between the local quantization value candidate (sq3$^{(\emptyset)}$, sq5$^{(\emptyset)}$) and the local quantization values (sq3, sq5) and global signal differences (Δp3, Δp5) depends upon the relationship of the quantization values (pq3$^{(\emptyset)}$, pq5$^{(\emptyset)}$, (pq3$^{(1)}$, pq5$^{(1)}$), (pq3$^{(2)}$), pq5$^{(2)}$), (pq3$^{(3)}$, pq5$^{(3)}$) of the global signal candidate points 56, 57, 58, 59 illustrated in FIG. 6. Therefore, it is required to prepare the number of tables equal to the number of such relationships and select, when to calculate the local quantization values (sq3, sq5) and the global signal differences (Δp3, Δp5), a suitable one from among the tables. In the following, the relationship of the quantization values (pq3$^{(i)}$, pq5(i) is described.

Figure 9A:
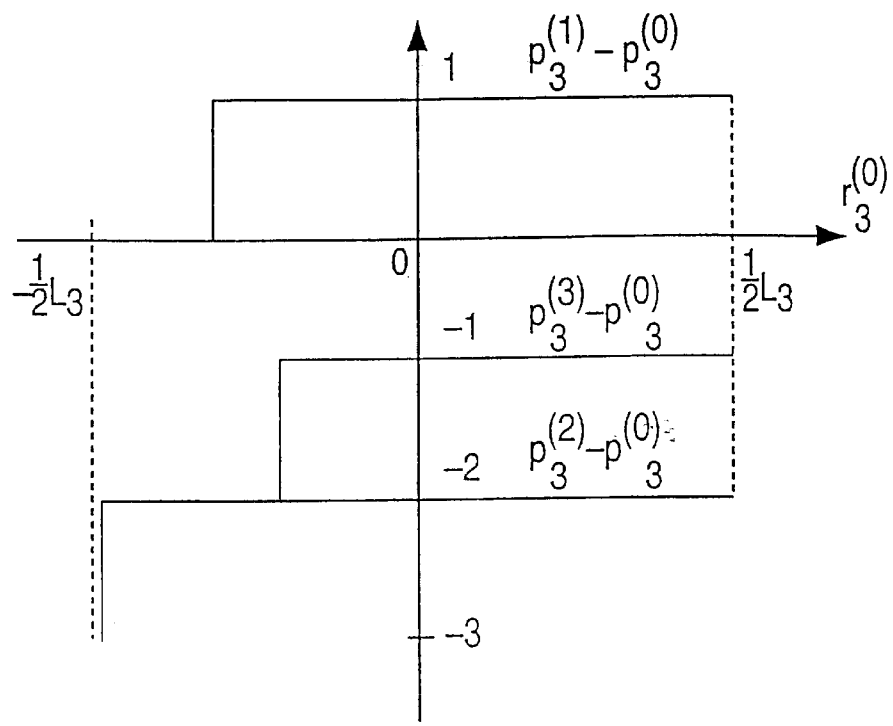
FIG. 9(a) is a graph illustrating a relationship among global signal candidate points.
Figure 9B:
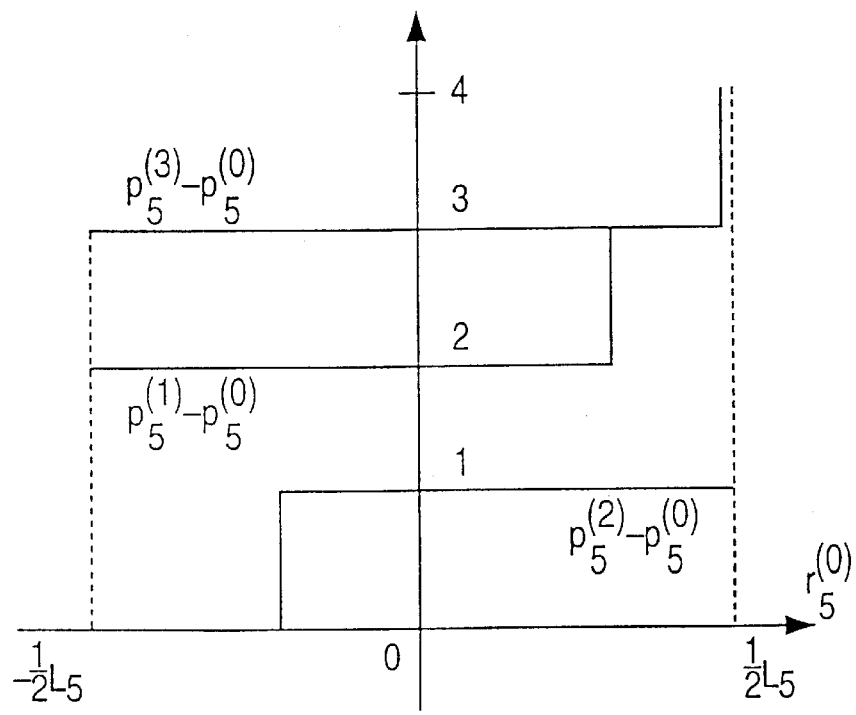
FIG. 9(b) is a similar view but illustrating another relationship among global signal candidate points.
Figure 10:
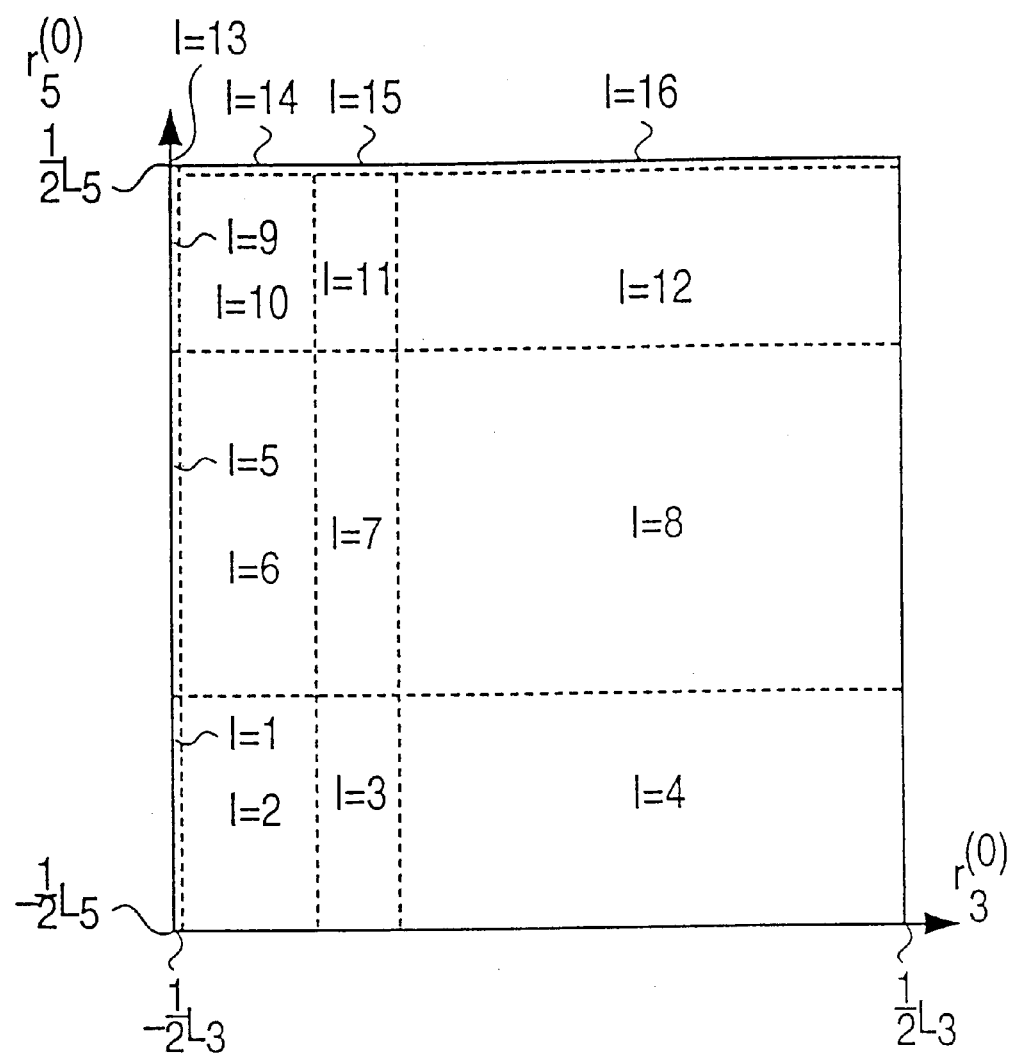
FIG. 10 is a diagrammatic view illustrating a correspondence between quantization residuals and an index output by an index calculation circuit shown in FIG. 7.

The relationship of the quantization values (pq3$^{(i)}$, pq5$^{(i)}$ (i=0, 1, 2, 3) varies depending upon the quantization residuals (r3$^{(\emptyset)}$, r5$^{(\emptyset)}$) represented by the expression (29). This arises from the fact that the distances between the four global signal candidate points do not coincide with integral numbers of times the step sizes L3, L5. For example, where the magnitudes L3, L5 of a quantization cell are such as illustrated in FIG. 6, relative values of the quantization values (pq3$^{(1)}$, pq5$^{(1)}$), (pq3$^{(2)}$, pq5$^{(2)}$), (pq3$^{(3)}$, pq5$^{(3)}$) relative to the quantization values (pq3$^{(\emptyset)}$, pq5$^{(\emptyset)}$,) are described as such functions of the quantization residuals (r3$^{(\emptyset)}$, r5$^{(\emptyset)}$) as illustrated in FIGS. 9(*a*) and 9(*b*). Consequently, it can be seen that the relationship of the quantization values (pq3$^{(i)}$, pq5$^{(i)}$) varies depending upon the quantization residuals (r3$^{(\emptyset)}$, r5$^{(\emptyset)}$). Consequently, depending upon in which one of regions of I=1 to I=16 of FIG. 10 the quantization residuals (r3$^{(\emptyset)}$, r5$^{(\emptyset)}$) are included, the relationship of values obtained by adding the local quantization values to the global quantization values exhibits such variations as seen in FIG. 11. It is to be noted that, in FIG. 11, each slanting square corresponds a square having apexes at the global signal candidate points 56, 57, 58, 59 of FIG. 6.

Thus, for each of the 16 different cases illustrated in FIG. 11, such a table as shown in FIG. 8(*c*) is prepared. Then, in order to determine the local quantization values (sq3, sq5) and the global signals (p3, p5) from a local quantization value candidate (sq3$^{(\emptyset)}$, sq5$^{(\emptyset)}$, it is discriminated by an index calculation circuit 73 to which position of FIG. 10 the values of the quantization residuals (r3$^{(\emptyset)}$, r5$^{(\emptyset)}$) come to determine an index I, and then a table to be used are selected from within the fifth numeric table 74 based on the determined index I. Then, using the thus selected table, global signal differences (Δp3, Δp5) and local quantization values (sq3, sq5) are determined.

Figure 5B:
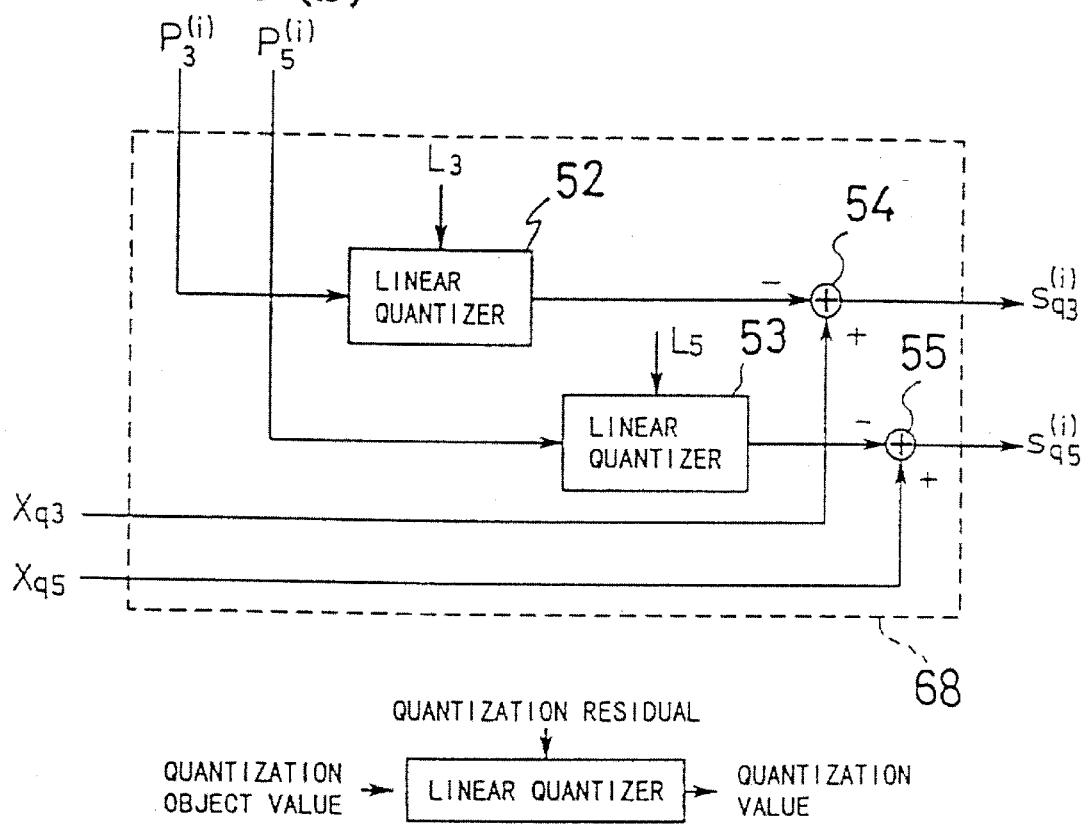
FIG. 5(b) is a circuit diagram of a local quantization value candidate calculation circuit shown in FIG. 5(a)

FIGS. 12(*a*) to 12(*d*) are circuit diagrams showing different constructions of the means for calculating global signal value candidates (p3$^{(\emptyset)}$, p5$^{(\emptyset)}$) from quantization values (Xq3, Xq5), that is, different forms of the global signal value (p3$^{(\emptyset)}$, p5$^{(\emptyset)}$) calculation circuit of FIG. 5 or 7. The global signal value (p3$^{(\emptyset)}$, p5$^{(\emptyset)}$) calculation circuit is a circuit which calculates coordinates of one of four global signal candidate points of quantization values (Xq3, Xq5). For example, in the case of FIG. 6, coordinates of one of the four global signal candidate points 56, 57, 58, 59 are determined. Then, the coordinates of the determined point are represented by (p3$^{(\emptyset)}$, p5$^{(\emptyset)}$. While, in the case of FIG. 6, the global signal candidate point 56 is set to (p3$^{(\emptyset)}$, p5$^{(\emptyset)}$), coordinates of any one of the four global signal candidate points may be used as (p3$^{(\emptyset)}$, p5$^{(\emptyset)}$). The circuit is partially modified depending upon which one of the points is determined. FIG. 12(*a*) shows a circuit which calculates coordinates of the global signal candidate point 56 as (p3$^{(\emptyset)}$, p5$^{(\emptyset)}$); FIG. 12(*b*) shows a circuit which calculates coordinates of the global signal candidate point 57 as (p3$^{(\emptyset)}$, p5$^{(\emptyset)}$); FIG. 12(*c*) shows a circuit which calculates coordinates of the global signal candidate point 58 as (p3$^{(\emptyset)}$, p5$^{(\emptyset)}$); and FIG. 12(*d*) shows a circuit which calculates coordinates of the global signal candidate point 59 as (p3$^{(\emptyset)}$, p5$^{(\emptyset)}$). Subsequently, the circuit which calculates coordinates of the global signal candidate point 56 in the case of FIG. 6 is described in detail with reference to FIG. 12(*a*).

First, the quantization values Xq3, Xq5 are multiplied by the step sizes L3, L5 to calculate the quantization representative values (Xq3L3, Xq5L5) by multipliers 100, 101, respectively. Then, an inverse transform point (w3, w5) of the quantization representative values (Xq3L3, Xq5L5) is calculated in accordance with the following expression (30) by a transformer 102.

$$\begin{bmatrix} w_3 \\ w_5 \end{bmatrix} = \begin{bmatrix} h & -g \\ g & h \end{bmatrix}^{-1} \begin{bmatrix} X_{q3}L_3 \\ X_{q5}L_5 \end{bmatrix} \quad (30)$$

Then, fraction parts of the values w3, w5 are discarded to obtain values w3', w5' by fraction part discarding units 103, 104, respectively, and the vector (w3', w5') is transformed in accordance with the following expression (31) by a transformer 105 to determine coordinates (p3$^{(0)}$, p5$^{(0)}$0 of the global signal candidate point 56 of FIG. 6.

$$\begin{bmatrix} p_3^{(0)} \\ p_5^{(0)} \end{bmatrix} = \begin{bmatrix} h & -g \\ g & h \end{bmatrix} \begin{bmatrix} w_3' \\ w_5' \end{bmatrix} \quad (31)$$

Figure 12A:
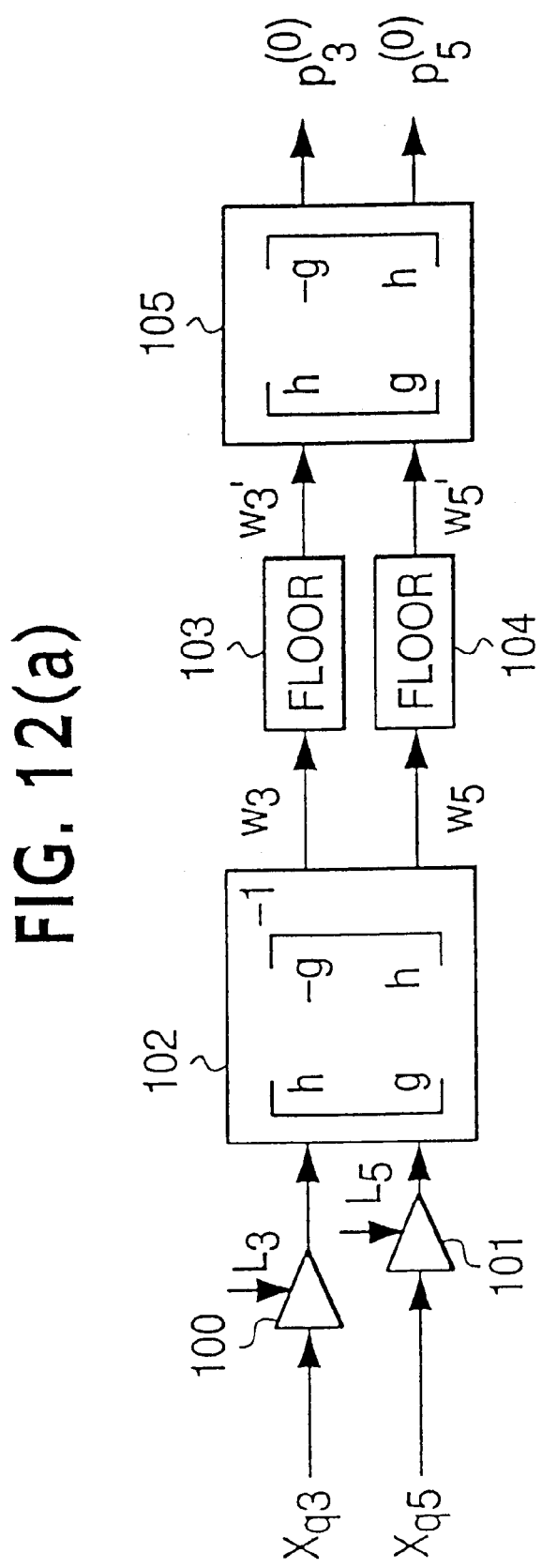
Figure 12C:
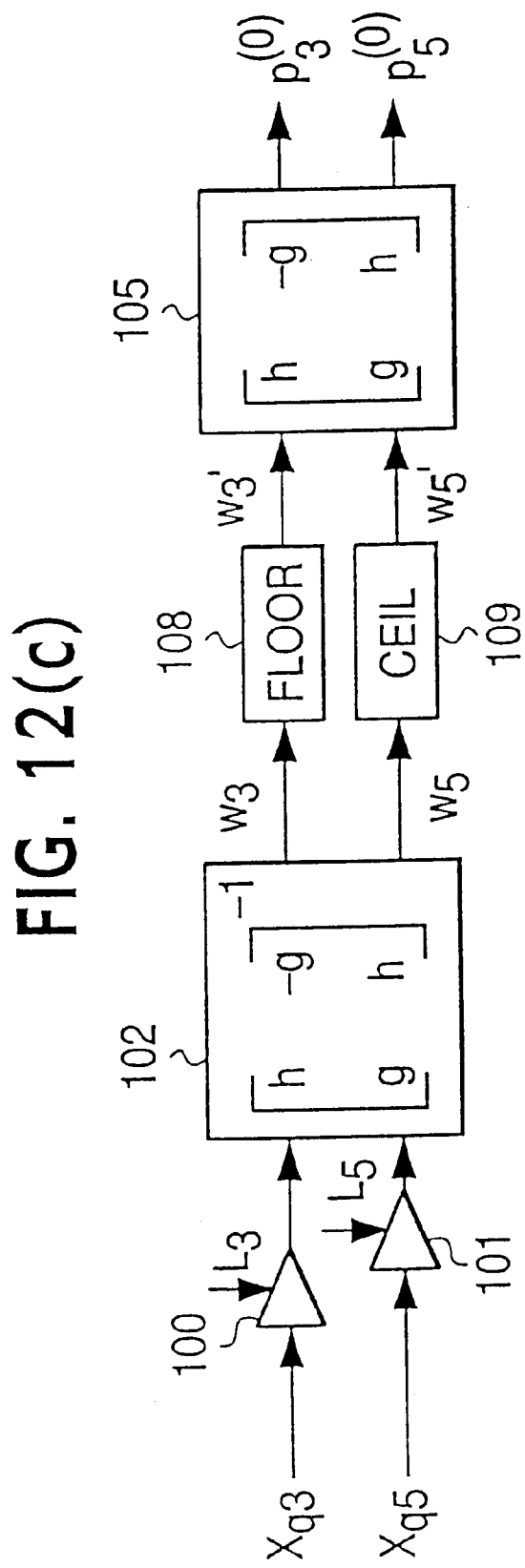
Figure 12D:
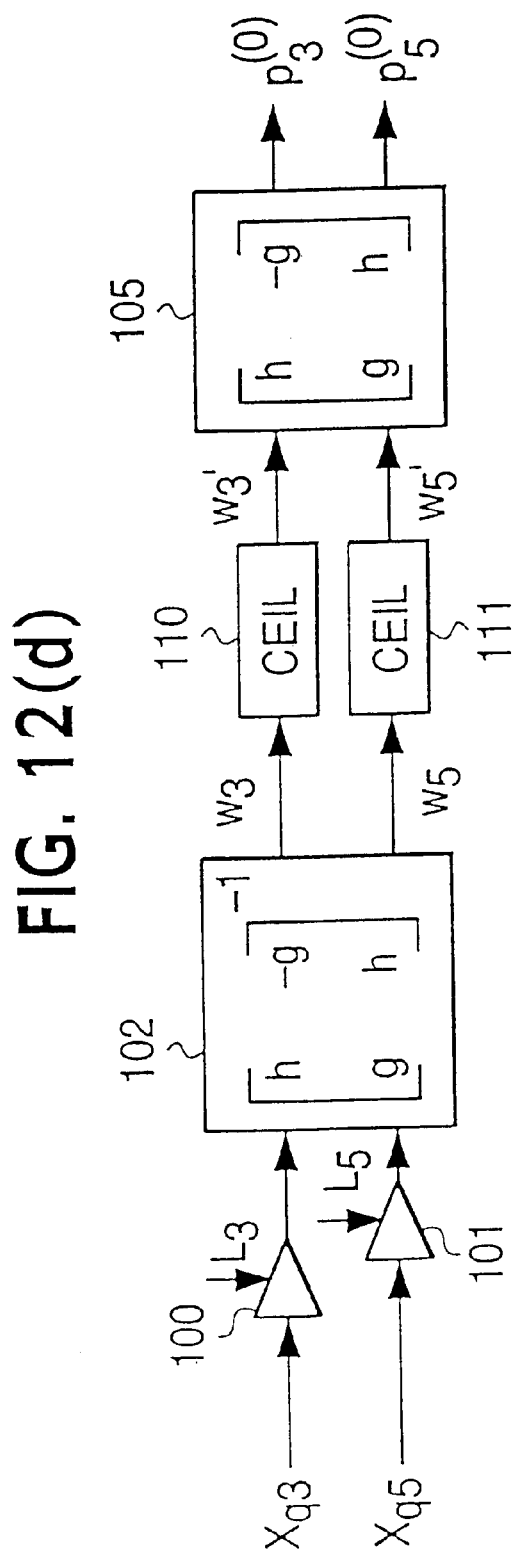

While FIG. 12(a) shows the circuit which calculates coordinates of the global signal candidate point 56 of FIG. 6 as (p3$^{(0)}$, p5$^{(0)}$) also the circuits of FIGS. 12(b), 12(c) and 12(d) which calculate coordinates of the global signal candidate points 57, 58 and 59, respectively, have basically same constructions. The circuits of FIGS. 12(b), 12(c) and 12(d) are different in the fraction part discarding units 103 and 104 for converting coordinates of the inverse transform point (w3, w5) into integers. In FIG. 12(b), the fraction part discarding units 103 and 104 are replaced by a fraction part rounding up unit 106 and a fraction part discarding unit 107, respectively; in FIG. 12(c), they are replaced by a fraction part discarding unit 108 and a fraction part rounding up unit 109, respectively; and in FIG. 12(d), they are replaced by fraction part rounding up units 110 and 111, respectively.

Figure 31:
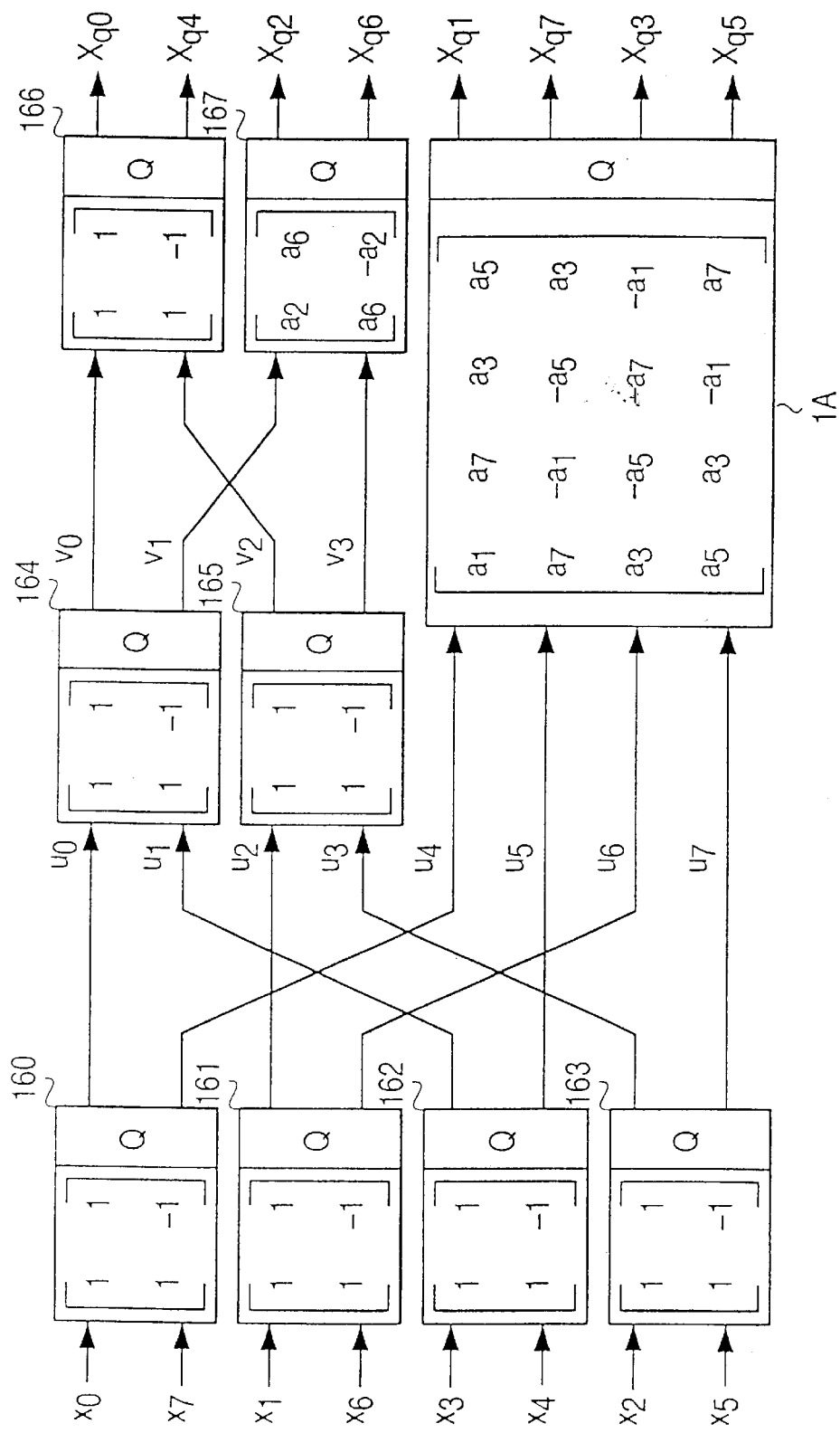
FIG. 31 is a block diagram of an eight-element reversible discrete cosine transform system constructed using the reversible transformer of FIG. 1(a)

FIG. 31 shows a system which performs eight-element reversible discrete cosine transform according to the present invention. Referring to FIG. 31, the system shown is a modification to the conventional example shown in FIG. 22 and includes the reversible transformer 1A shown in FIG. 1 in place of the transformer 168 of the conventional example.

Figure 23:
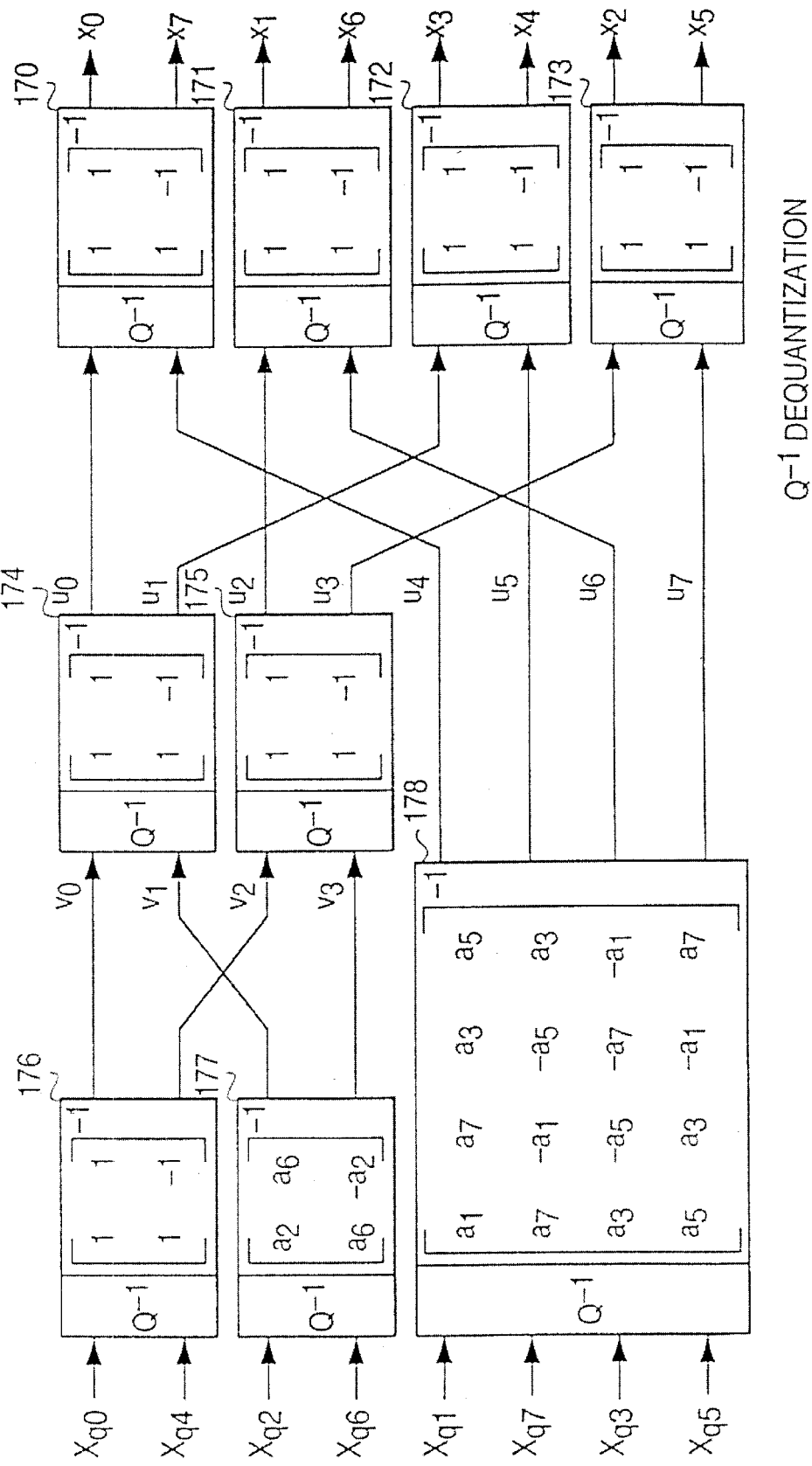
Figure 32:
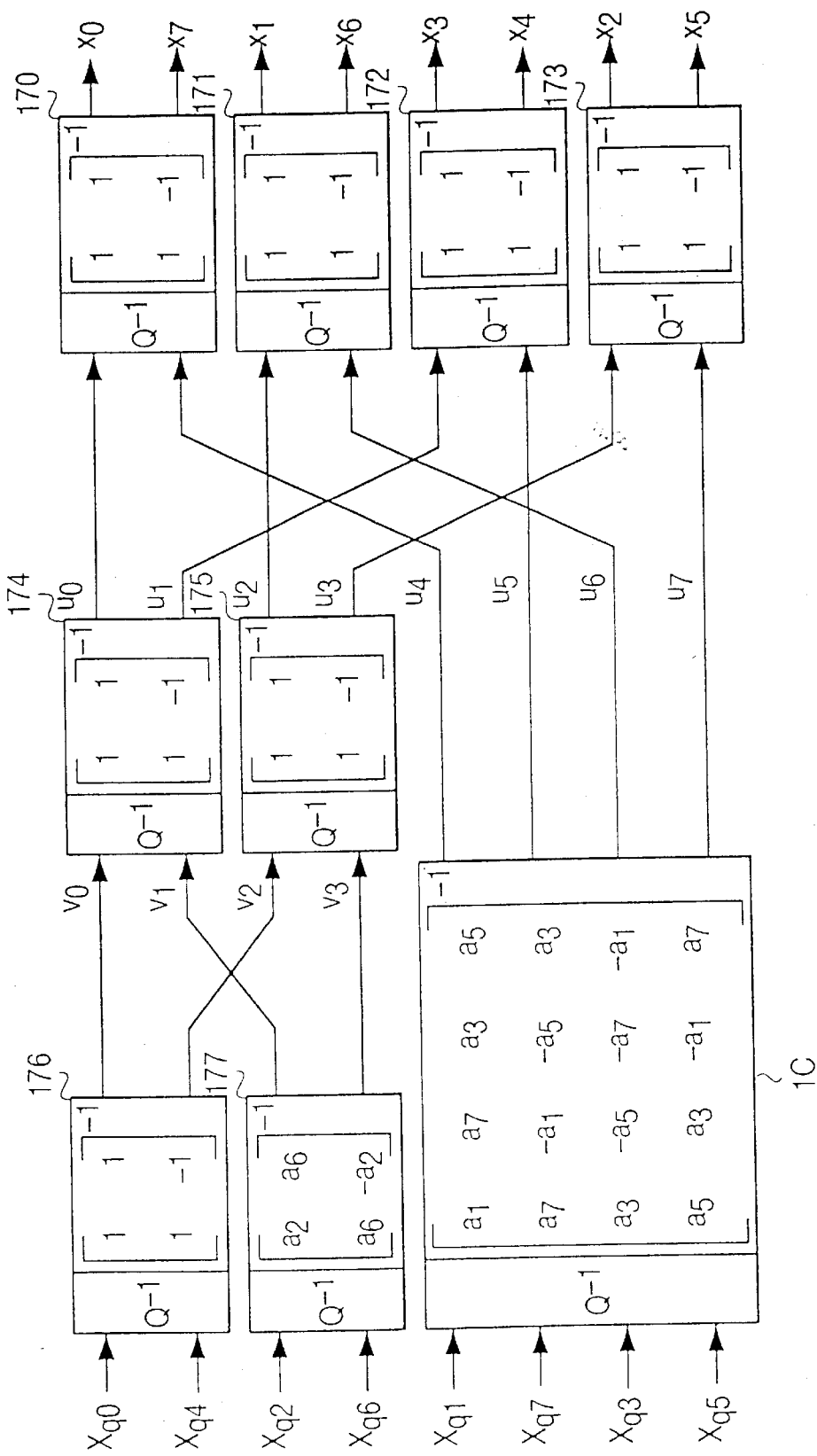
FIG. 32 is a block diagram of an eight-element reversible discrete cosine transform system constructed using the reversible transformer of FIG. 4.

FIG. 32 is a system which performs eight-element reversible inverse discrete cosine transform according to the present invention. Referring to FIG. 32, the system shown is a modification to the conventional example shown in FIG. 23 and includes the reversible transformer 1C shown in FIG. 4 in place of the transformer 178 of the conventional example.

By setting components of matrices of FIG. 31 to (a2, a6)=(12, 5) and (a1, a3, a5, a7)=(5, 4, 3, 1), eight-element reversible discrete cosine transform by which transform coefficients near to transform coefficients of the original eight-element discrete cosine transform can be obtained can be realized without making the size of a table necessary for local quantization very large. First, a reason why (a2, a6) are set to (a2, a6)=(12, 5) is described, and then another reason why (a1, a3, a5, a7) are set to (a1, a3, a5, a7)=(5, 4, 3, 1) is described.

Figure 13:
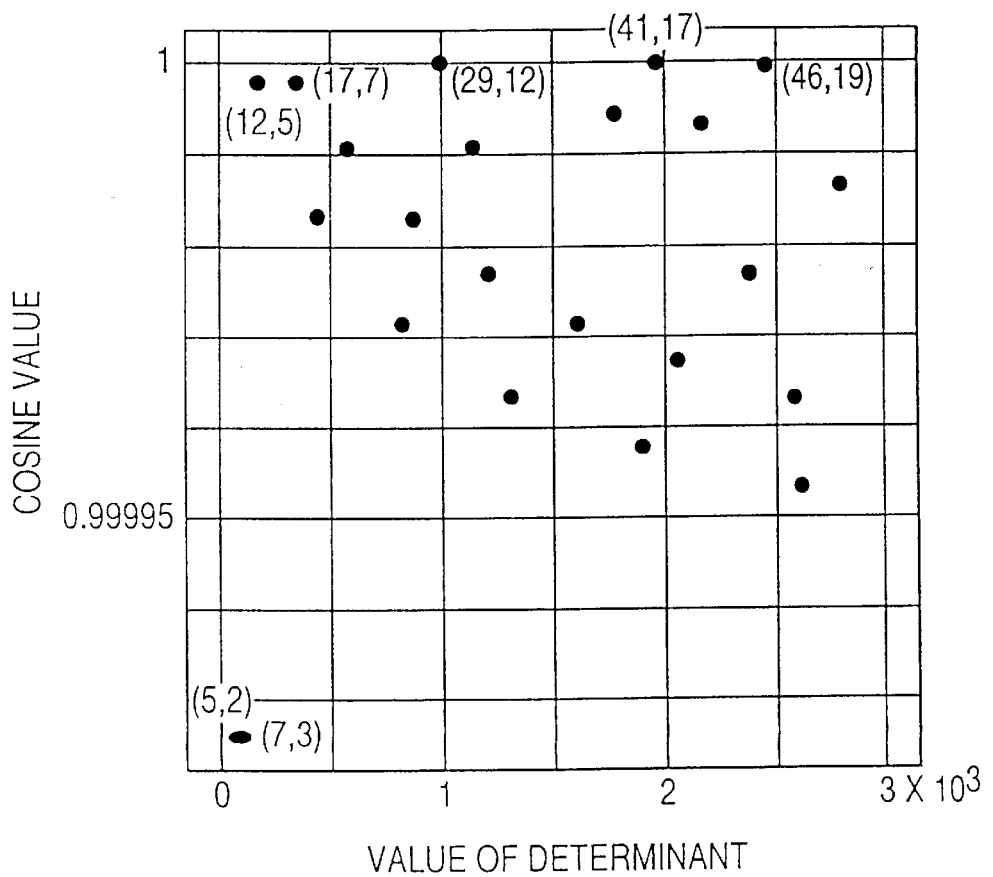
FIG. 13 is a graph illustrating a variation in approximation accuracy when the values of a2, a6 are varied.
Figure 24:
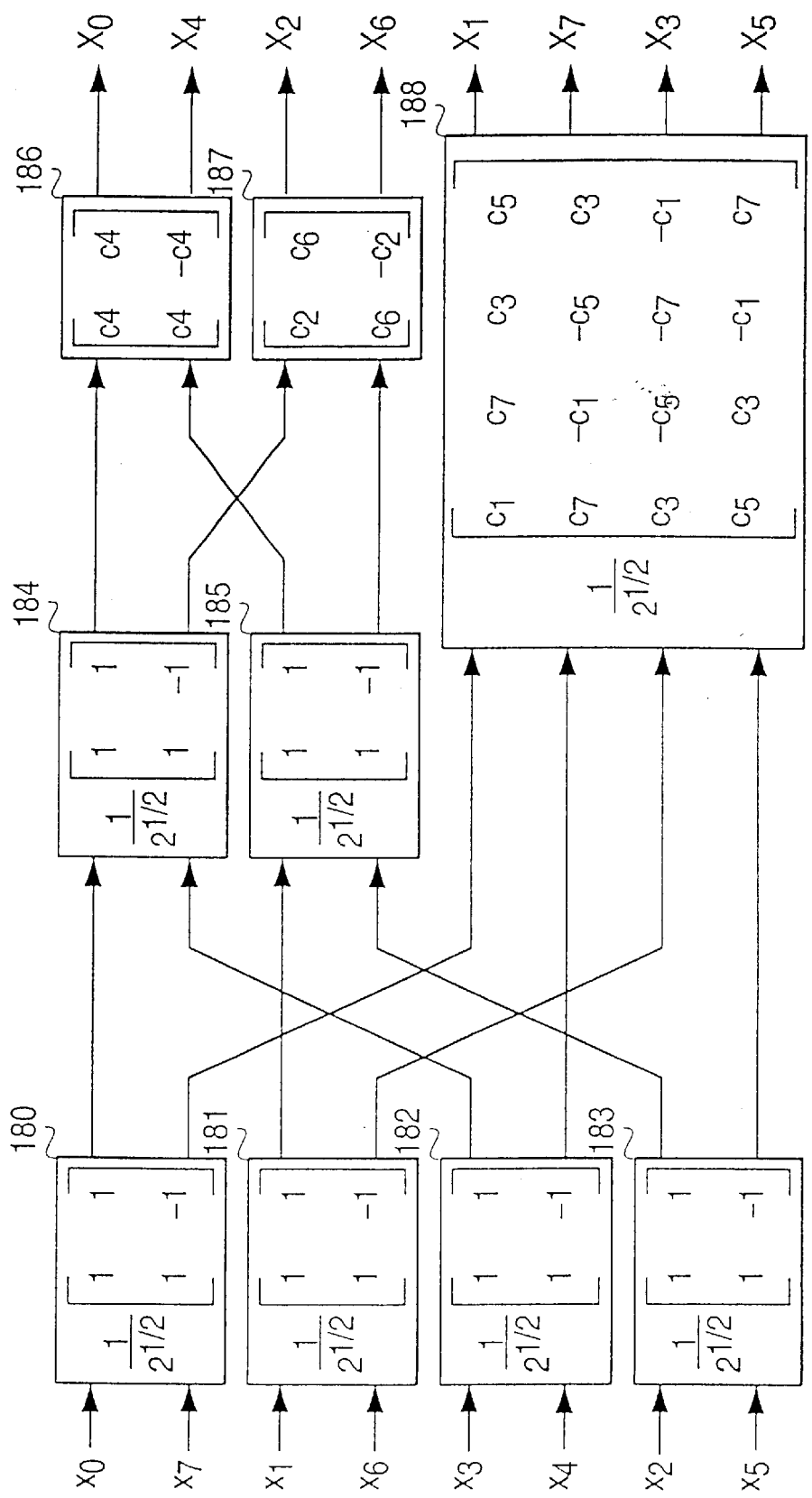
FIGS. 24 and 25 are block diagrams showing different original eight-element reversible discrete cosine transform systems.
Figure 25:
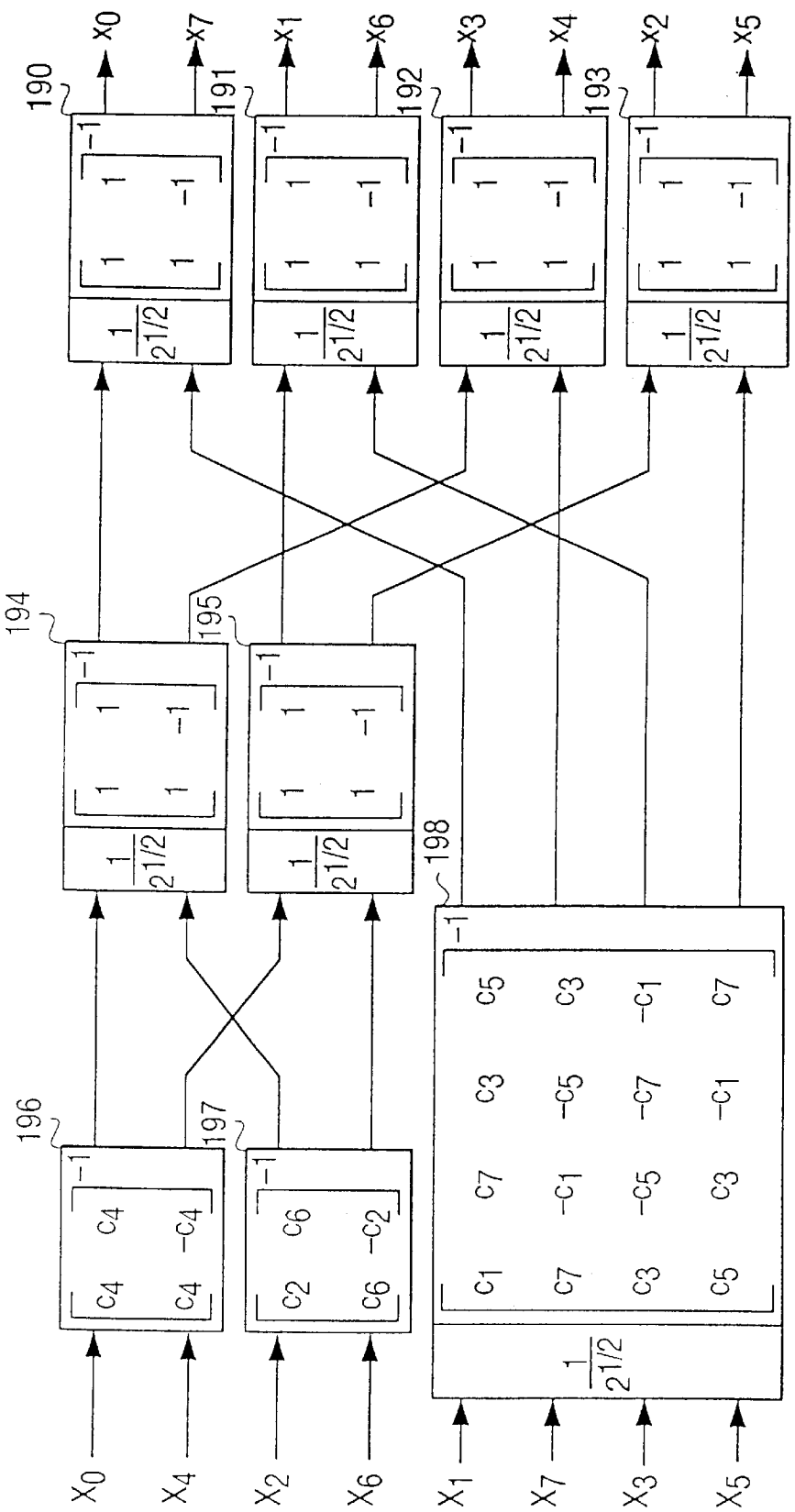

FIG. 13 illustrates an approximation accuracy of a matrix, that is, to which degree the matrix of the transformer 167 of FIG. 31 is approximated to the matrix of the transformer 187 of FIG. 24, for various sets of natural numbers (a2, a6). Referring to FIG. 13, the axis of ordinate indicates the cosine value of an angle provided by row vectors of the matrices of the transformer 167 and the transformer 187 and represents an approximation of the matrix. The axis of abscissa indicates the value of the determinant of the matrix of the transformer 167. Further, numerals in each parenthesis in FIG. 13 indicate values of (a2, a6) in this instance. The reason why the axis of abscissa indicates the value of the determinant is that, since the size of a table to be used for local quantization in reversible quantization with a 2×2 matrix depends upon the number of transform points in a basic region, it increases together with the magnitude of the determinant. In other words, values of (a2, a6) with which the magnitude of the determinant is as small as possible and the cosine value is as near as possible to 1 are preferably used. From FIG. 13, it can be seen that, when (a2, a6)=(12, 5), the approximation accuracy is good and also the magnitude of the determinant is not very large. This is the first reason why (a2, a6) are set to (a2, a6)=(12, 5).

Further, where those values are used, it is possible to remove the dynamic range difference between a transform result obtained by the transformer 167 of FIG. 31 and a transform result obtained by the transformer 187 of FIG. 24. When (a2, aB)=(12, 5), the determinant of the transform matrix is 132 and is a square number. Accordingly, if the quantization period is set to 169 and the dequantization period is set to 13, then the dynamic ranges of values after reversible quantization are $^{1}/_{13}$ time those prior to the quantization. Since the magnitude of the transform base is 13, the dynamic ranges of values obtained by linear transform with the matrix of the transformer 167 increase to approximately 13 times those of the transformer 187, but the variation in dynamic range is cancelled by the reversible quantization. Accordingly, the dynamic range differences between values obtained by the transformer 167 and the transformer 187 can be removed. This is the second reason why (a2, a6) are set to (a2, aB)=(12, 5).

Figure 14:
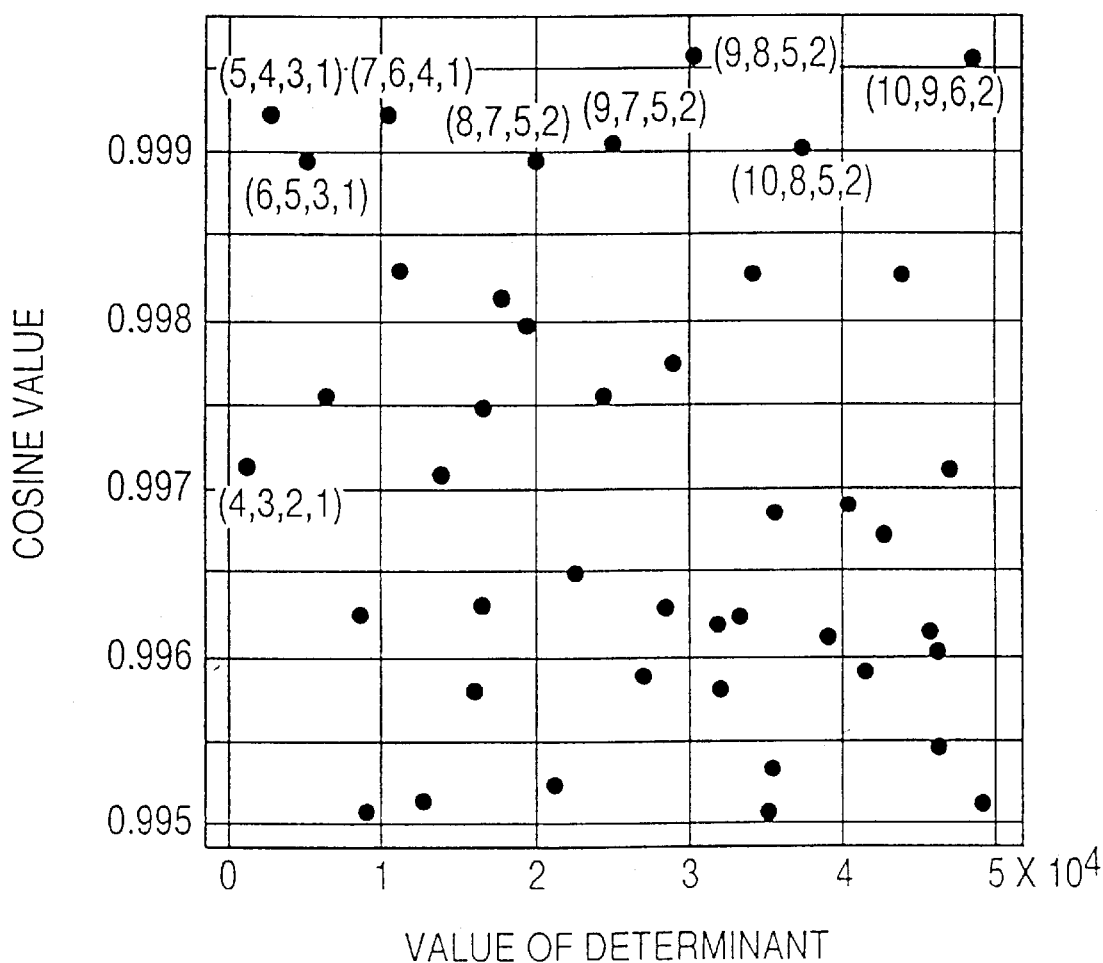
FIG. 14 is a similar view but illustrating a variation in approximation accuracy when the values of a1, a3, a5, a7 are varied.
Figure 22:
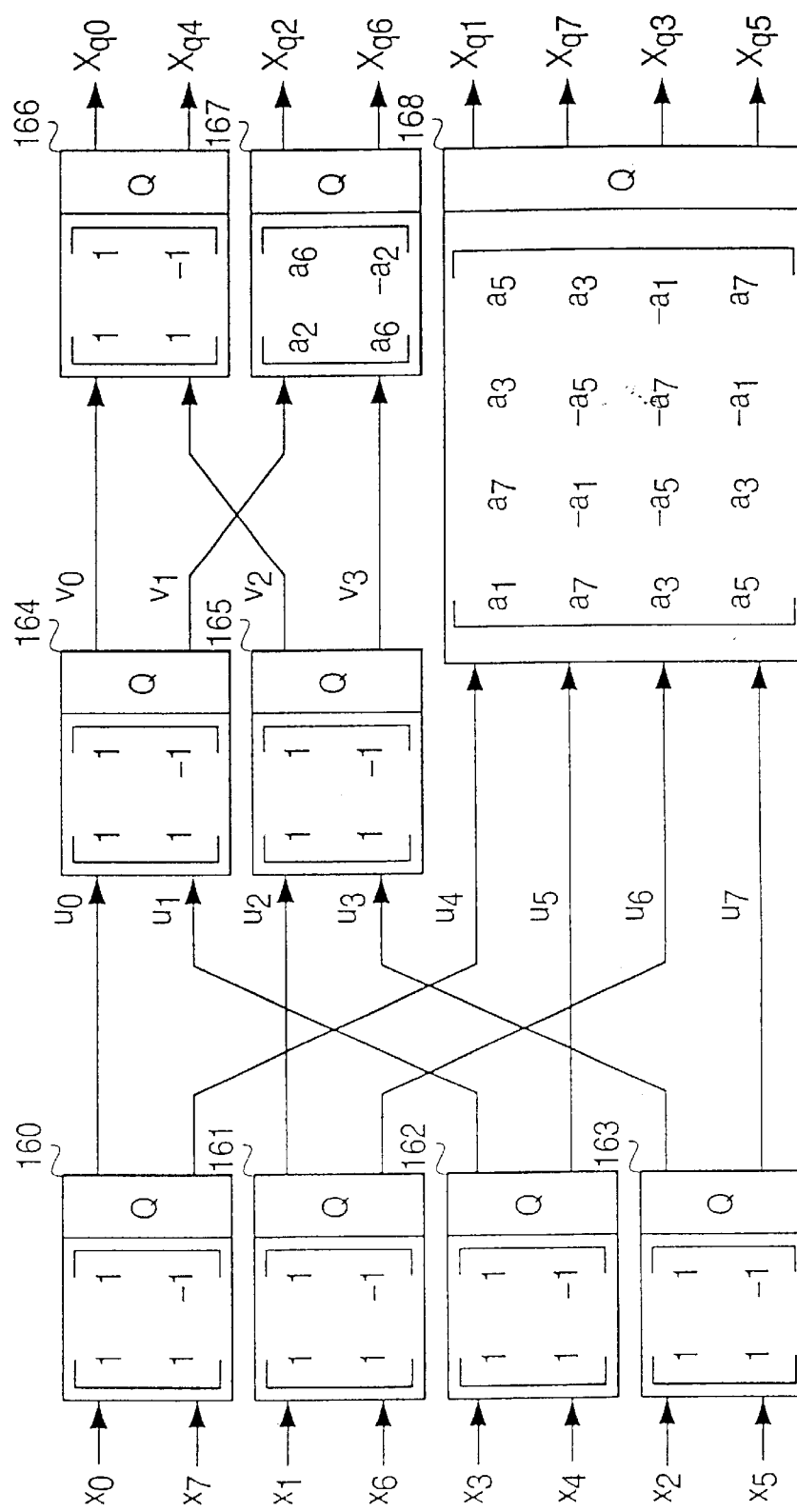
FIGS. 22 and 23 are block diagrams showing different conventional eight-element reversible discrete cosine transform systems.

Subsequently, (a1, a3, a5, a7) are described. FIG. 14 illustrates an approximation accuracy when various values are selected as (a1, a3, a5, a7), that is, to which degree the matrix of the transformer 168 of FIG. 22 is approximated to the matrix of the transformer 188 of FIG. 24. Similarly as in FIG. 13, the axis of ordinate indicates the cosine value of an angle provided by row vectors of the transform matrix, and the axis of abscissa indicates the determinant of the transform matrix. Further, numerals in each parenthesis indicate values of (a1, a3, a5, a7) in this instance. Similarly to the case of (a2, a6), since a table to be used for local quantization becomes large in accordance with the determinant of the transform matrix, a combination of values with which the value of the determinant is low and a good approximation accuracy is provided must be selected. From FIG. 14, it can be seen that, where (a1, a3, a5, a7)=(5, 4, 3, 1), the value of the determinant is not very high and the accuracy in approximation is good. While, as a combination which provides a higher approximation accuracy, there is a combination of (a1, a3, a5, a7)=(9, 8, 5, 2) from FIG. 14, the magnitude of the determinant is approximately 30,000, which is approximately 12 times that of (a1, a3, a5, a7)=(5, 4, 3, 1) which is 2,593. Accordingly, the combination (a1, a3, a5, a7)=(5, 4, 3, 1) is adopted here.

Figure 15A:
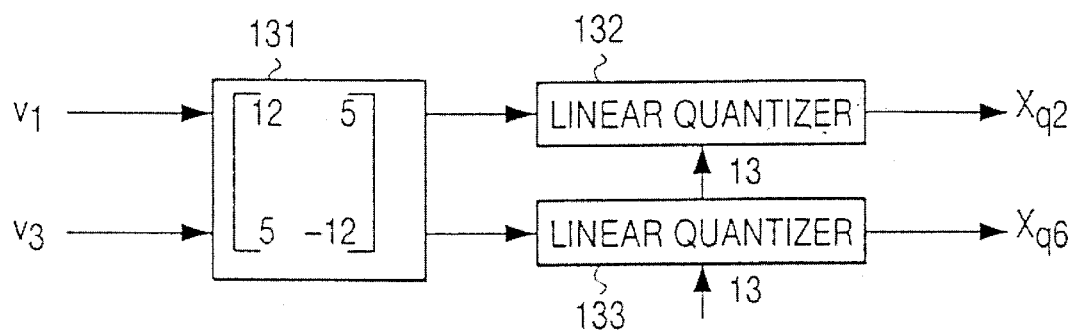
FIGS. 15(a) and 15(b) are block diagrams showing different forms of a transformer when (a2, a6) (12, 5)

FIG. 15(a) is a circuit diagram showing a construction of the means for obtaining quantization values (Xq2, Xq6) from an integer vector (v1, v3), that is, a form of the transformer 167 of FIG. 22. Referring to FIG. 15(a), in the transformer shown, an integer vector (v1, v3) is linearly transformed with $$\begin{bmatrix} 12 & 5 \\ 5 & -12 \end{bmatrix} \quad (32)$$

by a transformer 131. Then, results of the linear transform are linearly quantized with the step size of 13 by linear quantizers 132, 133 to obtain quantization values (Xq2, Xq6), respectively. In this manner, in the transformer shown in FIG. 15(a), a table which defines local quantization is not used to perform reversible quantization of a result of transform of (v1, v3).

This is because, for transform points according to the matrix of the expression (32), reversibility of quantization is secured only by linear quantization with the step size of 13. When points obtained by transform of integer lattice points with the matrix of the expression (32) are to be linearly quantized with the step size of 13, transform points are present one by one in individual quantization cells. Accordingly, if linear quantization is performed with the step size of 13, then different quantization values are allocated to the individual transform points, and the transform points are made to correspond to the quantization points in a one-by-one correspondence. Therefore, no quantization correspondence table is required. Since quantization in which a table is used need not be performed, the circuit can be simplified.

Figure 15B:
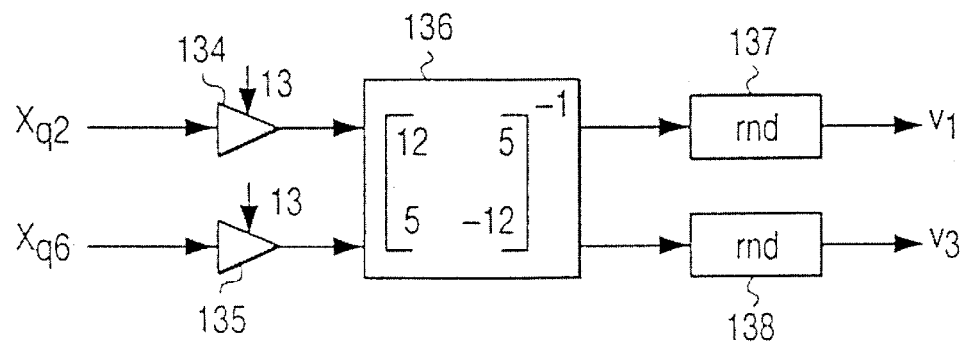

FIG. 15(b) is a circuit diagram showing a construction of the means for obtaining an integer vector (v1, v3) from quantization values (Xq2, Xq6), that is, a form of the transformer 177 of FIG. 32. Referring to FIG. 15(b), quantization values Xq2, Xq6 are multiplied by 13 to obtain linear dequantization values by multipliers 134, 135. Then, the linear dequantization values are linearly transformed with a matrix inverse to the matrix of the expression (32) by a transformer 136. Then, resulting values are rounded off into the nearest integers to obtain an integer vector (v1, v3) by rounding units 137, 138. It can be proved that, if the vector transformed by the circuit of FIG. 15(a) is transformed by the circuit of FIG. 15(b), then original values can be restored, and reversibility of quantization is satisfied. Since dequantization in which a table is used need not be performed in this manner, the circuit can be simplified.

The reversible transformers described above are further described together with particular values.

In the reversible transformer 1A shown in FIG. 1, as values of a1, a3, a5, a7 of the transformer 1 which performs linear transform, 5, 4, 3 and 1 are used. In this instance, g, h of the expression (18) are 48, 17, respectively, and the determinant D4 of the expression (21) is 2,593.

The quantization step sizes k1, k7 of the linear quantizers 4, 5 are both set to 7. This is because it is intended to make the dynamic ranges of the outputs (Xq1, Xq7) of the transformer 1 approach the dynamic ranges of the outputs (X1, X7) of the transformer 188 in the original discrete cosine transform shown in FIG. 24 as near as possible. When a1, a3, a5, a7 have the values mentioned above, the magnitude of the input vector (u4, u5, u6, u7) is increased to approximately 5½ times by transform of the matrix of the transformer 1. Thus, this can be cancelled almost by setting k1, k7 to k1=k7=7, and the dynamic ranges of the values (Xq1, Xq7) after the quantization are nearly equal to those of the outputs (X1, X7) of the transformer 188.

Figure 16A:
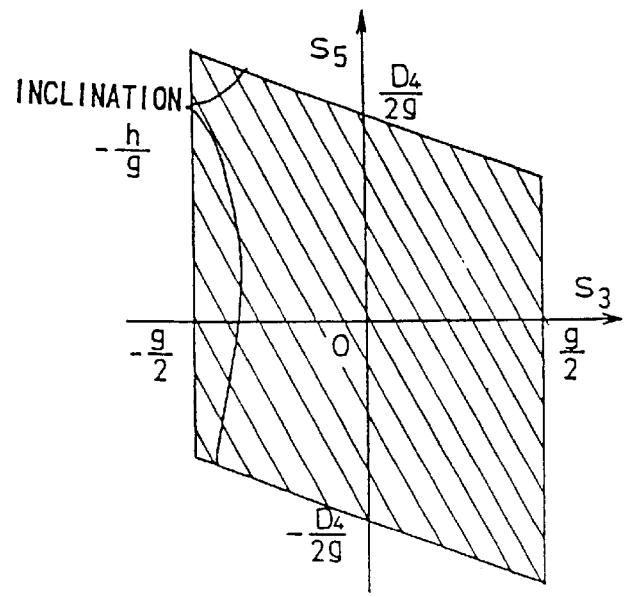
FIG. 16(a) is a diagrammatic view illustrating a region in which representative elements (s3, s5) are present.
Figure 16B:
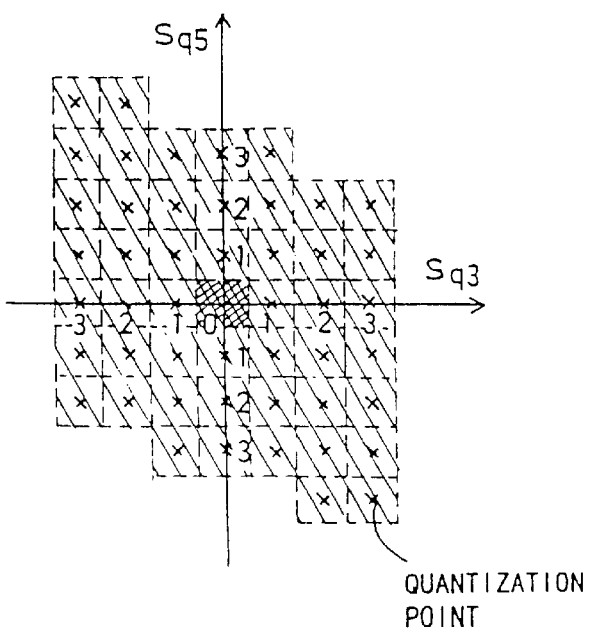
FIG. 16(b) is a diagrammatic view illustrating an example of a range in which local quantization values (sq3, sq5) to be allocated can be taken with respect to the region shown in FIG. 16(a) in which the representative elements (s3, s5) are present.

On the other hand, the values of the linear quantizers L3 and L5 are both set to 2,593/379. The reason why those values are used is described subsequently. Those values vary, as can be seen also from FIG. 3, depending upon the shape of the range in which local quantization values are present and hence upon the shape of the region in which the representative elements (s3, s5) are present. Here, a parallelogram region of FIG. 16(a) is used as the region in which representative elements are present, and a region of FIG. 16(b) is used as the range in which local quantization values are present. The ranges are set in this manner because they produce less wasteful quantization points in quantization and achieve efficient quantization. In this instance, if the lowest values of M3, M5 of the expression (27) with which no overlap occurs with quantization values are calculated, then M3=M5=379 are obtained. In this instance, M3 can be calculated in accordance with the following expression (33):

$$M_3 = \left\lceil \frac{2593 \times 7}{48} \right\rceil = \lceil 378.1 \cdots \rceil = 379 \qquad (33)$$

For the value of M5, the value is successively varied to check whether or not an overlap of quantization values occurs to discriminate a minimum value with which no overlap occurs. Thus, the values of the step sizes L3, L5 can be determined both as 2,593/379 from the expression (27) taking the determinant D4=2,593 as the quantization period.

Figure 17A:
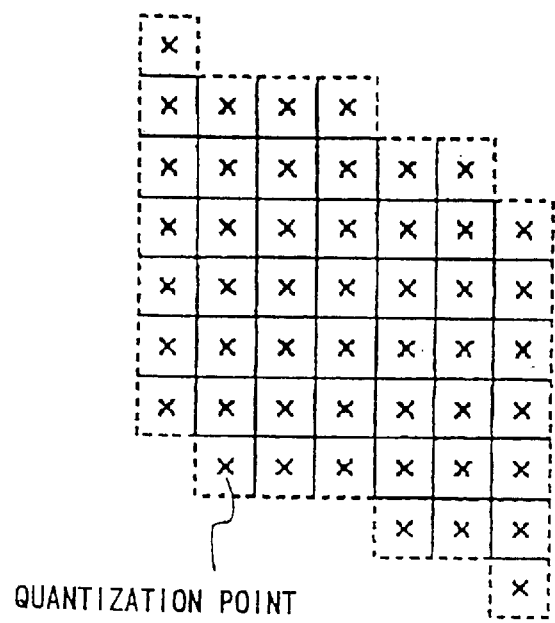
FIGS. 17(a) to 17(c) are diagrammatic views illustrating different examples of the shape of a region in which local quantization values to be allocated are present with respect to the region shown in FIG. 16(a) in which the representative elements re present.
Figure 17B:
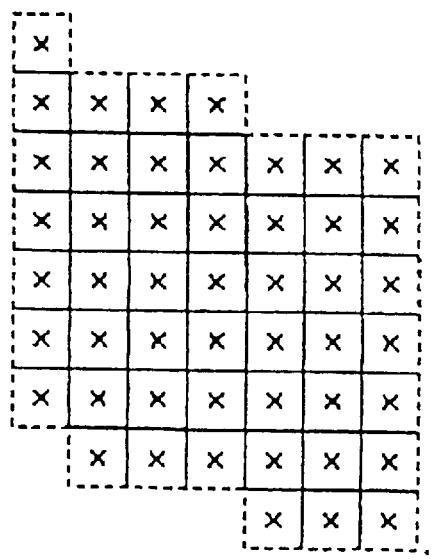
Figure 17C:
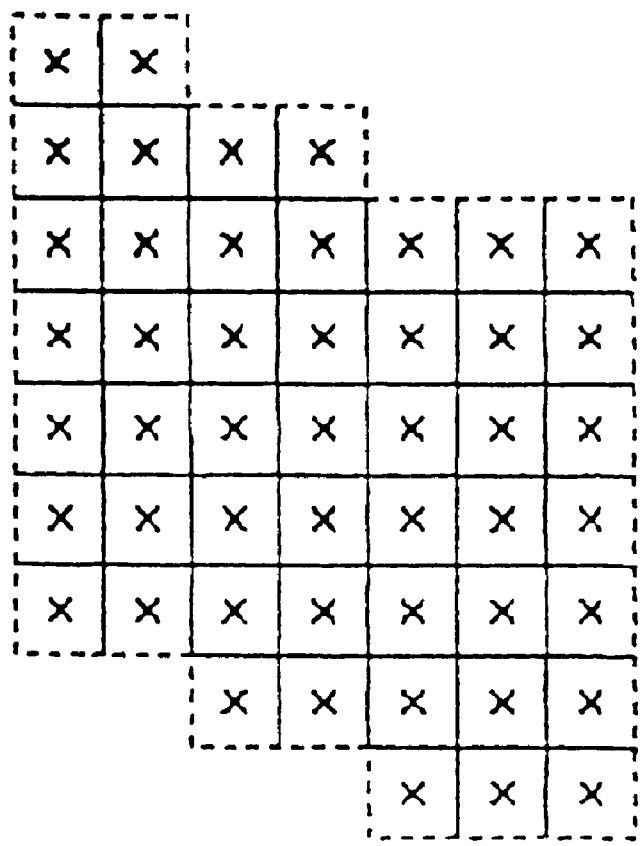
Figure 18C:
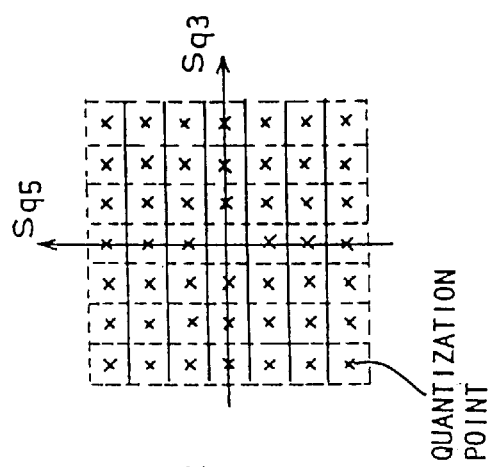
FIG. 18(c) is a diagrammatic view showing an example of the shape of a region in which local quantization values to be allocated are present when the region in which representative values are present is set to the region of FIG. 18(a) or 18(b)
Figure 18B:
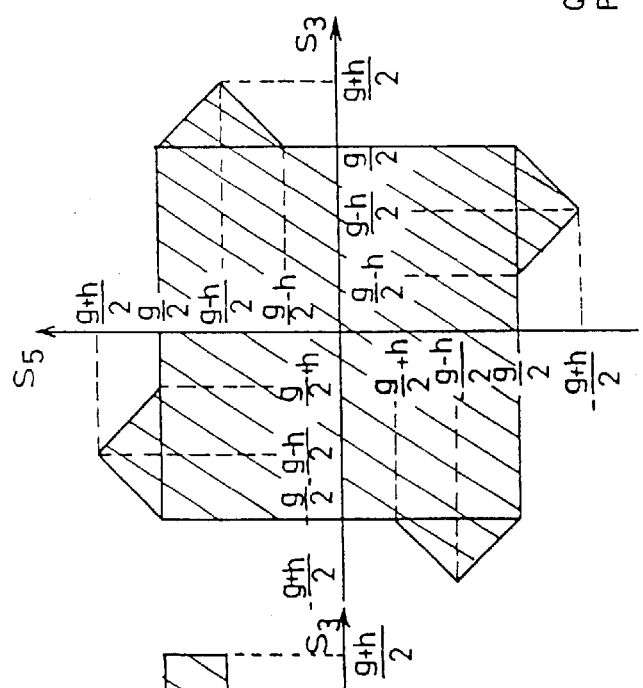
FIGS. 18(a) and 18(b) are diagrammatic views illustrating different examples of the region in which representative values are present.
Figure 18A:
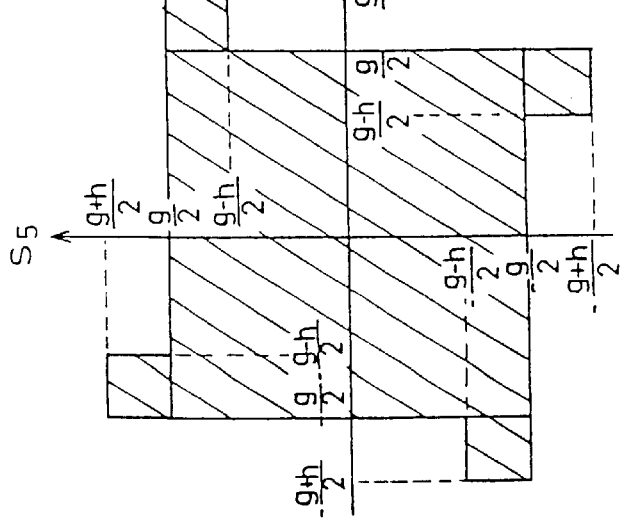

It is to be noted that, where the range in which the representative elements (s3, s5) are present is the parallelogram region of FIG. 16(a), the shape of the range in which local quantization values are present may be set to such as shown in FIG. 17(a), 17(b) or 17(c). However, also in those instances, M3=M5=379 are satisfied similarly. Further, the range in which the representative elements (s3, s5) are present may be such as shown in FIG. 18(a) or 18(b) other than that of FIG. 16(a). In this instance, the range in which the local quantization values (sq3, sq5) are present may be set to such as shown in FIG. 18(c).

Subsequently, an example of the first numeric table is given as Table 1 below. Since g, h of the expression (18) are 48, 17, respectively, and are prime relative to each other, representative elements can be determined by using only one of components z1(X1, X7) and z2(X1, X7) of the expression (23) as an input. Here, the relationship between $$z_1(X_1,X_7)=\mathrm{mod}(gX_1+hX_7,D_4)=\mathrm{mod}(48X_1+17X_7, 2593) \qquad (34)$$

and the representative elements (s3, s5) are described in Table 1. The relationship between the component z1 (X1, X7) and the representative elements (s3, s5) can be determined in advance from a requirement that the input signals (u4, u5, u6, u7) make an integer vector in transform of the expression (24). Here, the range of presence of the representative elements (s3, s5) is the region of FIG. 16(a) as described hereinabove. When to determine representative elements (s3, s5) using the first numeric table 2 of FIG. 1, the value of the expression (34) is calculated first, and then, from the thus calculated value, Table 1 is referred to determine representative elements (s3, s5).

TABLE 1

| $z_1(X_1,X_7)$ | $s_3$ | $S_5$ |
|---|---|---|
| 0 | 0 | 0 |
| 1 | −7 | −17 |
| 2 | 17 | −31 |
| . | . | . |
| . | . | . |
| . | . | . |
| 2591 | −17 | 31 |
| 2592 | 7 | −17 |

Subsequently, the second numeric table is described. While a table is selected based on a value of the expression (22) for the quantization representative values (k1Xq1, k7Xq7), that is, the vector z(k1Xq1, k7Xq7) as described hereinabove, similarly as in the case of Table 1, only one of components of it may be used as an index. Here, the value of the expression (34) for the quantization representative values (k1Xq1, k7Xq7), that is, $$z_1(k_1X_{q1}, k_7X_{q7})=\mathrm{mod}(gk_1X_1+hk_7X_7, D_4)=\mathrm{mod}(48\times 7X_1+17\times 7X_7, 2593) \qquad (35)$$

is used as an index. An example of the second numeric table for a case wherein the index is 0, that is, the value of the expression (35) is 0, is indicated in Table 2. Here, while also the values of the quantization residuals (r1, r7) are described simultaneously, since the set of values which can be taken by the quantization residuals (r1, r7) is actually fixed without depending upon the quantization values (Xq1, Xq7) as described hereinabove, the values of quantization residuals (r1, r7) are unnecessary if it is known to which quantization residuals (r1, r7) the values of local quantization values (sq3, sq5) in the relevant row in Table 2 correspond.

TABLE 2

| $r_1$ | $r_7$ | $s_{q3}$ | $s_{q5}$ |
|---|---|---|---|
| −3 | −3 | −1 | −3 |
| −2 | −3 | −2 | 4 |
| −1 | −3 | 0 | 3 |
| 0 | −3 | 3 | 2 |
| . | . | . | . |
| . | . | . | . |
| . | . | . | . |
| 2 | 3 | 3 | −4 |
| 3 | 3 | 1 | 3 |

Subsequently, a method of production of the second numeric table is described. First, representative elements (s3, s5) corresponding to each quantization residuals (r1, r7) are calculated. Where the index of a table is represented by t, since $z1(k1Xq1, k7Xq7)=t$, the value of $z1(X1, X7)$ corresponding to each quantization residuals (r1, r7) is given by $$z_1(X_1, X_7) = z_1(k_1 X_{q1} + r_1, k_7 X_{q7} + r_7) = \mod(t + 48r_1 + 17r_7, 2593) \quad (36)$$

Consequently, the values of representative elements (s3, s5) can be determined using Table 1. The values of representative elements (s3, s5) corresponding to each quantization residuals (r1, r7) can be determined in this manner. Then, for the set of the thus determined representative elements (s3, s5), quantization values (sq3, sq5) are allocated. Then, each quantization residuals (r1, r7) and local quantization values (sq3, sq5) are described in a corresponding in the table. Local quantization values (sq3, sq5) for each quantization residuals (r1, r7) can be determined in this manner. This manner for the case of t=0 is indicated in Table 3.

TABLE 3

| $r_1$ | $r_7$ | $z_1(X_1,X_7)$ | $s_3$ | $S_5$ | $s_{q3}$ | $s_{q5}$ |
|---|---|---|---|---|---|---|
| −3 | −3 | 2398 | −7 | −20 | −1 | −3 |
| −2 | −3 | 2446 | −19 | 33 | −2 | 4 |
| −1 | −3 | 2494 | 0 | 21 | 0 | 3 |
| 0 | −3 | 2542 | 19 | 9 | 3 | 2 |
| . | . | . | . | . | . | . |
| . | . | . | . | . | . | . |
| . | . | . | . | . | . | . |
| 2 | 3 | 147 | 19 | −33 | 3 | −4 |
| 3 | 3 | 195 | 7 | 20 | 1 | 3 |

For the values of a1, a3, a5, a7 of the transformer 30 in the reversible transformer 1C shown in FIG. 4, 5, 4, 3, 1 are used, respectively. For the multipliers k1, k7 to be used by the multipliers 34, 35, the values used in the reversible transformer 1A of FIG. 1, that is, k1=k7=7, are used.

Subsequently, the third numeric table 32 is described. This is a table which provides transforms inverse to those of the second numeric table. Consequently, similarly to the second numeric table 3 of FIG. 1, the value of the expression (35) is used as an index for selection of a table. In particular, the value of the expression (35) is calculated first, and then a table to be used is selected in accordance with the value. The third numeric table 32 can be obtained basically by replacing the inputs and the outputs of the second numeric table with each other. An example of the table is shown in Table 4. It is to be noted that, since the set of values which can be taken by the local quantization values (sq3, sq5) are settled irrespective of the quantization values (Xq1, Xq7), also in this instance, similarly to the second numeric table of FIG. 1, by determining in advance the values at which stage of the table correspond to the pertaining local quantization values (sq3, sq5), the necessity to write the values of the local quantization values (sq3, sq5) in the table in advance is eliminated. Consequently, the table can be formed small.

TABLE 4

| $s_{q3}$ | $s_{q5}$ | $r_1$ | $r_7$ |
|---|---|---|---|
| 2 | −4 | 3 | −2 |
| 3 | −4 | 2 | 3 |
| −1 | −3 | −3 | −3 |
| 0 | −3 | 1 | 3 |
| . | . | . | . |
| . | . | . | . |
| . | . | . | . |
| −3 | 4 | 1 | 1 |
| −2 | 4 | −2 | −3 |

The fourth numeric table is used to determine representative elements (s3, s5) from the transform coefficients X1, X7, and for the fourth numeric table, the first numeric table described above can be used as it is. Also with this table, similarly as in the case of the first numeric table 2 of FIG. 1, the values of z1(X1, X7) are calculated first, and then a table is referred to in accordance with the values to determine representative elements (s3, s5).

A detailed example of the global signal and local quantization value calculation circuit is shown in FIG. 5(a). Referring to FIG. 5(a), the circuit shown includes a global signal value candidate ($p3^{(\emptyset)}$, $p5^{(\emptyset)}$) calculation circuit 40, local quantization value candidate calculation circuits 47, 48, 49, 50, adders 41, 42, 43, 44, 45, 46, and a selection circuit 51. Each of the local quantization value candidate calculation circuits 47, 48, 49, 50 can be realized with a circuit of FIG. 5(b) which includes linear quantizers 52, 53, and adders 54, 55. For the values of the step sizes L3, L5 for quantization by the linear quantizers 52, 53, the values mentioned hereinabove, that is, L3=L5=2,593/379, are used.

The values of constants $\Delta p3^{(1)}$, $\Delta p5^{(1)}$, $\Delta p3^{(2)}$, $\Delta p5^{(2)}$, $\Delta p3^{(3)}$, $\Delta p5^{(3)}$ to be added by the adders 41, 42, 43, 44, 45, 46 vary depending upon the coordinates of which one of the global signal candidate points 56, 57, 58, 59 of FIG. 6 the outputs of the global signal value candidate ($p3^{(\emptyset)}$, $p5^{(\emptyset)}$) calculation circuit 40 represent. For example, if ($p3^{(\emptyset)}$, $p5^{(\emptyset)}$, ($p3^{(1)}$, $p5^{(1)}$), ($p3^{(2)}$, $p5^{(2)}$), ($p3^{(3)}$, $p5^{(3)}$) are such as illustrated in FIG. 6, then the constants to be added by the adders 41, 42, 43, 44, 45, 46 are 17, 48, −48, 17, −31, 65, respectively.

The selection circuit 51 holds values which can be taken by the local quantization values illustrated in FIG. 16(b) and successively compares them with input vectors ($sq3^{(\emptyset)}$, $sq5^{(\emptyset)}$, ($sq3^{(1)}$, $sq5^{(1)}$), ($sq3^{(2)}$, $sq5^{(2)}$), ($sq3^{(3)}$, $sq5^{(3)}$) to find out values which can be taken actually. Then, the values determined that they can be taken are outputted as the local quantization values (sq3, sq5). Further, the corresponding values of ($p3^{(1)}$, $p5^{(1)}$) are outputted as the global signals (p3, p5).

Another detailed example of the global signal and local quantization value calculation circuit is shown in FIG. 7. Referring to FIG. 7, the circuit shown includes a global signal value candidate ($p3^{(\emptyset)}$, $p5^{(\emptyset)}$ calculation circuit 70, linear quantizers 71, 72, an index calculation circuit 73, a fifth numeric table 74, and adders 75, 76, 77, 78. For the global signal value candidate ($p3^{(\emptyset)}$, $p5^{(\emptyset)}$) calculation circuit 70, any of the circuits shown in FIGS. 12(a) to 12(d) may be used. For the values of the step sizes L3, L5 for quantization by the linear quantizers 71, 72, the values mentioned hereinabove, that is, L3=L5=2,593/379, are used. The linear quantizers 71, 72 linearly quantize (p3$^{(\emptyset)}$, p5$^{(\emptyset)}$) and simultaneously calculate the quantization residuals (r3$^{(\emptyset)}$, r5$^{(\emptyset)}$ represented by the expression (29).

Figure 19A:
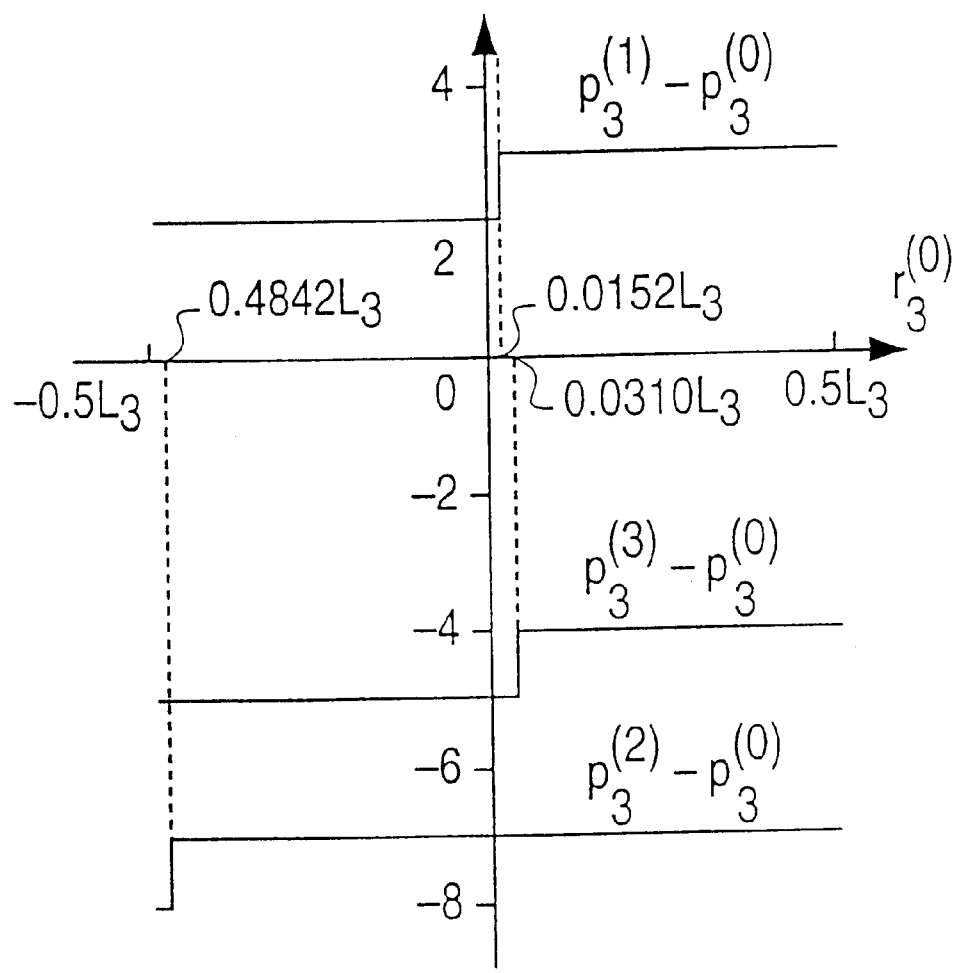
Figure 20:
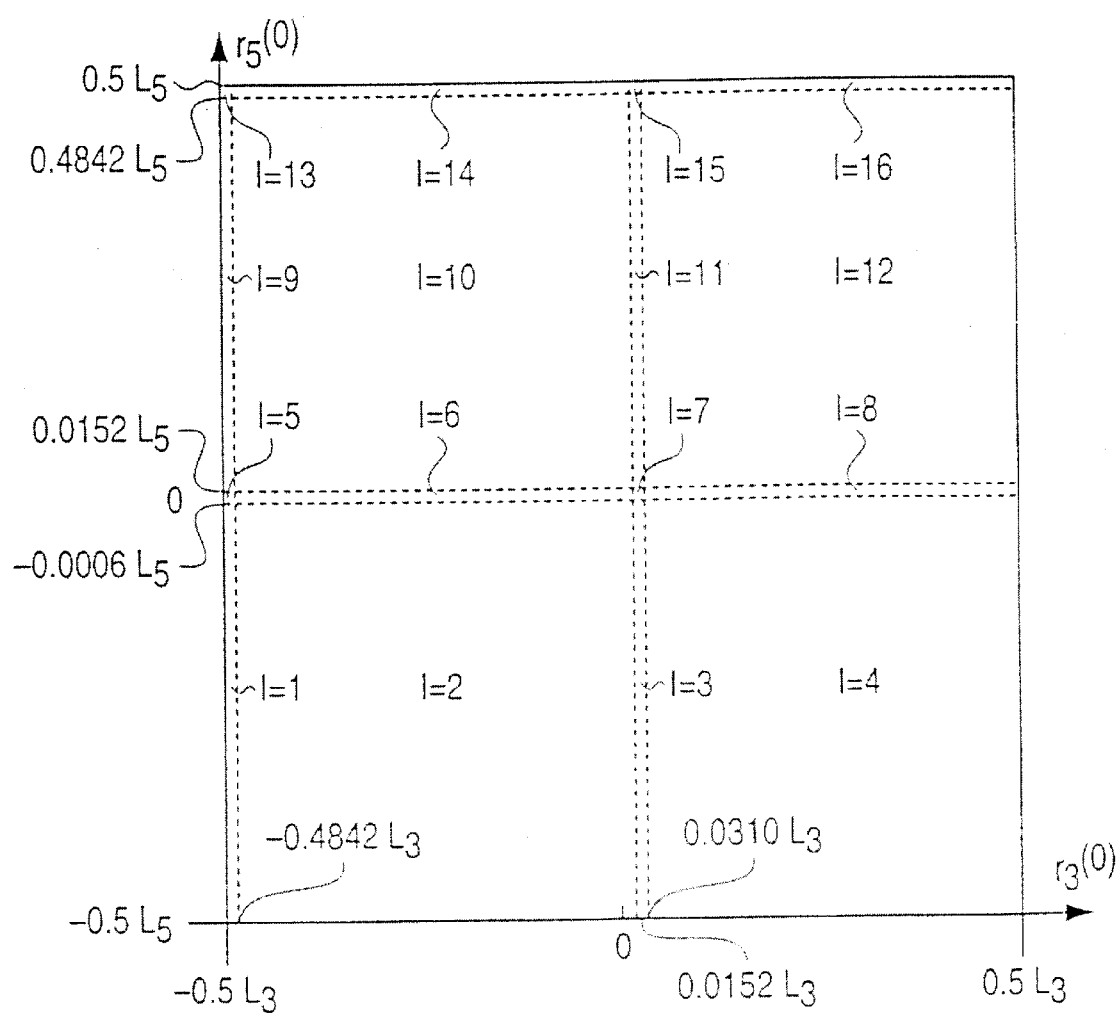
FIG. 20 is a diagrammatic view illustrating a correspondence between quantization residuals and an index output by the index calculation circuit.
Figure 21:
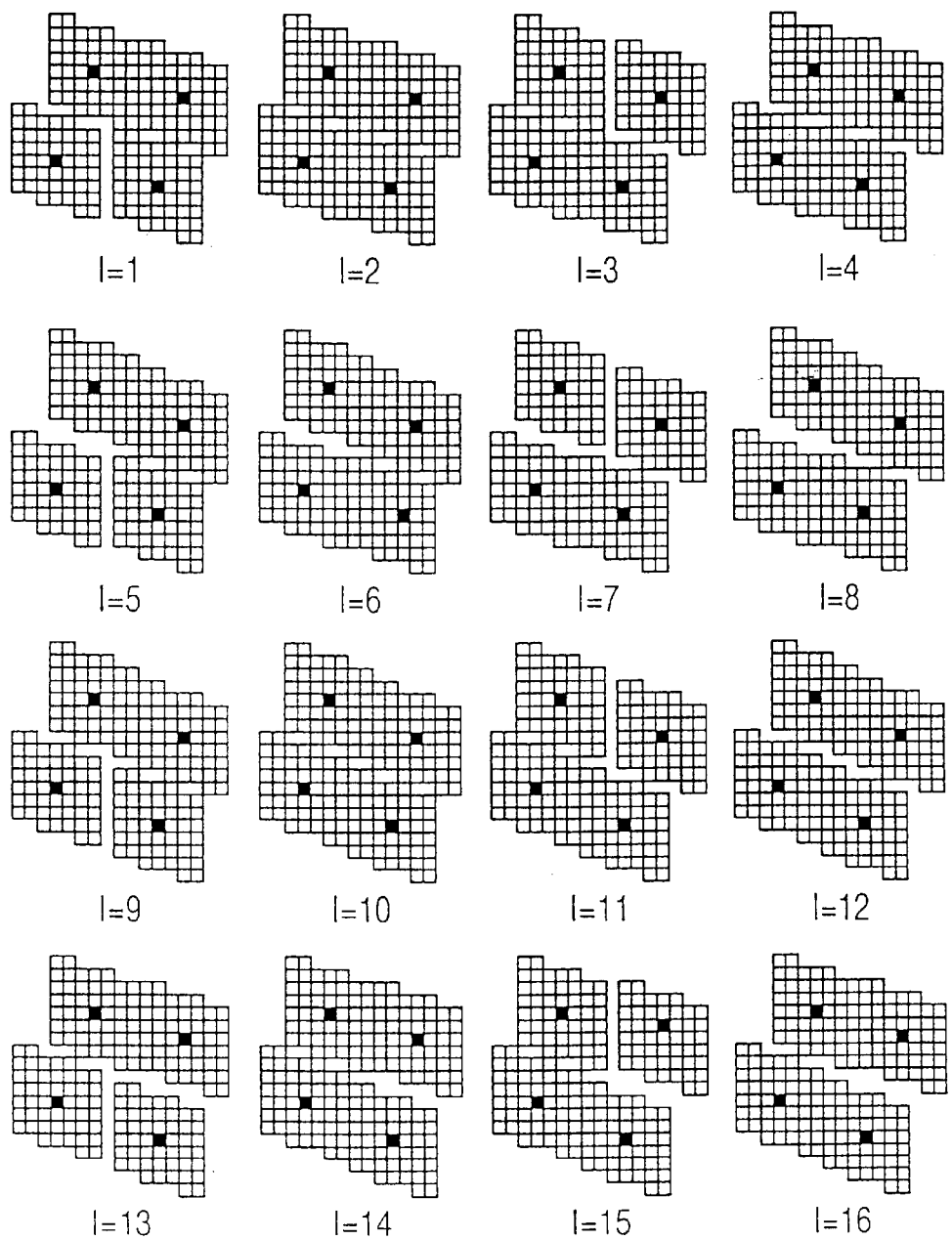
FIG. 21 is a diagrammatic view illustrating a relationship between a global quantization value and a value obtained by adding a local quantization value to the global quantization value for different indices illustrated in FIG. 20.

The index calculation circuit 73 calculates an index for the fifth numeric table from the quantization residuals (r3$^{(\emptyset)}$, r5$^{(\emptyset)}$). When (p3$^{(\emptyset)}$, p5$^{(\emptyset)}$) calculated by the global signal value candidate (p3$^{(3)}$, p5$^{(\emptyset)}$) calculation circuit 70 are coefficients of the global signal candidate point 56 of FIG. 6 and the values of (p3$^{(1)}$, p5$^{(1)}$), (p3$^{(2)}$, p5$^{(2)}$), (p3$^{(3)}$, p5$^{(3)}$) are coordinates of the global signal candidate points 57, 58, 59 as seen in FIG. 6, respectively, if the range which can be taken by the local quantization values is such as shown in FIG. 16(*b*), the relationship among the –global signal candidate points varies in such a manner as seen in FIGS. 19(*a*) and 19(*b*). Consequently, depending upon at which position of FIG. 20 the values of the quantization residuals (r3$^{(\emptyset)}$, r5$^{(\emptyset)}$) are present, the relationship between the local quantization value candidate (sq3$^{(\emptyset)}$, sq5$^{(\emptyset)}$) and the quantization values (Xq3, Xq5) varies in such a manner as seen in FIG. 21. The index calculation circuit 73 discriminates in which one of the regions of FIG. 20 the quantization residuals (r3$^{(\emptyset)}$, r5$^{(\emptyset)}$) are included, and outputs an index I ($1 \leq I \leq 16$).

The fifth numeric table 74 prepares tables (refer to FIG. 8(*c*)) to be used to determine the global signal differences ($\Delta$p3, $\Delta$p5) and the local quantization values (sq3, sq5) from the local quantization value candidate (sq$_3$$^{(\emptyset)}$, sq5$^{(\emptyset)}$) corresponding to global signal candidate points (p3$^{(\emptyset)}$, p5$^{(\emptyset)}$) for the 16 different cases shown in FIG. 21. Then, the fifth numeric table 74 selects a table to be used in accordance with the index I inputted thereto and determines the local quantization values (sq3, sq5) and the global signal differences ($\Delta$p3, $\Delta$p5) using the selected table.

The global signal value candidate (p3$^{(\emptyset)}$, p5$^{(\emptyset)}$ calculation circuit 70 includes, as seen from FIGS. 12(*a*) to 12(*d*), multipliers 100, 101, transformers 102, 105, and a fraction part rounding up unit or units and/or a fraction part discarding unit or units. As described hereinabove, such four different circuits as shown in FIGS. 12(*a*) to 12(*d*) are possible depending upon the combination of a fraction part rounding up unit or units and/or a fraction part discarding unit or units. Here, for L3, L5, g and h, the values mentioned hereinabove are used. In particular, L3=L5=2,593/379, g=48, and h=17.

While, as the values of a2, a6 of the transformer 167 in the system shown in FIG. 31, various values may be used, where (a2, a6)=(12, 5) are used, the transform coefficients obtained exhibit values near to transform coefficients of the original discrete cosine transform.

In quantization of the transformer according to the matrix of the expression (25), the quantization periods are set to (14, 10) and the dequantization periods are set to (10, 7), or the quantization periods are set to (10, 14) and the dequantization periods are set to (7, 10). While the quantization periods may be any values only if they are equal to a fixed number of times the absolute value 2 of the determinant, the specific values mentioned above are used by the following reasons. One reason is that the number of transform points and the number of quantization points in a basic region are both 70 and equal to each other and redundancies present in a result of transform can be removed completely by quantization. The other reason is that the values after quantization are approximately $^{10}/_{14}$ times and $^{7}/_{10}$ times those prior to the quantization, respectively, and portions enlarged to 2½ times by transform of the matrix of the expression (25) can be cancelled almost completely. Consequently, results obtained by the transformers 160, 161, 162, 163, 164, 165, 166 of FIG. 31 are near to results obtained by the transformers 180, 181, 182, 183, 184, 185, 186 of FIG. 24, respectively.

In transform with the matrix of the expression (26), a2 and a6 are set to a2=12 and 16=5, and the quantization periods are set to (169, 169) and the dequantization periods are set to (13, 13). By this setting, portions enlarged to 13 times with the matrix of the expression (26) can be Just cancelled because they are reduced to ⅓ time by reversible quantization. Consequently, a result obtained by the transformer 167 of FIG. 31 is near to a result obtained by the transformer 187 of FIG. 24.

In dequantization of the dequantizers 170 to 176 in the system shown in FIG. 32, tables which describe relationships reverse to those of the quantization correspondence tables used by the transformers 160 to 168 of FIG. 31 are used. Further, in dequantization of the transformer 177, a table which describes a relationship reverse to that of the quantization correspondence table used by the transformer 167 of FIG. 31 is used. An inverse transform circuit can be constructed using such tables as described above.

Of the eight transform coefficients calculated in such a manner as described above, only Xq3 and Xq5 illustrated in FIG. 31 are different from those of the conventional example. A result of an investigation for differences between the values of Xq3 and Xq5 illustrated in FIG. 31 and transform coefficients Xq3 and Xq5 of the original eight-element discrete cosine transform conducted based on an actual picture is given in Table 5 below.

TABLE 5

|  | Present invention | Conventional procedure |
| --- | --- | --- |
| Square mean of Xq3 – X3 | 2.73 | 4.29 |
| Square mean of Xq5 – X5 | 1.03 | 4.54 |

Table 5 was obtained by performing, for the brightness values of a plurality of actual pictures, eight-element reversible discrete cosine transform and the original eight-element discrete cosine transform only in a horizontal direction and calculating square means of the differences between coefficients obtained by the transforms. From Table 5, it can be confirmed that the eight-element reversible discrete cosine transform of the present invention can obtain values nearer to transform coefficients of the original eight-element discrete cosine transform than the eight-element reversible discrete cosine transform of the procedure of the conventional example described hereinabove.

Further, while, in the eight-element reversible discrete cosine transform of the conventional example, quantization in which a table is used is performed as global quantization of the transform coefficients (X3, X5) in reversible quantization of a 4×4 matrix transform, in the present invention, linear quantization can be used for such quantization. Consequently, a table for use for global quantization of transform coefficients (X3, X5), which is conventionally required, need not be used. Further, where the values of a2, a6 of the expression (26) are set to 12, 5, also the reversible quantization with the matrix can be replaced with linear quantization, and a quantization correspondence table is unnecessary. Consequently, the coding unit can be further simplified.

Subsequently, an embodiment of the present invention which employs a JPEG compatibility table for compensation for a difference in dynamic range is described.

Figure 33:
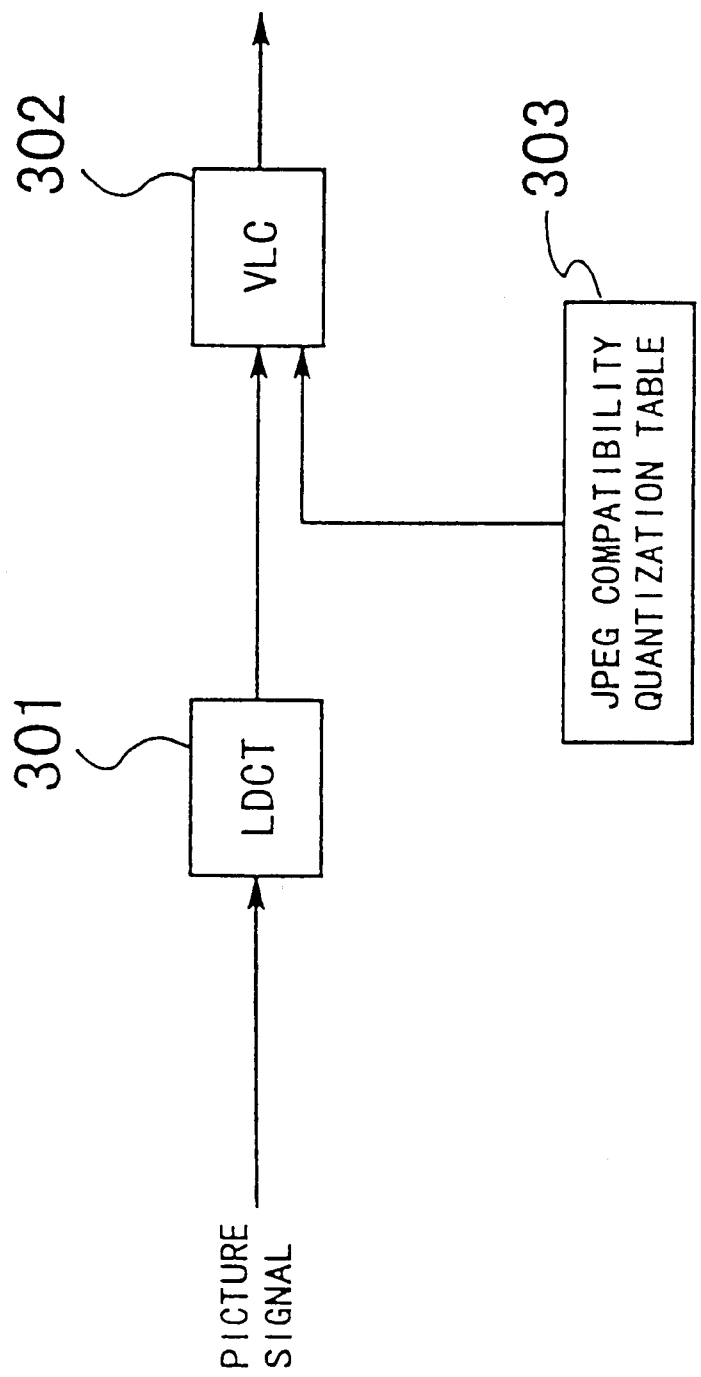
FIG. 33 is a block diagram showing a system which performs coding using a JPEG compatibility quantization table.

FIG. 33 shows a system construction of the embodiment of the present invention. Referring to FIG. 33, the system shown includes a reversible discrete cosine transformer (LDCT) 301, a variable length coder (VLC) 302 and a JPEG compatibility quantization table 303.

The reversible discrete cosine transformer 301 performs reversible discrete cosine transform of a picture for each block and outputs transform coefficients. The variable length coder 302 variable length codes the output of the reversible discrete cosine transformer 301 and values of the JPEG compatibility quantization table 303 and outputs a result of the variable length coding.

Subsequently, a procedure of calculation of values of the JPEG compatibility quantization table 303 is described.

A quantization table for use with ordinary picture coding is a table which is used to vary the quantization step size for each discrete cosine transform coefficient and is adopted by the JPEG which is the international standards for still picture coding. Each of values of the table determines the quantization step size for a transform coefficient at the position. In particular, where the value at the ith row and jth column (i=0, . . . , 7, j=0, . . . , 7) of the quantization table is represented by W(i, j), in the JPEG (extended system), the relationship between a quantization value Xq(i, j) and a dequantization value X(i, j) of the (i, j) component (where (i, j) ≠ (0, 0)) of a transform coefficient is given by the following expressions (35), (36):

$$y = \frac{X_q(i, j)W(i, j)s}{16} \quad (35)$$

$$X(i, j) = \text{Sign}(y) \times \lfloor |y| \rfloor \quad (36)$$

where s is a parameter called quantization scale and does not rely upon i, j, and Sign(y) assumes a value given by the following expression (37):

$$\text{Sign}(y) = \begin{cases} 1 & (y > 0) \\ 0 & (y = 0) \\ -1 & (y < 0) \end{cases} \quad (37)$$

As can be seen from the expressions (35), (36) given above, the values of transform coefficients other than Xq(0, 0) are multiplied by approximately W(i, j)s/16 times by the dequantization.

In this manner, by the decoder, quantized transform coefficient values Xq(i, J) are expanded or contracted by dequantization before inverse discrete cosine transform is performed. Then, the magnification can be set freely for each transform coefficient using the quantization table. Accordingly, when to decode a transform coefficient of the reversible discrete cosine transform by the original inverse discrete cosine transform, if the dynamic range of transform coefficients of the reversible discrete cosine transform is corrected using quantization table values W(i, j) before the transform coefficients are inverse discrete cosine transformed by a decoder, then the quality of the decoded picture can be improved.

As described above, transform coefficients of the reversible discrete cosine transform and transform coefficients of the original discrete cosine transform have a difference in dynamic range. This arises from the fact that the rate of extension by linear transform with an integer matrix and the rate of contraction by reversible quantization in which a table is used do not completely coincide with each other.

In the reversible discrete cosine transform, since the base of the transform is extended when an original discrete cosine transform is approximated with an integer matrix linear transform, also a result obtained exhibits an extension.

To the contrary, in the reversible quantization, a value after quantization exhibits a contraction in dynamic range comparing with that prior to the quantization.

The dynamic range difference does not appear if the extension amount is just cancelled by the compression. Generally, however, since the rates of the extension and the contraction do not completely coincide with each other, transform coefficients of the reversible discrete cosine transform have a dynamic range difference from transform coefficients of the original discrete cosine transform. This difference takes place in 2×2 and 4×4 partial transforms illustrated in FIG. 22.

While the original eight-element discrete cosine transform can be decomposed as seen in FIG. 24, the difference by the partial transforms particularly arises from dynamic range differences between transform results obtained by the mutually corresponding transformers shown in FIGS. 22 and 24, that is, dynamic range differences between transform results obtained by the transformer 160 and the transformer 180, the transformer 161 and the transformer 181, the transformer 162 and the transformer 182, the transformer 163 and the transformer 183, the transformer 164 and the transformer 184, the transformer 165 and the transformer 185, the transformer 166 and the transformer 186, the transformer 167 and the transformer 187, and the transformer 168 and the transformer 188.

Thus, the difference in dynamic range of transform coefficients obtained finally is an accumulation of differences which take place in partial transforms through which the transform coefficients are obtained.

Subsequently, a detailed procedure of calculating a difference in dynamic range and determining quantization table values based on the difference is described.

First, a dynamic range of the reversible discrete cosine transform when a 2×2 matrix transform is to be performed is calculated. The coordinates of a transform point obtained by transform of an integer vector with the 2×2 matrix are presented by (Y1, Y2) and the magnitude of the row vector of the transform matrix is represented by L. In this instance, the values of Y1, Y2 are equal to L times those of the original discrete cosine transform. This is because, while each partial transform of the original discrete cosine transform illustrated in FIG. 24 does not present a difference in magnitude of vector before and after the transform, the reversible discrete cosine transform changes the magnitude of the transform result (Y1, Y2) to L times the magnitude of the vector before the transform.

On the other hand, in reversible quantization after linear transform, where the quantization periods are represented by (N1, N2) and the dequantization periods are represented by (M1, M2), the values of Y1, Y2 are contracted approximately to M1/N1 times and M2/N2 times, respectively. Accordingly, quantization values of Y1 and Y2 obtained after the reversible quantization are as large as approximately M1L/N1 times and M2L/N2 times those of the original discrete cosine transform.

Subsequently, the 4×4 matrix transform given by the expression (12) given hereinabove is described.

In this instance, where the magnitude of the row vector is represented by L, (X1, X7, X3, X5) obtained by the transform of the expression (12) are approximately L times those of the original discrete cosine transform.

On the other hand, in reversible quantization, according to the system described hereinabove with reference to FIG. 1(*a*), transform coefficients (X1, X7) are linearly quantized with step sizes k1, k7, respectively, while transform coefficients (X3, X5) are linearly quantized, at global signal parts thereof, with step sizes L3, L5, respectively.

Accordingly, by this quantization, X1, X7 are contracted to 1/k1 time, 1/k7 time, respectively, and X3, X5 are contracted to 1/L3 time, 1/L5 time, respectively. Therefore, quantization values of (X1, X7, X3, X5) obtained after quantization are approximately L/k1, L/k7, L/L3, L/L5 times those of the original discrete cosine transform. It is to be noted that, where the system of the conventional example described above is used for the 4×4 reversible quantization, the description above stands as it is if L3, L5 are set, where the quantization periods and the dequantization periods of the reversible quantization with a matrix of the following expression (38):

$$\begin{pmatrix} h & -g \\ g & h \end{pmatrix} \tag{38}$$

are represented by (N1$^{(2)}$, N2$^{(2)}$, (M1$^{(2)}$, M2$^{(2)}$), so as to satisfy the following expression (39):

$$\begin{cases} L_3 = \dfrac{N_1^{(2)}}{m_3 M_1^{(2)}} \\ L_5 = \dfrac{N_2^{(2)}}{m_5 M_2^{(2)}} \end{cases} \tag{39}$$

where m3, m5 are dynamic ranges of local quantization values of X3, X5, respectively.

Based on the dynamic ranges of the transform results of the 2×2 and 4×4 transforms calculated in this manner, dynamic ranges of transform coefficients obtained finally are calculated. Here, the dynamic range is calculated assuming that a same quantization correspondence table is used to effect quantization in transform with the same matrix.

The quantization periods in reversible quantization regarding the matrices of FIG. 22 given by the following expressions (40) and (41):

$$\begin{pmatrix} 1 & 1 \\ 1 & -1 \end{pmatrix} \tag{40}$$

$$\begin{pmatrix} a_2 & a_6 \\ a_6 & -a_2 \end{pmatrix} \tag{41}$$

are represented by (N1$^{(0)}$, N2$^{(0)}$), (N1$^{(1)}$, N2$^{(1)}$), and the dequantization periods are represented by (M1$^{(0)}$, M2$^{(0)}$), (M$_{(1)}$, M2$^{(1)}$), respectively.

In this instance, where the dynamic ranges of transform coefficients Xqi (i=0, . . . , 7) of eight-element reversible discrete cosine transform are represented by β(i), if those of the original discrete cosine transform are represented by "1", then the values of β(i) are given by the following expressions (42) to (49):

$$\beta(0) = \left(\dfrac{2^{1/2} M_1^{(0)}}{N_1^{(0)}}\right)^3 \tag{42}$$

$$\beta(4) = \left(\dfrac{2^{1/2} M_1^{(0)}}{N_1^{(0)}}\right)^2 \left(\dfrac{2^{1/2} M_2^{(0)}}{N_2^{(0)}}\right) \tag{43}$$

$$\beta(2) = \left(\dfrac{2^{1/2} M_1^{(0)}}{N_1^{(0)}}\right)\left(\dfrac{2^{1/2} M_2^{(0)}}{N_2^{(0)}}\right)\left(\dfrac{L^{(1)} M_1^{(1)}}{N_1^{(1)}}\right) \tag{44}$$

$$\beta(6) = \left(\dfrac{2^{1/2} M_1^{(0)}}{N_1^{(0)}}\right)\left(\dfrac{2^{1/2} M_2^{(0)}}{N_2^{(0)}}\right)\left(\dfrac{L^{(1)} M_2^{(0)}}{N_2^{(1)}}\right) \tag{45}$$

-continued $$\beta(1) = \left(\dfrac{2^{1/2} M_2^{(0)}}{N_2^{(0)}}\right)\left(\dfrac{L}{k_1}\right) \tag{46}$$

$$\beta(7) = \left(\dfrac{2^{1/2} M_2^{(0)}}{N_2^{(0)}}\right)\left(\dfrac{L}{k_7}\right) \tag{47}$$

$$\beta(3) = \left(\dfrac{2^{1/2} M_2^{(0)}}{N_2^{(0)}}\right)\left(\dfrac{L}{L_3}\right) \tag{48}$$

$$\beta(5) = \left(\dfrac{2^{1/2} M_2^{(0)}}{N_2^{(0)}}\right)\left(\dfrac{L}{L_5}\right) \tag{49}$$

where L$^{(1)}$, L are represented by the following expressions (50), (51) and represent the magnitudes of the row vectors of the transform matrices of the expressions (41), (12), respectively.

$$L^{(1)} = (a_1^2 + a_8^2)^{1/2} \tag{50}$$

$$L = (a_2^2 + a_3^2 + a_5^2 + a_7^2)^{1/2} \tag{51}$$

Further, for transform coefficients of the 8×8 reversible discrete cosine transform, where the dynamic ranges of the (i, J) components Xq(i, j) of the transform coefficients are represented by β(i, j), if the dynamic ranges of the original 8×8 discrete cosine transform are represented by "1", then β(i, J) can be represented, using β(i) of the expressions (42) to (49), by the following expression (52):

$$R(i, J) = \beta(i)\beta(i) \tag{52}$$

If the values of β(i) in a horizontal direction and a vertical direction are different from each other, then where β(i) in the horizontal direction and the vertical direction are represented by βh(i), βv(i), respectively, β(i, j) are presented by the following expression (53):

$$\beta(i, J) = \beta v(i)\beta h(j) \tag{53}$$

Subsequently, a procedure of determining quantization table values W(i, J) from the dynamic ranges β(i, j) of transform coefficients calculated in this manner is described.

As described above, the dynamic range of a quantization value Xq(i, j) is changed, upon decoding, to W(i, j)s/16 times by dequantization. Consequently, in order to correct the dynamic range, the quantization table value W(i, J) should be determined so as to satisfy the following expression (54):

$$\dfrac{W(i, j)s}{16} \approx \dfrac{1}{\beta(i, j)} \tag{54}$$

Taking it into consideration that the quantization table value W(i, j) is an integer, W(i, J) is determined in accordance with the following expression (55):

$$W(i, j) = rnd\left(\dfrac{16}{s\beta(i, j)}\right) \tag{55}$$

where rnd(x) is a function which gives back the nearest integer of x. If the value of the expression (55) is outside the range of values which can be taken in the quantization table, then another value which is nearest to the value within the range is determined as a quantization table value.

The JPEG compatibility quantization table 303 of FIG. 33 stores quantization values determined in advance in this manner.

Figure 34:
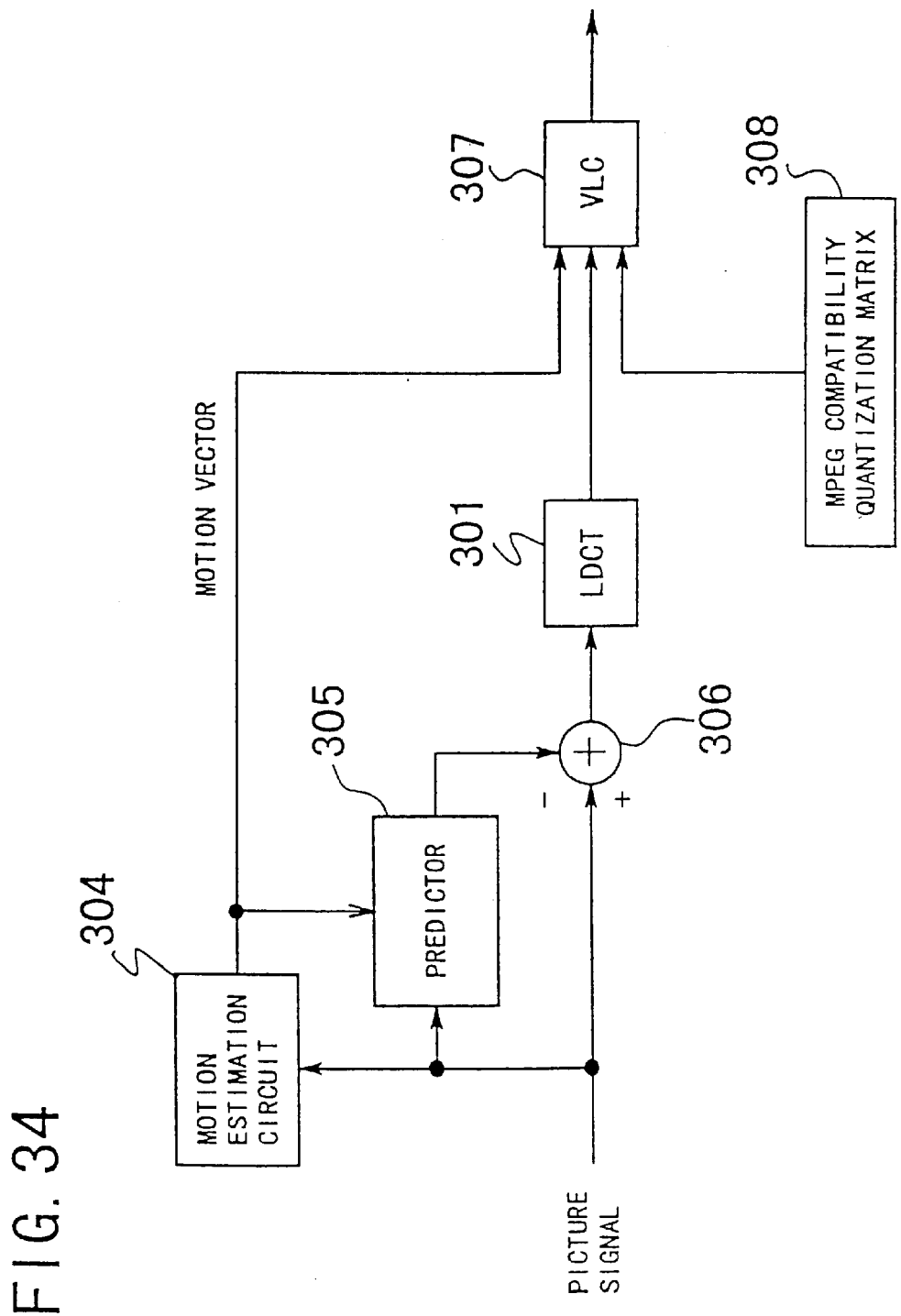
FIG. 34 is a block diagram showing a system which performs coding using an MPEG compatibility quantization matrix.

FIG. 34 is a block diagram of a system of an embodiment of the present invention which employs an MPEG compatibility quantization matrix for compensation for a difference in dynamic range. Referring to FIG. 34, the system shown includes a reversible discrete cosine transformer (LDCT) 301, a motion estimation circuit 304, a predictor 305, an adder 306, a variable length coder (VLC) 307, and an MPEG compatibility quantization matrix 308. The reversible discrete cosine transformer 301 here is similar to that of the system shown in FIG. 33.

The motion estimation circuit 304 has a storage apparatus (not shown) for storing a picture coded in the past, and performs motion estimation between the picture stored in the storage apparatus and a current coding object picture and outputs a motion vector.

The predictor 305 performs, based on the motion vector determined by the motion estimation circuit 304, motion compensation for the reference picture for motion estimation to produce a predictive picture, and outputs the predictive picture.

The adder 306 subtracts the predictive picture outputted from the predictor 305 from an input picture which makes an object of coding to produce a predictive error picture.

The variable length coder 307 performs variable length coding for transform coefficients outputted from the reversible discrete cosine transformer 301, motion vectors outputted from the motion estimation circuit 304 and the values of the MPEG compatibility quantization matrix 308 and outputs a result of the variable length coding.

Subsequently, operation of the system shown in FIG. 34 is described.

First, the motion estimation circuit 304 performs motion estimation between a coding object picture and an already coded picture to calculate a motion vector for each macro block. Then, based on the thus calculated motion vectors, the predictor 305 produces a predictive picture from the already coded picture. The predictive picture is subtracted from the coding object picture by the adder 306 to obtain a predictive error picture. However, the predictive error picture has, for intra-blocks thereof, not predictive errors but original signal values.

For the predictive error picture, reversible discrete cosine transform is performed for the individual blocks to calculate transform coefficients by the reversible discrete cosine transformer 301. The transform coefficients, the motion vectors and values of the predetermined MPEG compatibility quantization matrix 308 are coded with variable length codes by the variable length coder 307.

Subsequently, the quantization matrix values are described.

A quantization matrix is a matrix to be used to vary the quantization step size for each discrete cosine transform coefficient and is adopted in the MPEG which is the international standards for moving picture coding. The quantization matrix is fundamentally similar to a quantization table used in the JPEG, and each component of the matrix determines the quantization step size of a transform coefficient which is at the position.

Where the (i, J) components of the quantization matrix are represented by W(i, J) (i=0, . . . , 7, J=0, . . . , 7), in regard to the transform coefficients other than DC components of intra-blocks, the relationships between quantization values $X_q(i, j)$ and dequantization values $X(i, j)$ of the (i, j) components are given by the following expressions (56), (57):

$$y = \frac{(2X_q(i, j) + k)W(i, j)s}{32} \quad (56)$$

$$X(i, i) = \text{Sign}(y) \times \lfloor |y| \rfloor \quad (57)$$

where s is the parameter called quantization scale and does not rely upon i, j, Sign(y) is a value represented by the expression (37) given hereinabove, and k is a value represented by the following expression (58):

$$k = \begin{cases} 0 & \text{(intra-block)} \\ \text{Sign}(X_q(i, j)) & \text{(non-intra-block)} \end{cases} \quad (58)$$

As can be seen from the expressions (56), (57), by the dequantization, the value of a transform coefficient is changed approximately to W(i, j)s/16 times. Taking notice of this fact, an MPEG compatibility quantization matrix is determined by the same procedure as that for determination of a JPEG compatibility quantization table. In particular, from the dynamic range $\beta(i, j)$ of each transform coefficient determined by the expression (52) given hereinabove, the quantization matrix value W(i, j) is determined in accordance with the expression (55) given hereinabove.

Figure 35:
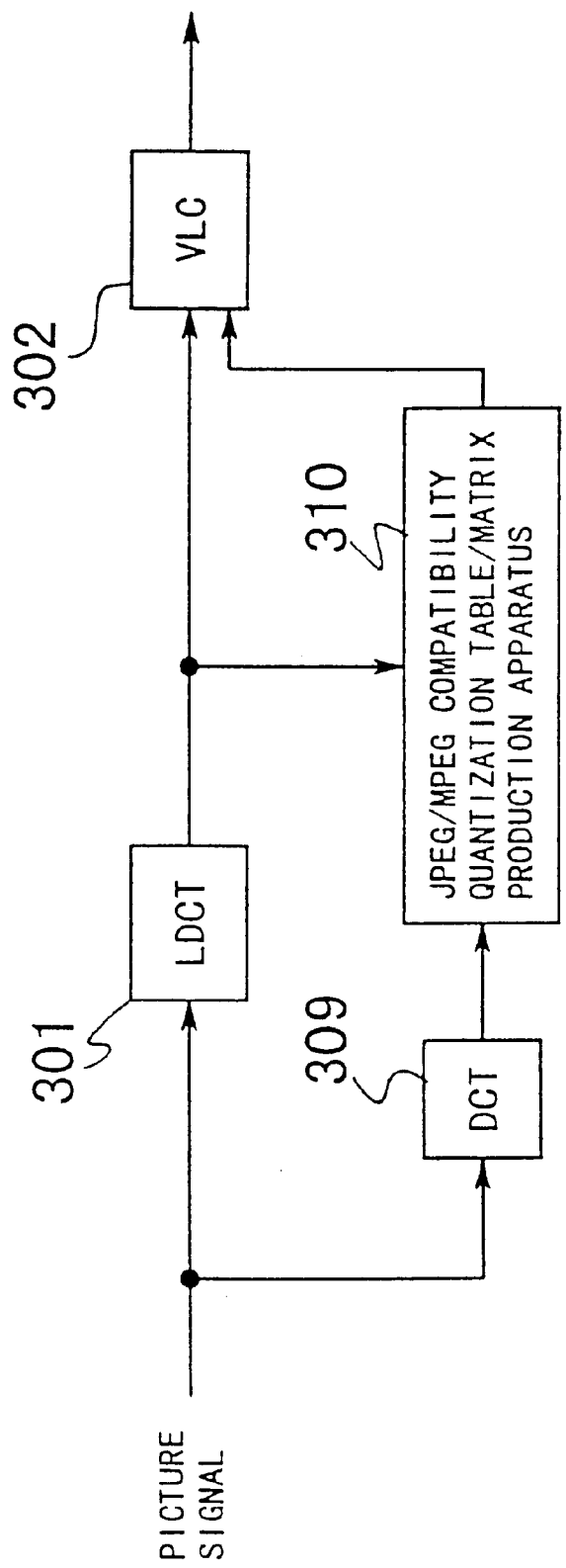
FIGS. 35 and 36 are block diagrams showing different systems which performs coding using a JPEG/MPEG compatibility quantization table/matrix production apparatus.

FIG. 35 is a block diagram showing a construction of a system of an embodiment of the present invention wherein a JPEG compatibility quantization table or an MPEG compatibility quantization matrix is sequentially produced while a picture signal is inputted. Referring to FIG. 35, the system shown includes a reversible discrete cosine transformer (LDCT) 301, a variable length coder (VLC) 302, a discrete cosine transformer (DCT) 309, and a JPEG/MPEG compatibility quantization table/matrix production apparatus 310. The reversible discrete cosine transformer 301 and the variable length coder 302 here are similar to those described hereinabove with reference to FIG. 33.

The discrete cosine transformer (DCT) 309 performs discrete cosine transform for a picture for individual blocks and outputs transform coefficients. The JPEG/MPEG compatibility quantization table/matrix production apparatus 310 produces a quantization table/matrix based on transform coefficient values outputted from the reversible discrete cosine transformer 301 and the discrete cosine transformer 309 and outputs values of the quantization table/matrix.

Subsequently, operation of the system shown in FIG. 35 is described.

The system shown in FIG. 35 operates in a similar manner as in the system described hereinabove with reference to FIG. 33 until reversible discrete cosine transform is performed for a picture signal by the reversible discrete cosine transformer 301. In the system shown in FIG. 35, discrete cosine transform is performed simultaneously for each block in the picture signal by the discrete cosine transformer 309.

Then, from the values of the reversible discrete cosine transform coefficients and the discrete cosine transform coefficients, quantization table/matrix values are calculated by the JPEG/MPEG compatibility quantization table/matrix production apparatus 310.

Each quantization table/matrix value is decided so as to minimize the difference between a dequantization value of a reversible discrete cosine transform coefficient obtained on the decoder side and a transform coefficient of the original discrete cosine transform. More particularly, within a period (for example, in a picture) within which a quantization table/matrix is to be calculated, such a quantization table/ matrix value that minimizes the difference in average value between them is calculated for each (i, J) component. Then, the reversible discrete cosine transform coefficients, motion vector values and quantization table/matrix values are coded with variable length codes.

Figure 36:
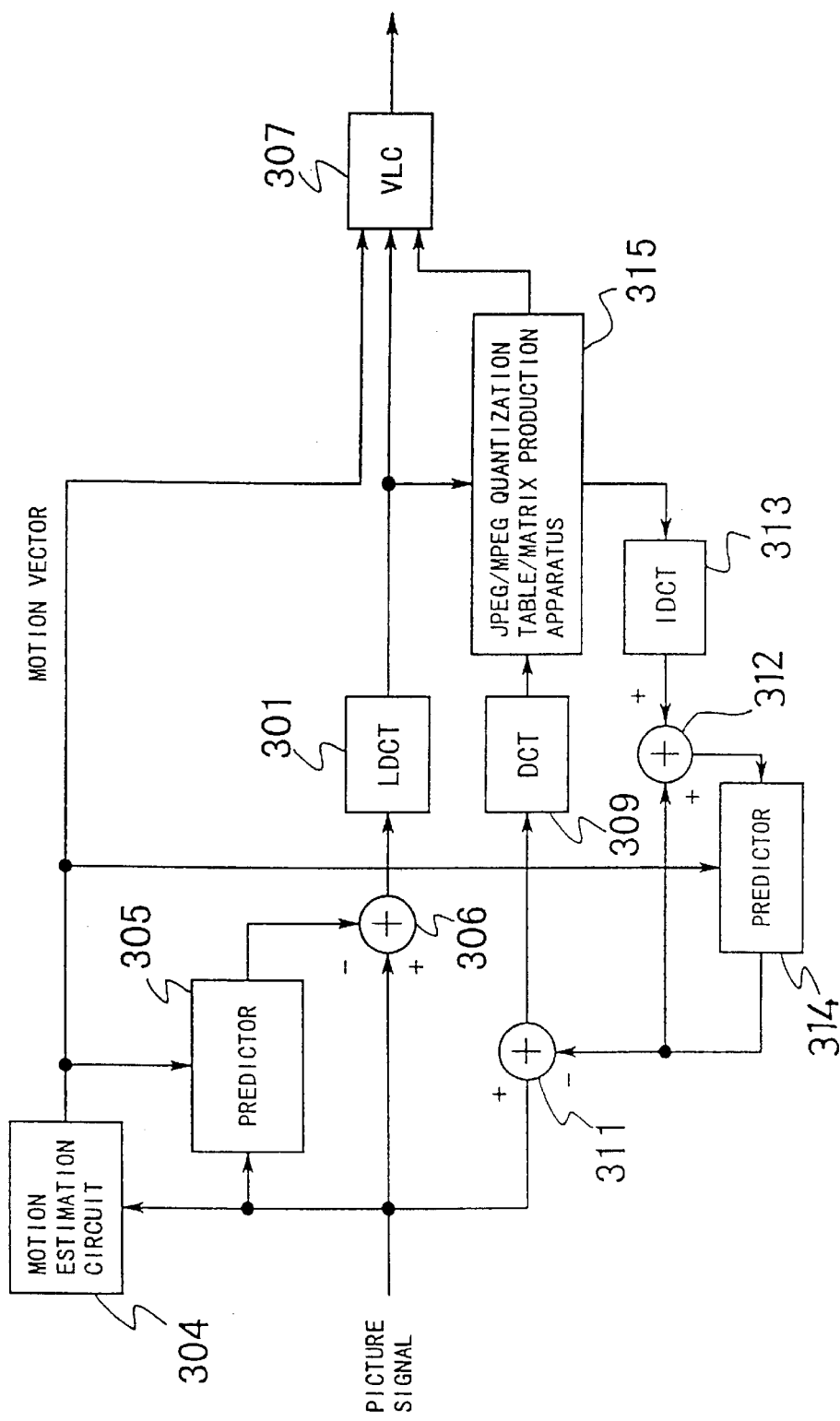

FIG. 36 is a block diagram showing a construction of a system of an embodiment of the present invention which produces a JPEG compatibility table or an MPEG compatibility matrix with which also dequantization values are obtained. Referring to FIG. 36, the system shown includes a reversible discrete cosine transformer 301, a motion estimation circuit 304, a predictor 305, adders 306, 311, 312, a discrete cosine transformer 309, an inverse discrete cosine transformer (IDCT) 313, another predictor 314, and a JPEG/MPEG quantization table/matrix production apparatus 315. Here, the reversible discrete cosine transformer 301, adder 306, predictor 305, motion estimation circuit 304 and variable length coder 307 are similar to those of the system described hereinabove with reference to FIG. 34. Further, the discrete cosine transformer 309 is similar to that of the system described hereinabove with reference to FIG. 35.

The JPEG/MPEG quantization table/matrix production apparatus 315 has a basically similar construction to that of the system shown in FIG. 35, but not only outputs a quantization table/matrix value but also simultaneously outputs a dequantization value when a reversible discrete cosine transform coefficient is dequantized using the quantization table/matrix value.

The inverse discrete cosine transformer 313 performs inverse discrete cosine transform for each block and outputs a predictive error reproduction picture as a result of the inverse discrete cosine transform.

The adder 312 adds the predictive error reproduction picture to a second predictive picture, which will be hereinafter described, to produce a reproduction picture.

The predictor 314 holds the reproduction picture outputted from the adder 312 and produces a second predictive picture based on motion vectors obtained from the motion estimation circuit 304 from an already decoded picture.

The adder 311 subtracts the second predictive picture from a coding object picture to produce a second predictive error picture.

Subsequently, operation of the system shown in FIG. 36 is described.

Operation of the system is same as that of the system shown in FIG. 34 in that motion vectors are calculated by the motion estimation circuit 304 and a predictive picture is produced by the predictor 305, whereafter a predictive error picture is produced by the adder 306 and reversible discrete cosine transform is performed for the picture by the reversible discrete cosine transformer 301.

Further, the JPEG/MPEG quantization table/matrix production apparatus 315 calculates quantization matrix values in a basically same manner as in the system described hereinabove with reference to FIG. 35. However, the JPEG/MPEG quantization table/matrix production apparatus 315 in the system shown in FIG. 36 calculates not only quantization matrix values but also dequantization values when the quantization matrix values are used.

For the dequantization values, original inverse discrete cosine transform is performed by the inverse discrete cosine transformer 313. Consequently, a predictive error reproduction picture estimated to be obtained on the decoding side when decoding is performed using ordinary inverse discrete cosine transform is determined. Then, a second predictive picture is added to the predictive error reproduction picture to produce a reproduction picture by the adder 312. This reproduction picture corresponds to a reproduction picture estimated to be obtained on the decoding side when decoding is performed using ordinary inverse discrete cosine transform.

The predictor 314 performs motion estimation using the motion vectors obtained by the motion estimation circuit 304 to produce a second predictive picture from a formerly decoded reproduction picture. The second predictive picture is subtracted from a coding object picture to obtain a second predictive error picture by the adder 311.

For the second predictive error picture, discrete cosine transform is performed by the discrete cosine transformer 309. Consequently, discrete cosine transform coefficients of a predictive error picture to be obtained on the decoder side are obtained. Therefore, the quantization table/matrix should be determined so that values obtained by dequantization of the reversible discrete cosine transform coefficients may be near to them.

Thus, the discrete cosine transform coefficients are used as an input to the JPEG/MPEG quantization table/matrix production apparatus 315.

Figure 37:
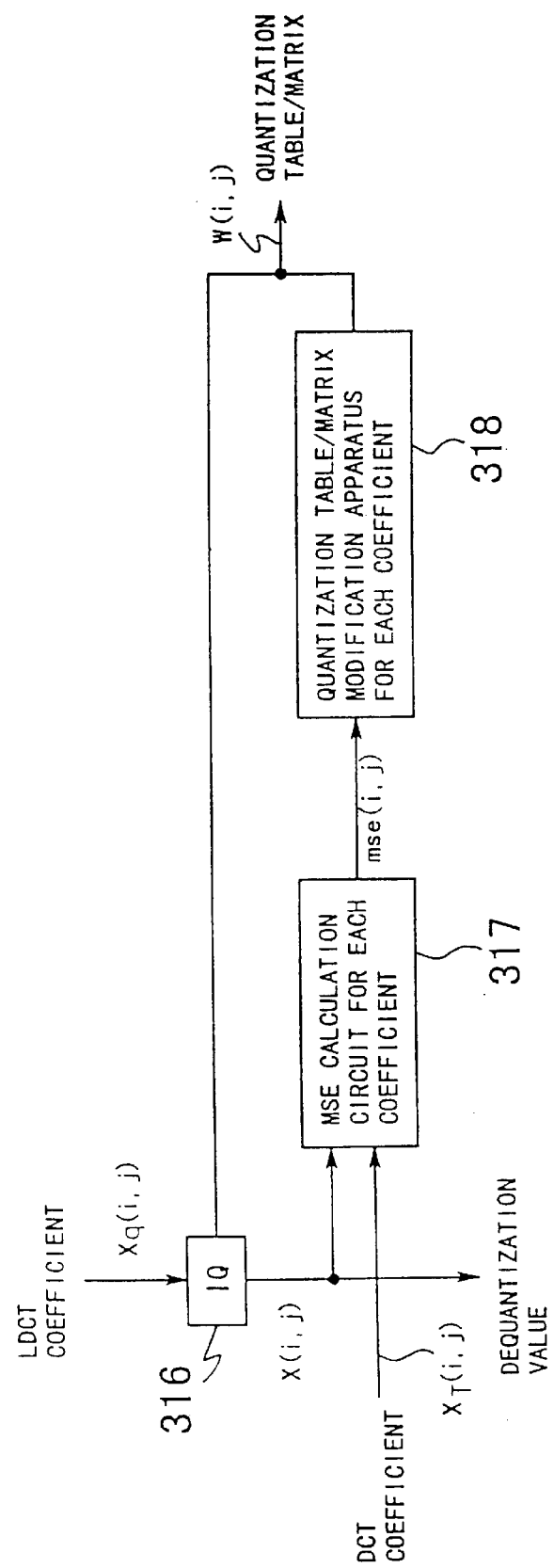
FIGS. 37, 38 and 39 are block diagrams showing circuit constructions of a JPEG/MPEG compatibility quantization table/matrix production apparatus.

FIG. 37 is a block diagram showing an example of a construction of the JPEG/MPEG compatibility quantization table/matrix production apparatus.

Referring to FIG. 37, a dequantizer (IQ) 316 dequantizes reversible discrete cosine transform coefficients in accordance with a dequantization method of the MPEG or the JPEG and outputs the dequantized reversible discrete cosine transform coefficients. An MSE (Mean Square Error) calculation circuit 317 for each coefficient calculates, for each transform coefficient, a square mean of the differences between the discrete cosine transform coefficient and dequantization values outputted from the dequantizer 316.

A quantization table/matrix modification apparatus 318 provides a quantization table/matrix value to the dequantizer 316 and checks the resulting output of the MSE calculation circuit 317 for each coefficient.

Then, the quantization table/matrix modification apparatus 318 determines that quantization table/matrix value which minimizes the value of the output of the MSE calculation circuit 317. This determination is performed for each transform coefficient.

Finally, a value of the quantization table/matrix which minimizes the output of the MSE calculation circuit 317 for each coefficient is outputted.

Subsequently, operation of the circuit shown in FIG. 37 is described.

An (i, J) component of a transform coefficient of the reversible discrete cosine transform is represented by $Xq(i, j)$, the dequantization value of the (i, j) component is represented by $X(i, j)$, and an (i, J) component of discrete cosine transform coefficient is represented by $XT(i, j)$. The reversible discrete cosine transform coefficient $Xq(i, j)$ is dequantized by the dequantizer 316 using a quantization table/matrix value $W(i, J)$ inputted from the quantization table/matrix modification apparatus 318. This dequantization is performed, in the JPEG, in accordance with the expressions (35), (36) given hereinabove, but in the MPEG, in accordance with the expressions (56), (57) given hereinabove. As a result, a dequantization value $X(i, j)$ is obtained.

The MSE calculation circuit 317 for each coefficient calculates the following expression (59) from the dequantization value $X(i, j)$ and the discrete cosine transform coefficient $XT(i, j)$ to calculate, for each $(i, j)$, a square mean value $mse(i, j)$ of $e(i, J)$ and outputs the square mean value $mse(i, j)$.

$$e(i, j) = X(i, j) - XT(i, J) \tag{59}$$

This mean value is taken for the same (i, J) of blocks included in a period (or picture) in which a quantization matrix is calculated. The square mean value mse(i, j) is inputted to the quantization table/matrix modification apparatus 318.

The quantization table/matrix modification apparatus 318 holds the value of W(i, j) which minimizes this square mean value mse(i, j) and the lowest value of such values. Then, when the square mean value mse(i, j) calculated for the value of a certain quantization table/matrix value W(i, j) is lower than the lowest value of the square mean values mse(i, J) calculated already, the quantization table/matrix modification apparatus 318 updates the lowest value and stores the lowest value and the value of the square mean value mse(i, j) by which the lowest value is provided.

The processing just described is performed for all candidate values of the quantization table/matrix to calculate the value of the quantization table/matrix value W(i, j) which minimizes the square mean value mse(i, j).

The processing described above is performed for each (i, j). Finally, the quantization table/matrix modification apparatus 318 outputs the value of the quantization table/matrix value W(i, j) which minimizes the square mean value mse(i, j).

In the system shown in FIG. 37, differences between original discrete cosine transform coefficients XT(i, j) and dequantization values X(i, j) are compared for each coefficient, and a quantization table/matrix which minimizes a square mean value of the differences is determined. Therefore, the differences can be minimized generally including not only differences which arise from a difference in dynamic range but also differences arising from any other factor.

Accordingly, compared with an alternative case wherein a fixed quantization table/matrix is used as in the system shown in FIG. 34 or 35, the picture quality when a picture coded using the reversible discrete cosine transform is decoded using conventional inverse discrete cosine transform is improved.

Figure 38:
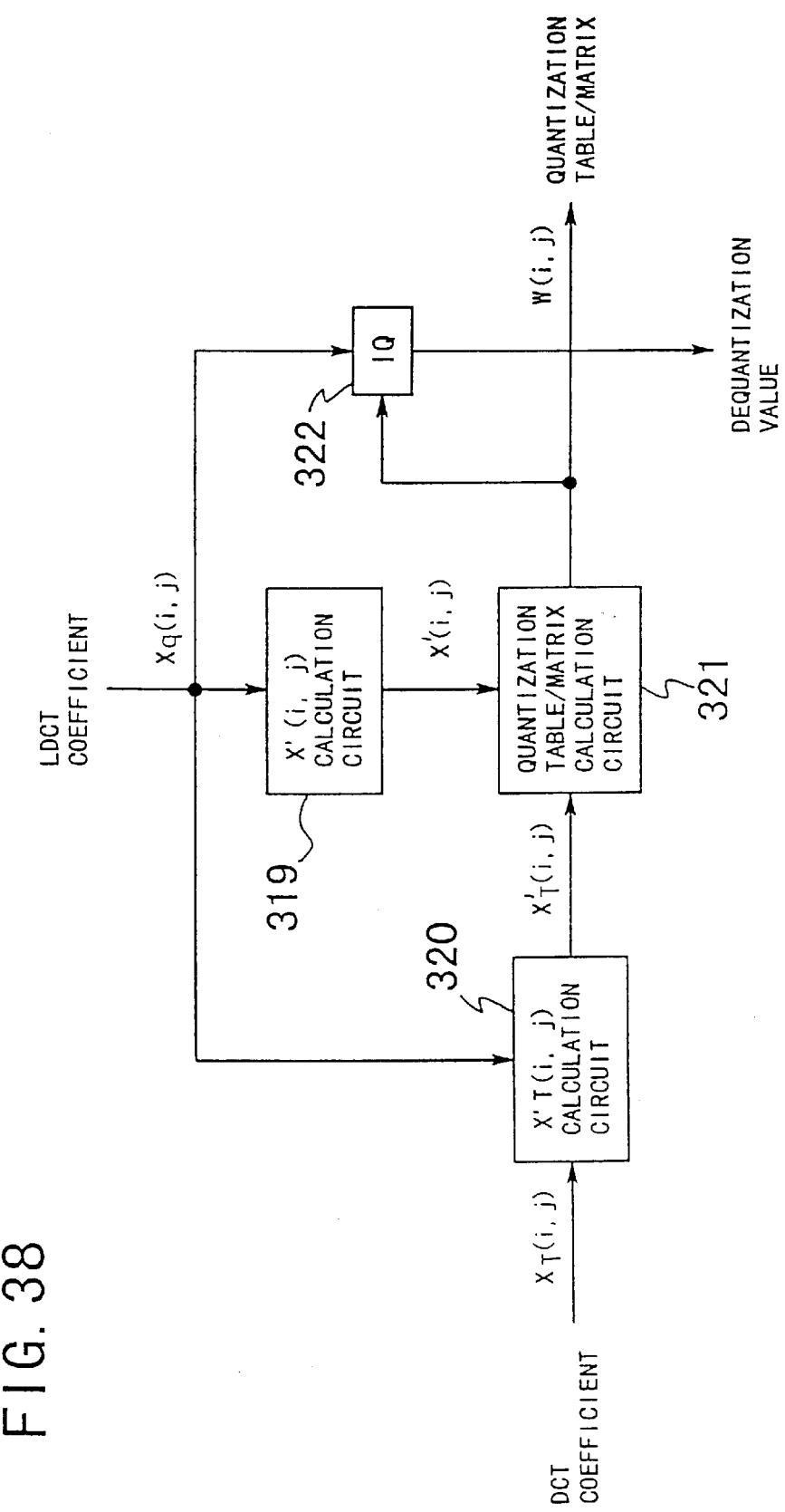

FIG. 38 is a block diagram of another example of a construction of the JPEG/MPEG compatibility quantization table/matrix production apparatus.

Referring to FIG. 38, the apparatus shown calculates a quasi-optimum quantization table/matrix value by approximate calculation. Here, for the JPEG, a dequantization value of the expression (36) given hereinabove is approximated with the following expression (60), but for the MPEG, the expression (57) given hereinabove is approximated with another expression (61) given below:

$$X(i, j) \simeq \frac{X_q(i, j)W(i, j)s}{16} - 0.5\text{Sign}(X_q(i, j)) \quad (60)$$

$$X(i, j) \simeq \frac{(2X_q(i, j)+k)W(i, j)s}{32} - 0.5\text{Sign}(X_q(i, j)) \quad (61)$$

Here, the reason why ±0.5 is added in accordance with the sign of Xq(i, j) is that, as can be seen from the expressions (36), (57) given hereinabove, when a value is finally converted into an integer in dequantization of the JPEG or the MPEG, this conversion into an integer is performed not by rounding off the fraction part, but by discarding or rounding up the fraction part.

Figure 42:
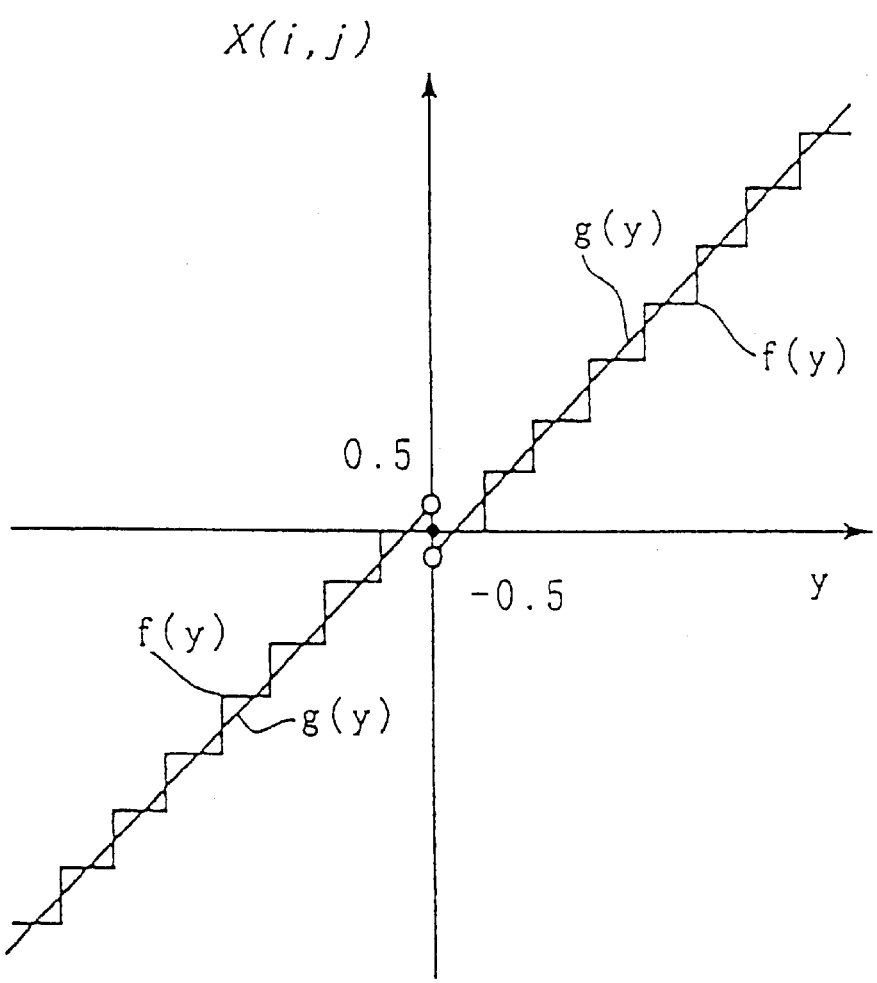
FIG. 42 is a graph illustrating a function for use for approximation of a quantization characteristic for the MPEG or JPEG system in a JPEG/MPEG combability quantization table/matrix production apparatus.

This is diagrammatically illustrated in FIG. 42. Referring to FIG. 42, a stepwise graph f(y) illustrates the expressions (36), (57) given hereinabove and illustrates the relationship between values before and after conversion into an integer. The stepwise graph f(y) is approximated with a function indicated by a straight line in FIG. 42 and given by the following expression (62):

$$g(y)=y-0.5\text{Sign}(y) \quad (62)$$

A dequantization value X(i, j) obtained by the approximation is equivalent to that of the expression (60) or (61) given above.

By this approximation, e(i, J) of the expression (49) given hereinabove becomes a linear function of the quantization table/matrix value W(i, J). Therefore, the square mean value mse(i, j) of e(i, j) becomes a quadratic function of the quantization table/matrix value W(i, j). Consequently, a quantization table/matrix value W(i, J) which minimizes the square mean value mse(i, J) can be determined analytically.

Taking it into consideration that the quantization table/matrix value W(i, J) is an integer, it is calculated, for the JPEG, in accordance with the following expression (63), and for the MPEG, in accordance with another expression (64) given below:

W(i, j)

$$W(i, j) = rnd\left(\frac{\sum \frac{X_q(i, j)s}{16}\{X_T(i, j) + 0.5\text{Sign}(X_q(i, j))\}}{\sum \{\frac{X_q(i, j)s}{16}\}^2}\right) \quad (63)$$

$$W(i, j) = rnd\left(\frac{\sum \frac{s}{32}\{2X_q(i, j)+k\}\{X_T(i, j) + 0.5\text{Sign}(X_q(i, j))\}}{\sum \{\frac{s}{32}\{2X_q(i, j)+k\}\}^2}\right) \quad (64)$$

where rnd(x) is a function which gives back the nearest integer of x, and Σ signifies that a sum is calculated for the same (i, j) within a period (or picture) within which a quantization table/matrix is to be calculated. It is to be noted that, if the value of the expression (63) or (64) given above is outside a range of values which can be taken by the quantization table/matrix value, that integer value which is nearest to the value within the range is determined as a quantization table/matrix value.

FIG. 38 shows the JPEG/MPEG compatibility quantization table/matrix calculation circuit.

Referring to FIG. 38, an X'(i, j) calculation circuit 319 calculates X'(i, j) obtained in the process of dequantization of a reversible discrete cosine transform coefficient Xq(i, J). This X'(i, j) corresponds to a value obtained by dividing a value before conversion into an integer in dequantization by a quantization table/matrix value. In particular, this X'(i, J) is given, for the JPEG, by the expression (35) given hereinabove, but for the MPEG, by the following expression (65):

$$X'(i, j) = \frac{X_q(i, j)s}{16} \quad (65)$$

For the MPEG, from the expression (56), X'(i, i) is given by the following expression (66):

$$X'(i, j) = \frac{(2X_q(i, j)+k)s}{32} \quad (66)$$

An X'T(i, j) calculation circuit 320 determines, where Xq(i, j) is in the positive, a value obtained by adding 0.5 to XT(i, j), but where Xq(i, j) is in the negative, a value obtained by subtracting 0.5 from XT(i, J), but otherwise where Xq(i, j) is zero, XT(i, J) itself, as X'T(i, j).

A quantization table/matrix calculation circuit 321 calculates the value of the following expression (67) from the output X'(i, J) of the X'(i, J) calculation circuit 319 and the output X'T(i, J) of the X'T(i, j) calculation circuit 320 and outputs a resulting value as the quantization table/matrix value W(i, J).

$$rnd\left(\frac{\sum X'(i, j) X'_T(i, j)}{\sum \{X'(i, j)\}^2}\right) \quad (67)$$

where rnd(x) is a function which gives back the nearest integer of x. The value obtained with the expression (67) is equal to a quantization table/matrix value obtained with the expression (63) or (64) given hereinabove. It is to be noted that a dequantizer (IQ) 322 of FIG. 38 is similar to that shown in FIG. 37.

Subsequently, operation of the apparatus shown in FIG. 38 is described.

A reversible discrete cosine transform coefficient Xq(i, j) which is one of inputs to the apparatus is transformed into X'(i, j) by the X'(i, J) calculation circuit 319. Meanwhile, a discrete cosine transform coefficient XT(i, j) is transformed into X'T(i, J) based on the sign of the reversible discrete cosine transform coefficient Xq(i, J) by the X'T(i, j) calculation circuit 320.

Then, the quantization table/matrix calculation circuit 321 calculates a quantization table/matrix value W(i, J) given by the expression (67) above from the values X'(i, J) and X'T(i, j). This calculation is performed for each (i, j). Further, if a value obtained by the calculation is outside the range of values which can be taken by the quantization table/matrix value, then an integer which is nearest in the range is outputted as a quantization table/matrix value as described hereinabove.

Then, the dequantizer 322 dequantizes the reversible discrete cosine transform coefficient Xq(i, J) using the value of the quantization table/matrix value W(i, j) and outputs a resulting dequantization value.

The apparatus shown in FIG. 38 is characterized in that a result near to that of the apparatus of FIG. 37 can be obtained by direct calculation. In the apparatus of FIG. 37, e(i, j) is calculated for each quantization table/matrix value to calculate an optimum quantization table/matrix value. Therefore, a considerably large amount of processing is required. In contrast, with the apparatus of FIG. 38, the amount of calculation can be reduced by approximating some of the expressions for dequantization to directly calculate a quantization table/matrix value.

Figure 39:
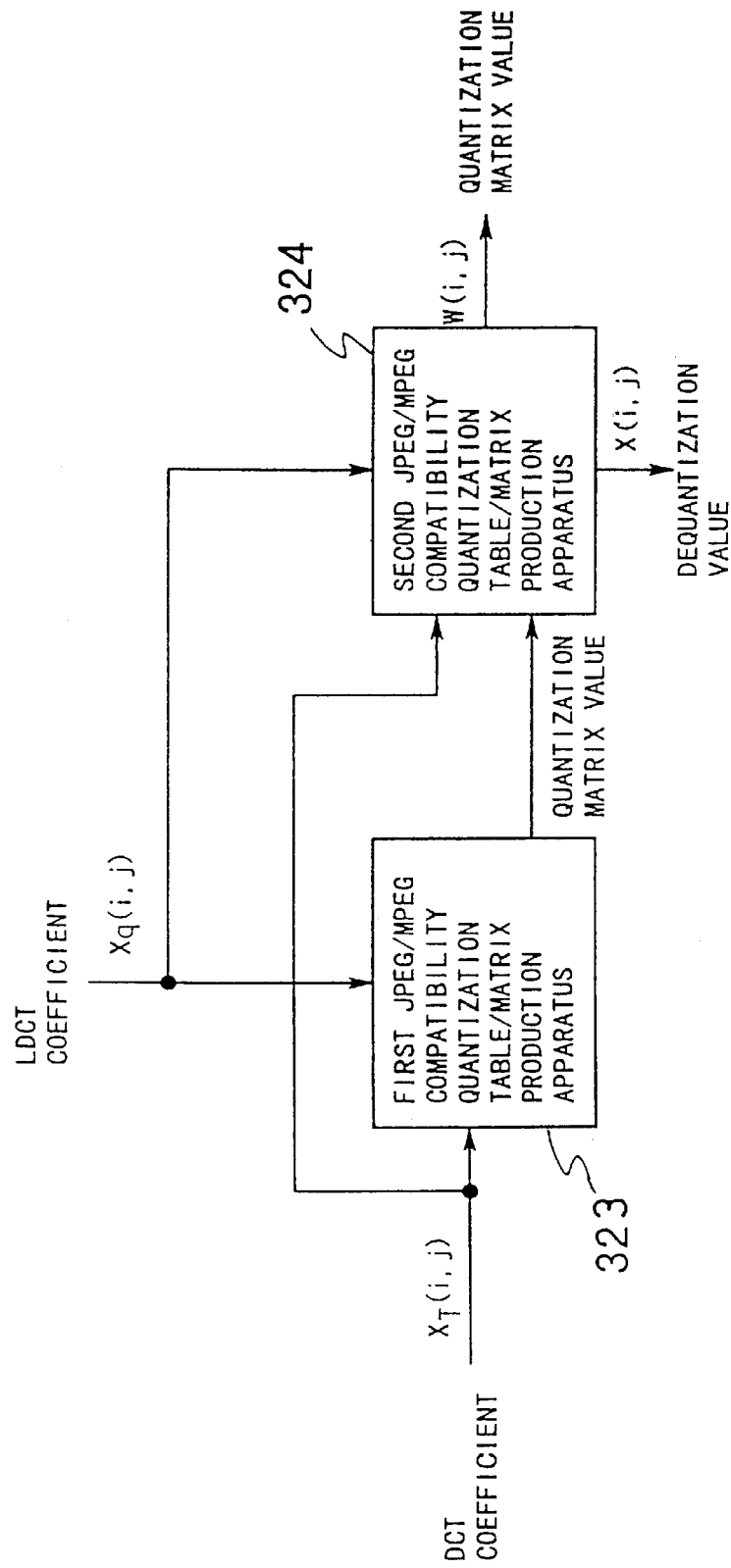

FIG. 39 is a block diagram showing a further example of the JPEG/MPEG compatibility quantization table/matrix production apparatus. Referring to FIG. 39, the apparatus shown is basically a combination of the apparatus shown in FIGS. 37 and 38.

A first JPEG/MPEG compatibility quantization table/matrix production apparatus 323 is similar to that of the apparatus shown in FIG. 38 and calculates and outputs a quantization table/matrix value from a reversible discrete cosine transform coefficient and a discrete cosine transform coefficient.

A second JPEG/MPEG compatibility quantization table/matrix production apparatus 324 is basically similar to that of the apparatus shown in FIG. 37 and calculates and outputs a quantization table/matrix value from a reversible discrete cosine transform coefficient and a discrete cosine transform coefficient. However, the second JPEG/MPEG compatibility quantization table/matrix production apparatus 324 first limits candidates based on the quantization table/matrix values calculated by the first JPEG/MPEG compatibility quantization table/matrix production apparatus 323 and then calculates a quantization table/matrix. Simultaneously, the second JPEG/MPEG compatibility quantization table/matrix production apparatus 324 calculates dequantization values of reversible discrete cosine transform coefficients.

The apparatus shown in FIG. 39 is characterized in that it first limits candidates based on quantization table/matrix values calculated by the apparatus described hereinabove with reference to FIG. 38 and then calculates a quantization table/matrix in a similar manner as in the apparatus described hereinabove with reference to FIG. 37. Consequently, the present apparatus can obtain a result almost same as that of the apparatus of FIG. 37 by a smaller amount of calculation than that by the apparatus of FIG. 37.

Figure 40:
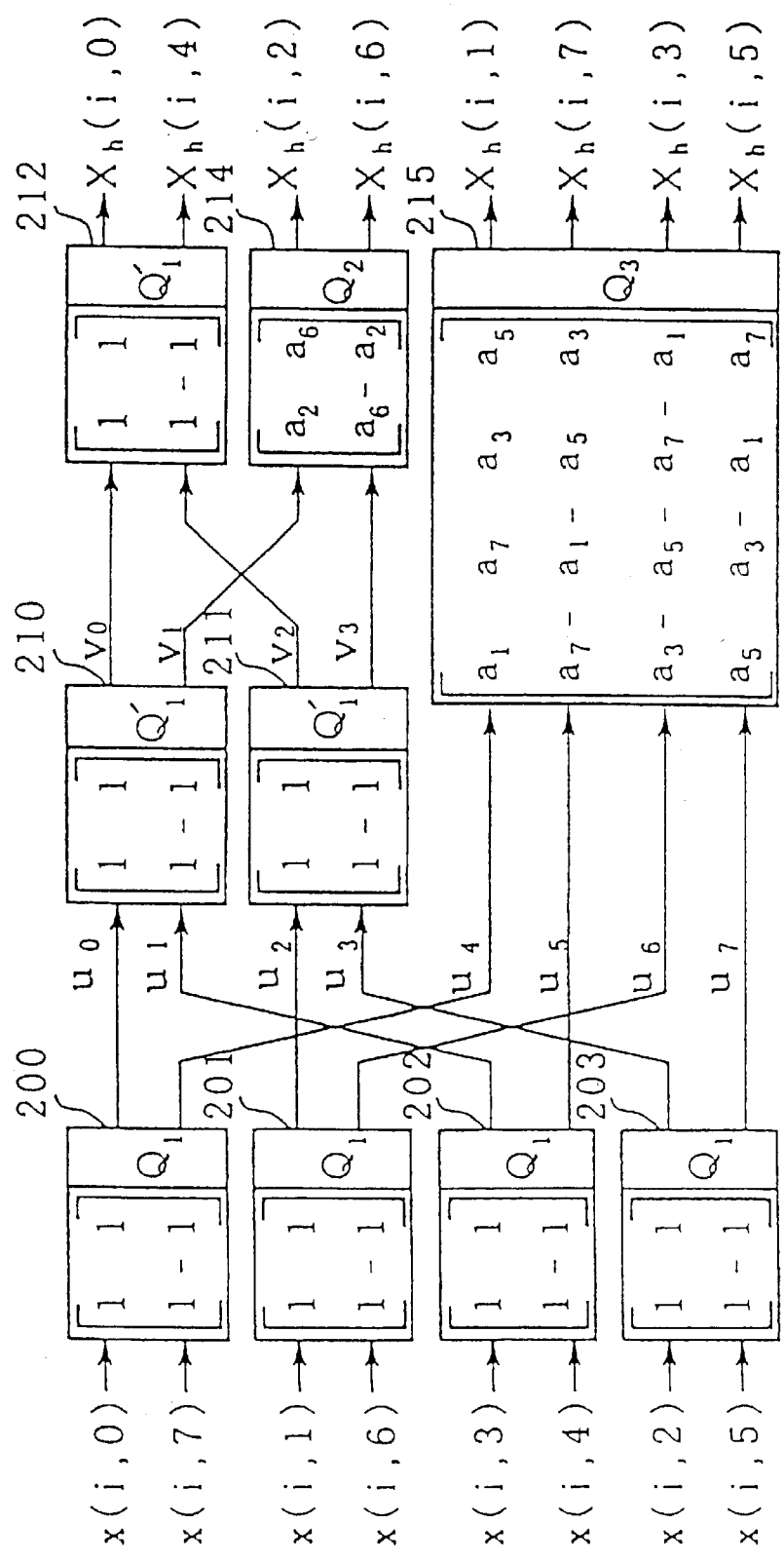
FIG. 40 is a block diagram showing a circuit construction of a circuit portion of an 8×8 reversible discrete cosine transformer which performs horizontal eight-element discrete cosine transform.

FIGS. 40 and 41 are block diagrams showing a detailed example of a construction of a system for coding a picture signal. More particularly, FIG. 40 shows an eight-element reversible discrete cosine transform circuit for a horizontal direction while FIG. 41 shows an eight-element reversible discrete cosine transform circuit for a vertical direction. It is to be noted that the system is shown separately in FIGS. 40 and 41 for convenience of illustration.

Referring first to FIG. 40, transformers 200 to 213 serve as circuits which linearly transform inputs thereto with the matrix of the expression (40) given hereinabove and then reversibly quantize the linearly transformed values. Here, the reversible quantization by the transformers 200 to 209 is performed with the quantization periods of (N1, N2) and the dequantization periods of (M1, M2).

Meanwhile, in the reversible quantization of the transformers 210 to 213, the quantization periods are (N'1, N'2) and the dequantization periods are (M'1, M'2). In order to distinguish them, in FIG. 40, the reversible quantization by the transformers 200 to 209 is represented by Q, and the reversible quantization by the transformers 210 to 213 is represented by Q'.

Subsequently, operation of the circuit shown in FIG. 40 is described. The input signals are represented by x(i, J) (i=0, ..., 7, j=0, ..., 7), and a result obtained by performing eight-element reversible discrete cosine transform for the input signals in the horizontal direction is represented by Xh(i, J) while a result of eight-element reversible discrete cosine transform for the result Xh(i, J) in the vertical direction is represented by Xq(i, J).

The transformer 200 transforms the input signals (x(i, 0), x(i, 7)) and outputs a result of the transform as (u0, u4). The transformer 201 transforms the input signals (x(i, 1), x(i, 6)) and outputs a result of the transform as (u2, u6). The transformer 202 transforms the input signals (x(i, 3), x(i, 4)) and outputs a result of the transform as (u1, u5). The transformer 203 transforms the input signals (x(i, 2), x(i, 5)) and outputs a result of the transform as (u3, u7).

The transformer 210 transforms (u0, u1) and outputs a result of the transform as (v0, v1). The transformer 211 transforms (u2, u3) and outputs a result of the transform as (v2, v3).

The transformer 212 transforms (v0, v2) and outputs a result of the transform as (Xh(i, 0), Xh(i, 4)). The transformer 214 transforms (v1, v3) with the matrix of the expression (41) given hereinabove and then reversibly quantizes a result of the transform, and outputs a result of the reversible quantization as (Xh(i, 2), Xh(i, 6)).

The transformer 215 linearly transforms (u4, u5, u6, u7) with the 4×4 matrix given by the expression (12) above and then reversibly quantizes a result of the linear transform, and outputs a result of the reversible quantization as (Xh(i, 1), Xh(i, 7), Xh(i, 3), Xh(i, 5)).

The eight-element reversible discrete cosine transform circuit for a horizontal direction operates in such a manner as described above. Xh(i, j) which are a result of eight-element reversible discrete cosine transform in a horizontal direction are obtained by performing transform for all of i 0, ..., 7 by the circuit.

Subsequently, the circuit shown in FIG. 41 is described.

A transformer 204 transforms input signals (Xh(0, j), Xh(7, j)) and outputs a result of the transform as (u'0, u'4). Another transformer 205 transforms input signals (Xh(l, j), Xh(6, J)) and outputs a result of the transform as (u'2, u'6). A further transformer 206 transforms input signals (Xh(3, j), Xh(4, j)) and outputs a result of the transform as (u'1, u'5). A still further transformer 207 transforms input signals (Xh(2, J), Xh(5, j)) and outputs a result of the transform as (u'3, u'7).

A yet further transformer 208 transforms (u'0, u'1) and outputs a result of the transform as (V'0, v'1). A yet further transformer 209 transforms (u'2, u'3) and outputs a result of the transform as (v'2, v'3).

A yet further transformer 213 transforms (v'0, v'2) and outputs a result of the transform as (Xq(0, J), Xq(4, u)). A yet further transformer 216 transforms (v'1, v'3) with the matrix of the expression (41) given hereinabove and then reversibly quantizes a result of the transform, and outputs a result of the reversible quantization as (Xq(2, j), Xq(6, j)).

A yet further transformer 217 linearly transforms (u'4, u'5, u'6, u'7) with the 4×4 matrix given by the expression (12) hereinabove and then reversibly quantizes a result of the linear transform, and outputs a result of the reversible quantization as (Xq(l, J), Xq(7, J), (Xq(3, J), Xq(5, J)). The circuit which performs eight-element reversible discrete cosine transform in a vertical direction operates in such a manner as described above. Transform coefficients Xq(i, j) of the 8×8 reversible discrete cosine transform can be obtained by performing transform for all J=0, ..., 7 by the circuit just described.

Subsequently, the dynamic range $\beta(0, 0)$ of a DC component Xq(0, 0) of transform coefficients obtained by the eight-element reversible discrete cosine transform circuit for the horizontal and vertical directions described above with reference to FIGS. 40 and 41 is described. The value of $\beta(0, 0)$ when the dynamic range of the DC component of the original discrete cosine transform is represented by 1 is given by the following expression (68):

$$\beta(0, 0) = \left(\frac{2^{1/2} M_1}{N_1}\right)^3 \left(\frac{2^{1/2} M_1'}{N_2'}\right)^3 = \left(\frac{2 M_1 M_1'}{N_1 N_1'}\right)^3 \qquad (68)$$

If this $\beta(0, 0)$ is 1, then there is no difference in dynamic range of the DC component between the reversible discrete cosine transform and the original discrete cosine transform. In order to make $\beta(0, 0)=1$, it is only required that the values of N1, N'1, M1, M'1 satisfy the relationship given by the following expression (69):

$$\frac{M_1}{N_1} = \frac{1}{2} \frac{N_1'}{M_1'} \qquad (69)$$

This requirement is satisfied, for example, by setting N'1, M'1 so that they may satisfy an expression (71) given below, when N1, N2, M1, M2 satisfy the following expression (70):

$$M_1 M_2 = \frac{N_1 N_2}{2} \qquad (70)$$

$$\begin{cases} N_1' = N_2 \\ M_1' = M_2 \end{cases} \qquad (71)$$

In the expression (70) above, M1M2 on the left side corresponds to the number of quantization points in a basic region, and the N1N2/2 on the right side corresponds to the number of transform points in the basic region. Consequently, this requirement is satisfied when the transform points and the quantization points correspond in a one-by-one correspondence to each other.

Figure 45A:
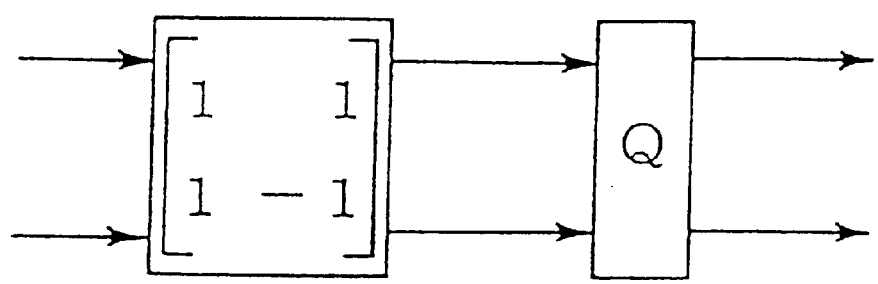
FIGS. 45(a) and 45(b) are block diagrams showing different circuit constructions of an apparatus for linear transform and reversible quantization.
Figure 45B:
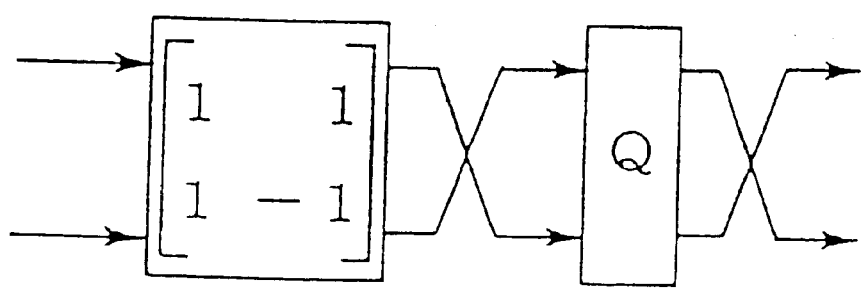

In order to realize the expression (71) given above, a simple countermeasure is to reverse the inputs to reversible quantization. In particular, where the transformers 200 to 209 shown in FIG. 40 have such a construction as shown in FIG. 45(a), the transformers 210 to 213 have such a construction as shown in FIG. 45(b). In this instance, there is an advantage that no new quantization correspondence table is required.

Since the values of the quantization periods and the dequantization periods can be selected so that $\beta(0, 0)=1$ may be satisfied, the dynamic range difference in DC component between the 8×8 reversible discrete cosine transform and the original 8×8 discrete cosine transform can be compensated for completely.

As can be seen from the foregoing description, what is required to completely compensate for the dynamic range difference in DC component is that the quantization periods and the dequantization periods satisfy the requirement of the expression (69) given hereinabove.

Consequently, this does not rely upon in which three ones of the six stages of reversible quantization contributing to calculation of the DC component Xq(0, 0) of the 8×8 reversible discrete cosine transform and based on the expression (40) given hereinabove the quantization periods are set to N'1, N'2 and the dequantization M'1, M'2. Accordingly, the circuit which completely compensates for the dynamic range difference in DC component may have some other form than the specific circuit shown in FIG. 40, and the total number of available circuits is $_6C_3=20$.

By completely compensating for the dynamic range difference in DC component in this manner, the DC component of the reversible discrete cosine transform considerably approaches that of the original discrete cosine transform. Consequently, the picture quality when a picture coded using the reversible discrete cosine transform is decoded by the conventional inverse discrete cosine transform is improved remarkably.

The embodiments of the present invention described above are described in more detail below together with particular numeric values.

First, the 8×8 reversible discrete cosine transform is described. The 8×8 reversible discrete cosine transform can be realized by performing eight-element discrete cosine transform in a horizontal direction and a vertical direction for two-dimensional signals blocked into 8×8 blocks. In the eight-element reversible discrete cosine transform, the values of the individual constants are set in the following manner using the system shown in FIG. 31.

First, the values of a2, a6, a1, a3, a5, a7 are set to 12, 5, 5, 4, 3, 1, respectively. Then, the quantization periods of reversible quantization of a matrix of the following expression (72):

$$\begin{pmatrix} 1 & 1 \\ 1 & -1 \end{pmatrix} \quad (72)$$

are set to $(N1^{(\emptyset)}, N2^{(\emptyset)})=(10, 14)$, and the dequantization periods are set to $(M1^{(\emptyset)}, M2^{(\emptyset)})=(7, 10)$. Further, for the reversible quantization of a matrix of the following expression (73):

$$\begin{pmatrix} a_2 & a_6 \\ a_6 & -a_2 \end{pmatrix} = \begin{pmatrix} 12 & 5 \\ 5 & -12 \end{pmatrix} \quad (73)$$

the quantization periods are set to $(N1^{(\emptyset)}, N2^{(\emptyset)})=(139, 139)$, and the dequantization periods are set to $(M1^{(1)}, M2^{(1)})$ (13, 13).

In the 4×4 reversible quantization, unless otherwise specified, the linear quantization step sizes k1, k7 of the transform coefficients X1, X7 are both set to 7, and the quantization step sizes L3, L5 when global signals are linearly quantized are both set to 2,593/379.

Figure 43A:
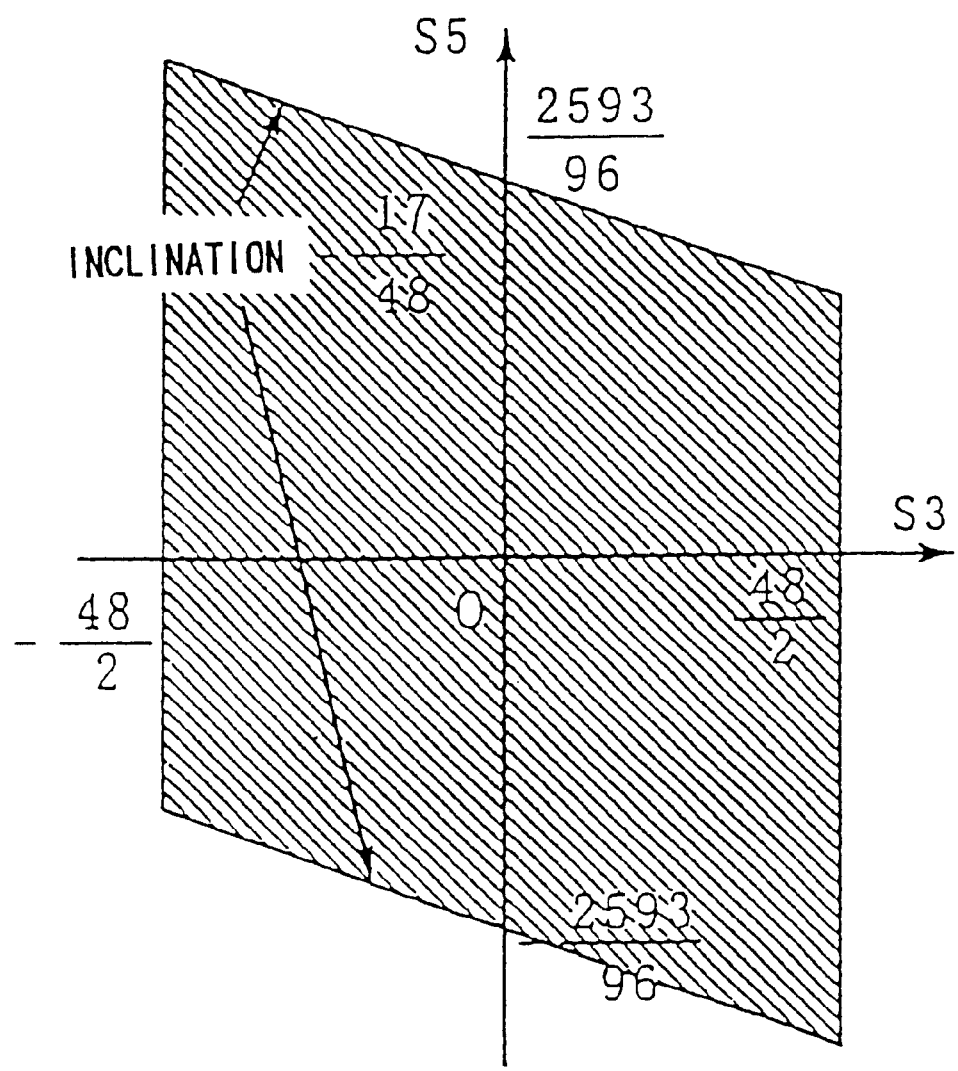
FIG. 43(a) is a diagrammatic view illustrating an example of a region in which representative elements (s3, s5) are present in reversible quantization based on 4×4 matrix transform of an eight-element reversible discrete cosine transform.
Figure 43B:
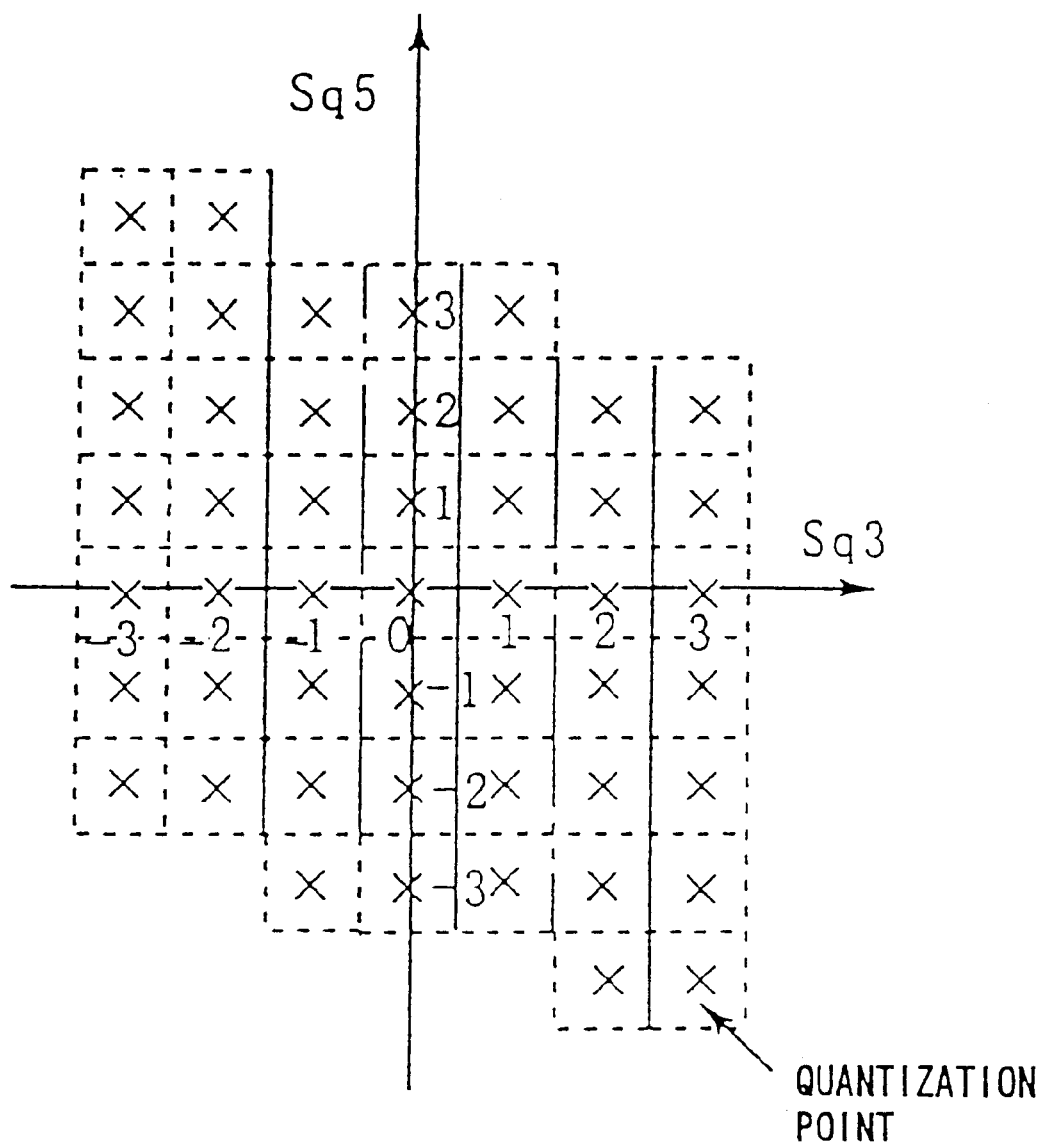
FIG. 43(b) is a diagrammatic view illustrating an example of a region in which quantization values are present when the region in which the representative elements (s3, s5) are present is such as illustrated in FIG. 43(a) in reversible quantization based on 4×4 matrix transform of an eight-element reversible discrete cosine transform.

Then, local quantization is defined by allocating local quantization values illustrated in FIG. 43(b) to representative elements (s3, s5) in a region shown in FIG. 43(a).

On the other hand, while the systems shown in FIGS. 33 and 34 use fixed quantization table/matrix values, the values are calculated in the following manner.

First, the dynamic ranges β(i, J) of transform coefficients of the 8×8 reversible discrete cosine transform are calculated in accordance with the expressions (42) to (49) and (52) given hereinabove. A of the calculation is illustrated in Table 6.

TABLE 6

|   |   | 0 | 1 | 2 | 3 | 4 | 5 | 6 | 7 |
|---|---|---|---|---|---|---|---|---|---|
| i | 0 | 0.941 | 1.000 | 0.970 | 1.023 | 0.960 | 1.023 | 0.970 | 1.000 |
|   | 1 | 1.000 | 1.062 | 1.031 | 1.087 | 1.020 | 1.087 | 1.031 | 1.062 |
|   | 2 | 0.970 | 1.031 | 1.000 | 1.054 | 0.990 | 1.054 | 1.000 | 1.031 |
|   | 3 | 1.023 | 1.087 | 1.054 | 1.112 | 1.044 | 1.112 | 1.054 | 1.087 |
|   | 4 | 0.960 | 1.020 | 0.990 | 1.044 | 0.980 | 1.044 | 0.990 | 1.020 |
|   | 5 | 1.023 | 1.087 | 1.054 | 1.112 | 1.044 | 1.112 | 1.054 | 1.087 |
|   | 6 | 0.970 | 1.031 | 1.000 | 1.054 | 0.990 | 1.054 | 1.000 | 1.031 |
|   | 7 | 1.000 | 1.062 | 1.031 | 1.087 | 1.020 | 1.087 | 1.031 | 1.062 |

Subsequently, a quantization table/matrix is calculated in accordance with the expression (55) given hereinabove. Here, the quantization scale is set to s=1. The table/matrix obtained as a result is given by the following expression (74):

$$\begin{pmatrix} 17 & 16 & 16 & 16 & 17 & 16 & 16 & 16 \\ 16 & 15 & 16 & 15 & 16 & 15 & 16 & 15 \\ 16 & 16 & 16 & 15 & 16 & 15 & 16 & 16 \\ 16 & 15 & 15 & 14 & 15 & 14 & 15 & 15 \\ 17 & 16 & 16 & 15 & 16 & 15 & 16 & 16 \\ 16 & 15 & 15 & 14 & 15 & 14 & 15 & 15 \\ 16 & 16 & 16 & 15 & 16 & 15 & 16 & 16 \\ 16 & 15 & 16 & 15 & 16 & 15 & 16 & 15 \end{pmatrix} \quad (74)$$

Subsequently, an example where the values of the quantization step sizes k1, k7 of X1, X7 in the 4×4 dequantization is described. To vary the values of k1, k7 is possible only by using a quantization table/matrix. Since no quantization table/matrix is used in coding by conventional reversible discrete cosine transform, it is necessary to make the dynamic range of transform coefficients approach that of transform coefficients of the original discrete cosine transform. This is because, if the dynamic ranges are different from each other, then this has a significant influence on the compatibility. Therefore, there is little degree of freedom in selection of each parameter values, and the values of the quantization step sizes k1, k7 of X1, X7 must be 7.

In contrast, in the present example, since a quantization table/matrix is used, a degree of freedom is produced in determination of the values.

Figure 44:
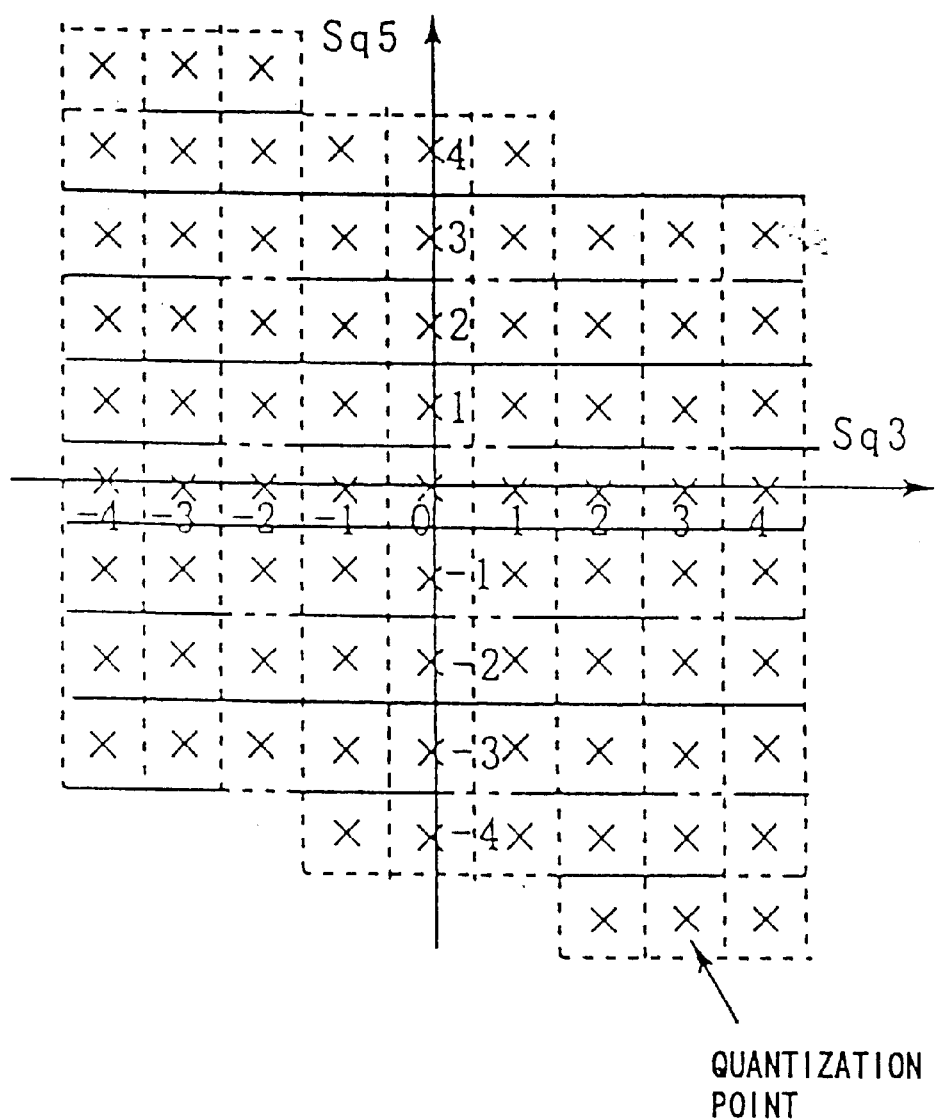
FIG. 44 is a diagrammatic view illustrating another example of the region in which quantization values are present when the region in which the representative elements (s3, s5) are present is such as illustrated in FIG. 43(a) in reversible quantization based on 4×4 matrix transform of an eight-element reversible discrete cosine transform.

Here, as an example, a case wherein k1=k7=9 is described. In this instance, if L3 and L5 are set to L3=2, 593/541 and L5=2,593/519, respectively, and such local quantization values as seen in FIG. 44 are allocated to the representative elements (s3, s5) in the region of FIG. 43(a), then redundancies which remain after quantization can be reduced compared with those in an alternative case wherein k1=k7=7. As a result, the coding efficiency is improved.

If a quantization table/matrix is calculated similarly as in the case wherein k1=k7=7, then it becomes such as given by the following expression (75). Where the quantization table/matrix is used, sufficient compatibility can be maintained even for the case wherein k1 k7=9.

$$\begin{pmatrix} 17 & 21 & 16 & 11 & 17 & 11 & 16 & 21 \\ 21 & 25 & 20 & 13 & 20 & 14 & 20 & 25 \\ 16 & 20 & 16 & 11 & 16 & 11 & 16 & 20 \\ 11 & 13 & 11 & 7 & 11 & 7 & 11 & 13 \\ 17 & 20 & 16 & 11 & 16 & 11 & 16 & 20 \\ 11 & 14 & 11 & 7 & 11 & 8 & 11 & 14 \\ 16 & 20 & 16 & 11 & 16 & 11 & 16 & 20 \\ 21 & 25 & 20 & 13 & 20 & 14 & 20 & 25 \end{pmatrix} \quad (75)$$

Subsequently, in another example of the present invention, such a quantization table/matrix that minimizes the square mean of e(i, j) given by the expression (59) hereinabove is calculated. This mean is taken for each period in which a quantization table/matrix is calculated. Here, a quantization table/matrix is calculated in units of a frame.

For example, where k1=k7=7, if a quantization table/matrix is calculated for brightness values of the first frame of a picture "Flower garden", then it is represented by the following expression (76). If this expression is compared with the quantization table/matrix of the expression (74) given hereinabove, then more than half ones of the values coincide with those of the quantization table/matrix of the expression (74), but some of the values are different a little. This arises from the fact that the differences between transform coefficients of the reversible discrete cosine transform and transform coefficients of the original discrete cosine transform are totally minimized including differences which arise from some displacement in dynamic range.

Consequently, the compatibility with the conventional discrete cosine transform is improved comparing with an alternative case wherein the quantization table/matrix of the expression (74) given hereinabove is used.

$$\begin{pmatrix} 17 & 16 & 17 & 15 & 17 & 16 & 17 & 8 \\ 16 & 15 & 16 & 14 & 16 & 14 & 16 & 8 \\ 17 & 16 & 16 & 15 & 16 & 15 & 16 & 8 \\ 16 & 15 & 15 & 14 & 16 & 14 & 16 & 8 \\ 17 & 16 & 16 & 15 & 16 & 16 & 16 & 9 \\ 16 & 15 & 15 & 14 & 15 & 14 & 16 & 11 \end{pmatrix} \quad (76)$$

-continued

| 17 | 16 | 16 | 15 | 16 | 16 | 16 | 13 |
| 16 | 15 | 16 | 15 | 16 | 15 | 16 | 15 |

Another detailed example is described. First, a quantization table/matrix is calculated in accordance with the expression (63) or (64) given hereinabove. Here, such quantization table/matrix is calculated for each frame. If k1 and k7 are set to k1=k7=7 and a quantization table/matrix is calculated for brightness values of the first frame of the picture "Flower garden", then the quantization table/matrix is given by the following expression (77):

$$\begin{pmatrix} 17 & 16 & 17 & 15 & 17 & 16 & 17 & 10 \\ 16 & 15 & 16 & 14 & 16 & 15 & 16 & 10 \\ 17 & 16 & 16 & 15 & 17 & 15 & 17 & 10 \\ 16 & 15 & 15 & 14 & 16 & 15 & 16 & 10 \\ 17 & 16 & 16 & 15 & 17 & 16 & 17 & 11 \\ 16 & 15 & 15 & 14 & 15 & 14 & 15 & 12 \\ 17 & 16 & 16 & 15 & 17 & 16 & 17 & 14 \\ 16 & 15 & 16 & 15 & 16 & 15 & 16 & 14 \end{pmatrix} \quad (77)$$

As can be seen from the expression (77) above, although the values given are approximate values, more than half of them coincide with the corresponding values of the expression (76) given above, and also the remaining values are different only within the range of ±2.

A further detailed example is described. First, a quantization table/matrix value is calculated, and values around them are determined as candidates. Then, from within the candidates, a quantization table/matrix value which minimizes the square mean of e(i, j) of the expression (59) is detected. As can be seen from comparison between the expressions (76) and (77), results obtained with the system of FIG. 37 and the system of FIG. 38 are not much different from each other, and therefore, values obtained with the system of FIG. 38 and values obtained by adding ±1 to those values are determined as the candidate values for the quantization table/matrix.

Further, also here, a quantization table/matrix is calculated for each one frame. Similarly as in the systems of FIGS. 37 and 38, the quantization matrix determined for brightness values of the first frame of the picture "Flower garden" with the quantization step sizes k1, k7 set to k1=k7=7 is such as given by the g expression (78):

$$\begin{pmatrix} 17 & 16 & 17 & 15 & 17 & 16 & 17 & 9 \\ 16 & 15 & 16 & 14 & 16 & 14 & 16 & 9 \\ 17 & 16 & 16 & 15 & 16 & 15 & 16 & 9 \\ 16 & 15 & 15 & 14 & 16 & 14 & 16 & 9 \\ 17 & 16 & 16 & 15 & 16 & 16 & 16 & 10 \\ 16 & 15 & 15 & 14 & 15 & 14 & 16 & 11 \\ 17 & 16 & 16 & 15 & 16 & 16 & 16 & 13 \\ 16 & 15 & 16 & 15 & 16 & 15 & 16 & 15 \end{pmatrix} \quad (78)$$

From this, it can be seen that a quantization matrix almost same as the expression (76) can be obtained. It is to be noted that the calculation amount is reduced remarkably from that of the system of FIG. 37 is result of the reduction in search range.

Subsequently, a detailed example wherein the quantization periods and the dequantization periods are reversed in the systems shown in FIGS. 40 and 41 is described. In the present example, for three stages from among six stages contributing to the process of calculation of a DC component in the 8×8 reversible discrete cosine transform, the quantization periods are set to (N1, N2) and the dequantization periods are set to (M1, M2), but for the remaining three stages, the quantization periods are set to (N'1, N'2) and the dequantization periods are set to (M'1, M'2).

Then, when those values satisfy the expression (69) given hereinabove, the dynamic range difference in DC component is compensated for completely.

This requirement is satisfied by setting N'1, N'2, M'1, M'2 so as to satisfy the expression (71) for N1, N2, M1, M2 which satisfy the expression (70) as described hereinabove. Here, as the values which satisfy the expression (70), the following expression (79) is used:

(N1, N2, M1, M2)=(14, 10, 10, 7)         (79)

As the values which satisfy the expression (70), those given by the following expression (80) are available:

(N1, N2, M1, M2)=(26, 18, 18, 13)

(N1, N2, M1, M2)=(34, 24, 24, 17)         (80)

Also, multiples of the values of the expressions (79) and (80) and values obtained by replacing N1 and N2, M1 and M2 with each other may be available. However, the values of the expression (79) are preferable in that the magnitude of the quantization correspondence table is comparatively small. While 20 different circuits are available depending upon at which stages from among the six stages contributing to calculation of a DC component the quantization periods and the dequantization periods are reversed, the arrangement of FIG. 40 is employed in the present example.

A result of confirmation of effects of the present detailed example is described below.

Figure 46:
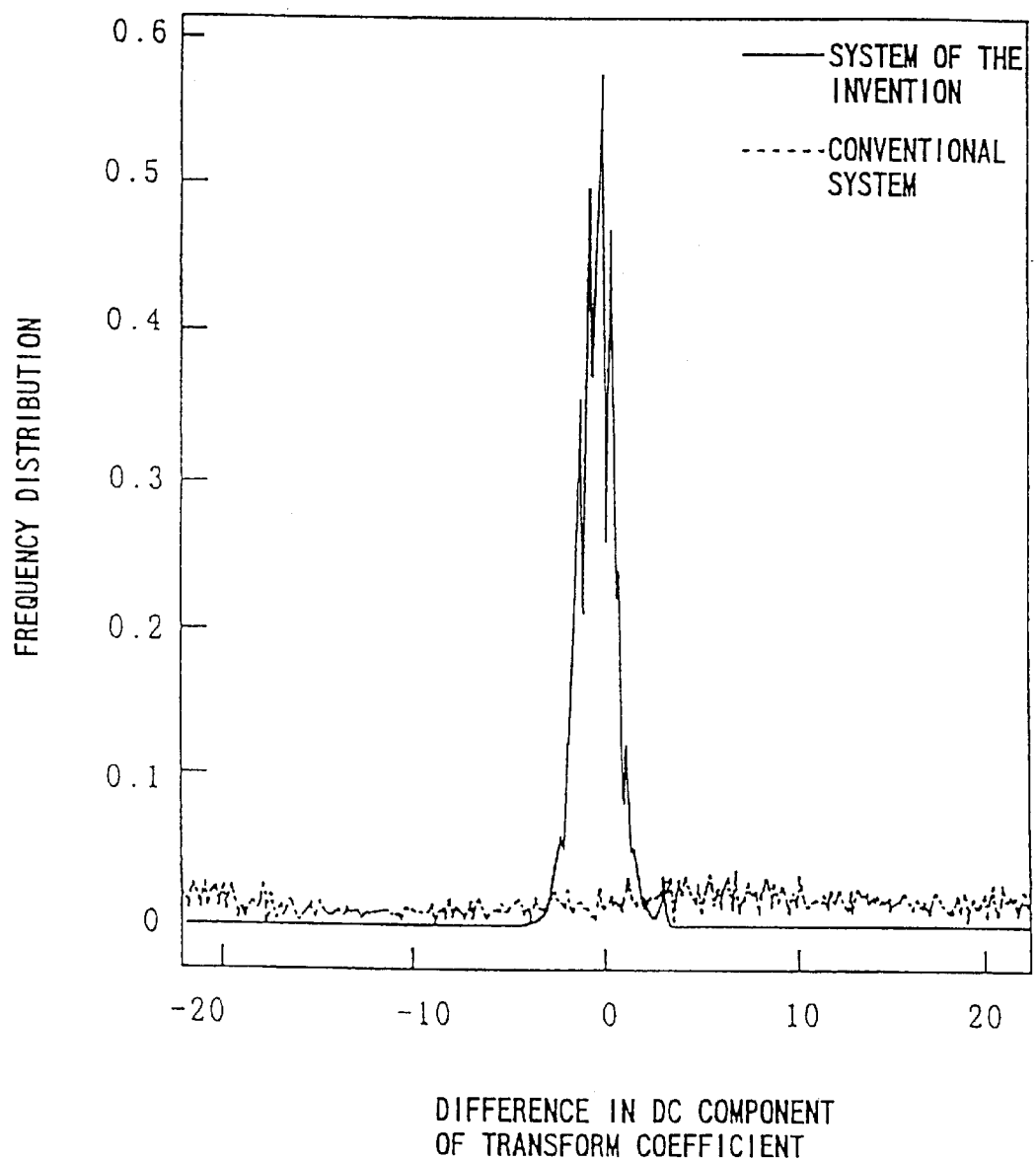
FIG. 46 is a graph illustrating distributions of differences of DC components of reversible discrete cosine transform coefficients and original discrete cosine transform coefficients for comparison between the system of the present invention and the conventional system.

A distribution of differences between DC components of the 8×8 reversible discrete cosine transform and DC components of the original 8×8 discrete cosine transform for brightness values of the first frame of the picture "Flower garden" is illustrated in FIG. 46. FIG. 46 further illustrates a result regarding the conventional 8×8 reversible discrete cosine transform which does not compensate for the difference in dynamic range.

From FIG. 46, it can be seen that the system shown in FIGS. 40 and 41 exhibits a remarkable reduction in difference in DC component. While the square mean value of the differences by the conventional example is 664.94, that of the system described above exhibits a reduction to 0.96.

Subsequently, results of tests regarding the compatibility which were conducted using the apparatus shown in FIGS. 34 to 41 are described. Errors of a decoded picture where the reversible discrete cosine transform was used for coding and the conventional discrete cosine transform was used for decoding were examined. For the picture, 150 frames of the picture "Flower garden" (720×480, 4:2:2 format) were used. The coding was performed basically in accordance with the algorithm of the MPEG-2 while the algorithm was modified such that a portion thereof for discrete cosine transform was replaced with the reversible discrete cosine transform described above.

Further, the transform coefficients obtained by the reversible discrete cosine transform were not quantized any more, and the quantization step size was set to 1. In this instance, the result does not satisfy the specifications of the MPEG-2 in terms of the amount of generated codes.

For decoding, an ordinary algorithm of the MPEG-2 which employs the conventional discrete cosine transform was used. It is to be noted that the distance between core pictures (I or P pictures) was set to M=3, and the number of frames in a picture group (GOP) was set to N=15.

Mean square errors of a decoded picture obtained by the decoding described above from an original picture and averaged over 150 frames are listed in Table 7. Here, results of investigations conducted for the conventional system, the systems of FIGS. 34, 37, 38, 39 and 40 and 41 according to the present invention and combination systems of the systems of FIGS. 34, 37, 38 and 39 and the system of FIGS. 40 and 41 are listed.

TABLE 7

| Coding System | signal (Y) | Color difference signal (U) | Color difference signal (V) |
|---|---|---|---|
| Conventional | 12.97 | 3.57 | 2.70 |
| Inventive (FIG. 34) | 11.71 | 3.34 | 2.62 |
| Inventive (FIG. 37) | 11.45 | 3.31 | 2.57 |
| Inventive (FIG. 38) | 11.47 | 3.34 | 2.58 |
| Inventive (FIG. 39) | 11.45 | 3.32 | 2.57 |
| Inventive (FIGS. 40, 41) | 3.91 | 2.07 | 1.94 |
| Inventive (FIGS. 34 & 40, 41) | 3.41 | 2.00 | 1.92 |
| Inventive (FIGS. 37 & 40, 41) | 3.30 | 1.97 | 1.88 |
| Inventive (FIGS. 38 & 40, 41) | 3.31 | 1.99 | 1.89 |
| Inventive (FIGS. 39 & 40, 41) | 3.30 | 1.97 | 1.88 |

First, comparison between those systems which are combination systems with the system of FIGS. 40 and 41 and those systems which are not combination systems proves that employment of the system of FIGS. 40 and 41 improves the decoded picture quality remarkably.

Next, comparison between the conventional system and the systems of FIGS. 34, 37, 38 and 39 reveals that the systems of FIGS. 34, 37, 38 and 39 exhibit remarkable improvement in decoded picture quality comparing with the conventional system.

Further, comparison between the system of FIG. 34 and the systems of FIGS. 37, 38 and 39 reveals that, comparing with the system of FIG. 34 which employs a fixed quantization matrix, the systems of FIGS. 37, 38 and 39 exhibit some improvement.

Further, comparison among the systems of FIGS. 37, 38 and 39 proves that the system of FIG. 37 which requires the largest amount of calculation but detects an optimum quantization matrix exhibits the highest decoded picture quality. Also with the system of FIG. 38 which calculates a quantization matrix by approximate calculation, a considerably good result is obtained, and with the system of FIG. 39 in which the systems of FIGS. 37 and 38 are combined to reduce the amount of calculation, a result as good as that of the system of FIG. 37 is obtained.

The foregoing similarly applies also to the combinations of the systems of FIGS. 34, 37, 38 and 39 with the system of FIGS. 40 and 41.

Having now fully described the invention, it will be apparent to one of ordinary skill in the art that many changes and modifications can be made thereto without departing from the spirit and scope of the invention as set forth herein.

What is claimed is:

1. A reversible transform coding system which includes a reversible transformer which inversely transforms quantization values (Xq1 Xq7, Xq3, Xq5) into an integer four-element vector (u4, u5, u6, u7), said reversible transformer including:

means for calculating global signals (p3, p5) and local quantization values (sq3, sq5) from the quantization values (Xq3, Xq5);

means for determining quantization residuals (r1, r7) from the local quantization values (sq3, sq5) based on a third numeric table, means for multiplying the quantization values (Xq1, Xq7) by natural numbers k1, k7 and adding the quantization residuals (r1, r7) to the products to obtain transform coefficients (X1, X7), respectively;

means for determining representative elements (s3, s5) from the transform coefficients X1, X7 based on a fourth numeric table;

means for adding the representative elements (s3, s5) to the global signals (p3, p5) to obtain transform coefficients (X3, X5); and means for linearly transforming the transform coefficients (X1, X7, X3, X5) with an inverse matrix to a matrix $$\begin{bmatrix} a_1 & a_7 & a_3 & a_5 \\ a_7 & -a_1 & -a_5 & a_3 \\ a_3 & -a_5 & -a_7 & -a_1 \\ a_5 & a_3 & -a_1 & a_7 \end{bmatrix}^{-1}$$

to obtain the integer four-element vector (u4, u5, u6, u7), wherein said means for calculating global signals (p3, p5) and local quantization values (sq3, sq5) from the quantization values (Xq3, Xq5) includes:

means for calculating global signal candidates (p3$^{(O)}$, p5$^{(O)}$) from the quantization values (Xq3, Xq5) based on two dimensional division with a matrix $$\begin{bmatrix} h & -g \\ g & h \end{bmatrix}$$

where g, h are integers which are given, from integers a1, a3, a5, a7, by $g = a1^2 - a7^2 + 2a3a5$, $h = a3^2 - a5^2 + 2a1a7$, respectively;

means for linearly quantizing the global signal candidates (p3$^{(O)}$, p5$^{(O)}$) with step sizes of real numbers L3, L5 to obtain global quantization value candidates (pq3$^{(O)}$, pq5$^{(O)}$) and quantization residuals (r3$^{(O)}$, r5$^{(O)}$);

means for subtracting the global quantization value candidates (pq3$^{(O)}$, pq5$^{(O)}$) from the quantization values (Xq3, Xq5) to obtain local quantization value candidates (sq3$^{(O)}$, sq5$^{(O)}$);

means for determining an index I from the quantization residuals (r3$^{(O)}$, r5$^{(O)}$);

means for determining local quantization values (sq3, sq5) and global difference signals (Δp3, Δp5) from the local quantization value candidates (sq3$^{(O)}$, sq5$^{(O)}$) based on a fifth numeric table selected using the index I; and means for adding the global difference signals (Δp3, Δp5) to the global signal candidates (p3$^{(O)}$, p5$^{(O)}$) to calculate the global signals (p3, p5).

2. A reversible transform coding system as claimed in claim 1, wherein said means for calculating global signal candidates (p3$^{(O)}$, p5$^{(O)}$) from the quantization values (Xq3, Xq5) includes:

means for multiplying the quantization values Xq3, Xq5 by the real numbers L3, L5 to obtain quantization representative values (Xq3L3, Xq5L5), respectively;

means for transforming the quantization representative values (Xq3L3, Xq5L5) with an inverse matrix $$\begin{bmatrix} h & -g \\ g & h \end{bmatrix}^{-1}$$

to the matrix $$\begin{bmatrix} h & -g \\ g & h \end{bmatrix}$$

represented using g, h which are given, from integers a1, a3, a5, a7, by $g=a1^2-a7^2+2a3a5$, $h=a3^2-a5^2+2a1a7$, respectively, to transform points (w3, w5);

means for raising fractions of the inverse transform points w3, w5 or discarding fractions of the inverse transform points w3, w5 to convert the inverse transform points w3, w5 into integers w3', w5'; and means for transforming a vector (w3', w5') composed of the integers w3', w5' with the matrix $$\begin{bmatrix} h & -g \\ g & h \end{bmatrix}$$

to obtain the global signal candidates ($p3^{(O)}$, $p5^{(O)}$).

3. A reversible transform coding system which includes a reversible transformer which produces eight signals of x0, x1, x2, x3, x4 x5, x6, x7, from eight transform coefficients of quantization values Xq0, Xq1, Xq2, Xq3, Xq4, Xq5, Xq6, Xq7, said reversible transformer including:

means for performing inverse transform as recited in claim 2 for the quantization values Xq1, Xq7, Xq3, Xq5, to obtain a vector of quantization values (u4, u5, u6, u7);

means for performing dequantization based on an integer matrix given by $$\begin{bmatrix} a_2 & a_5 \\ a_6 & -a_2 \end{bmatrix}^{-1}$$

where a2 and a6 are integers for the quantization values (Xq2, Xq6) and performing transform for the dequantized values with an inverse matrix to the matrix to obtain a vector of quantization values (v1, v3);

means for performing dequantization based on a matrix $$\begin{bmatrix} 1 & 1 \\ 1 & -1 \end{bmatrix}^{-1}$$

for the quantization values (Xq0, Xq4) and performing transform for the dequantized values with an inverse matrix to the matrix to obtain a vector of quantization values (v0, v2);

means for performing dequantization based on the matrix $$\begin{bmatrix} 1 & 1 \\ 1 & -1 \end{bmatrix}^{-1}$$

for the quantization values (v0, v1), (v2, v3) and performing transform for the dequantization values with an inverse matrix to obtain a vectors of quantization values (u0, u1), (u2, u3) respectively; and means for performing dequantization based on the matrix $$\begin{bmatrix} 1 & 1 \\ 1 & -1 \end{bmatrix}^{-1}$$

for the quantization values (u0), u4), (u2, u6, u1, u5, (u3, u7) and performing transform for the quantization values with an inverse matrix to the matrix to obtain the signal (x0, x7), (x1, x6), (x3, ,4), x2, x5, respectively where said reversible transformer includes, in place of said means for performing dequantization based on an integer matrix given by $$\begin{bmatrix} a_2 & a_5 \\ a_6 & -a_2 \end{bmatrix}^{-1}$$

where a2 and a6 are integers for the quantization values (Xq2, Xq6) and performing transform for the dequantized values with an inverse matrix to the matrix to obtain a vector of quantization values (v1, v3), means for multiplying the quantization values (Xq2, Xq6) by 13 to obtain a vector, linearly transforming the vector with an inverse matrix to the matrix given above obtained where the integers a2, a6 are 12, 5, respectively, and rounding off results of the linear transform to obtain the quantization values (v1, v3).

4. A reversible transform coding system as claimed in claim 3, wherein the integers a1, a3, a5, a7 are 5, 4, 3, 1, respectively, and the integers a2, a6 are 12, 5, respectively.

* * * * *